United States Patent
Kim

(10) Patent No.: US 12,482,057 B2
(45) Date of Patent: Nov. 25, 2025

(54) ARTIFICIAL INTELLIGENCE-BASED IMAGE PROVIDING APPARATUS AND METHOD, AND ARTIFICIAL INTELLIGENCE-BASED DISPLAY APPARATUS AND METHOD

(71) Applicant: SAMSUNG ELECTRONICS CO., LTD., Suwon-si (KR)

(72) Inventor: Kyungwoo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 416 days.

(21) Appl. No.: 18/094,800

(22) Filed: Jan. 9, 2023

(65) Prior Publication Data
US 2023/0196505 A1 Jun. 22, 2023

Related U.S. Application Data

(63) Continuation of application No. PCT/KR2022/020954, filed on Dec. 21, 2022.

(30) Foreign Application Priority Data

Dec. 21, 2021 (KR) .................. 10-2021-0184294

(51) Int. Cl.
*G06K 9/32* (2006.01)
*G06T 3/40* (2006.01)
(Continued)

(52) U.S. Cl.
CPC .................. *G06T 3/40* (2013.01); *G06T 9/00* (2013.01); *G06V 10/82* (2022.01)

(58) Field of Classification Search
CPC .......... G06T 3/00; G06T 3/40; G06T 3/4046; G06T 3/4053; G06T 3/4076;
(Continued)

(56) References Cited

U.S. PATENT DOCUMENTS 7,295,520 B2 11/2007 Lee et al.
8,861,594 B2 10/2014 Kim et al.
(Continued)

FOREIGN PATENT DOCUMENTS

KR         10-0408525 B1   12/2003
KR    10-2016-0062417 A    6/2016
(Continued)

OTHER PUBLICATIONS

International Search Report & Written Opinion (PCT/ISA/210 & 237) issued from the International Searching Authority on Mar. 24, 2023 in International Application No. PCT/KR2022/020954.
(Continued)

*Primary Examiner* — Duy M Dang
(74) *Attorney, Agent, or Firm* — Sughrue Mion, PLLC

(57) ABSTRACT

Provided is a display apparatus including a processor configured to execute instructions to identify whether a down-scale ratio between a size of an image reconstructed from image data of a previous image and a size of a first window is equal to or less than a pre-set limiting down-scale ratio, transmit a request for a first current image to an image providing apparatus, based on a result of the identifying, and display, on the first window, a second current image or a down-scaled second current image by performing first decoding on image data of the first current image received from the image providing apparatus, wherein a ratio between a size of the second current image and the size of the first window is equal to or greater than the pre-set limiting down-scale ratio.

15 Claims, 33 Drawing Sheets

(51) Int. Cl.
*G06T 9/00* (2006.01)
*G06V 10/82* (2022.01)

(58) Field of Classification Search
CPC ......... G06T 3/4092; G06T 9/00; G06T 9/002; G06V 10/82; G06V 10/75; G06V 10/247; G06V 30/1607
See application file for complete search history.

(56) References Cited

U.S. PATENT DOCUMENTS

| | | | |
|---|---|---|---|
| 9,456,387 | B2 | 9/2016 | Viswanathan et al. |
| 9,967,598 | B2 | 5/2018 | Ha et al. |
| 10,389,780 | B2 | 8/2019 | Eshet et al. |
| RE48,360 | E | 12/2020 | Kwon et al. |
| 11,019,373 | B2 | 5/2021 | Lee |
| 11,144,201 | B2 | 10/2021 | Cui |
| 11,343,296 | B2 | 5/2022 | Thang et al. |
| 11,758,182 | B2 | 9/2023 | Asif et al. |
| 2011/0026819 | A1* | 2/2011 | Lee ............... H04N 19/147 382/232 |
| 2013/0051767 | A1 | 2/2013 | Soroushian et al. |
| 2017/0180740 | A1 | 6/2017 | Topiwala et al. |
| 2019/0012129 | A1 | 1/2019 | Han et al. |
| 2020/0126187 | A1 | 4/2020 | Park et al. |
| 2020/0186887 | A1 | 6/2020 | Kwon et al. |
| 2021/0227290 | A1 | 7/2021 | Ko et al. |
| 2021/0350770 | A1 | 11/2021 | Wisniewski et al. |
| 2022/0030260 | A1 | 1/2022 | Park et al. |
| 2022/0138904 | A1 | 5/2022 | Kim et al. |
| 2022/0207650 | A1 | 6/2022 | Kim et al. |

FOREIGN PATENT DOCUMENTS

| | | |
|---|---|---|
| KR | 10-1645955 B1 | 8/2016 |
| KR | 10-1750049 B1 | 6/2017 |
| KR | 10-1756426 B1 | 7/2017 |
| KR | 10-1837687 B1 | 3/2018 |
| KR | 10-2018-0100976 A | 9/2018 |
| KR | 10-2019-0005251 A | 1/2019 |
| KR | 10-2019-0006221 A | 1/2019 |
| KR | 10-2019-0041088 A | 4/2019 |
| KR | 10-2029604 B1 | 10/2019 |
| KR | 10-2166337 B1 | 10/2020 |
| KR | 10-2020-0141468 A | 12/2020 |
| KR | 10-2021-0093605 A | 7/2021 |
| KR | 10-2021-0113131 A | 9/2021 |
| KR | 10-2525578 B1 | 4/2023 |

OTHER PUBLICATIONS

Communication dated Jan. 30, 2025 issued by the European Patent Office in European Patent Application No. 22911922.7.
Communication issued Aug. 25, 2025 by the European Patent Office in European Patent Application No. 22911922.7.

* cited by examiner

FIG. 5

| IMAGE-RELATED INFORMATION | NN SETTING INFORMATION |
|---|---|
| SD, 10Mbps, AV1 | A SETTING INFORMATION |
| HD, 15Mbps, H.264 | B SETTING INFORMATION |
| Full HD, 20Mbps, HEVC | C SETTING INFORMATION |
| Full HD, 15Mbps, HEVC | D SETTING INFORMATION |

ARTIFICIAL INTELLIGENCE-BASED IMAGE PROVIDING APPARATUS AND METHOD, AND ARTIFICIAL INTELLIGENCE-BASED DISPLAY APPARATUS AND METHOD

CROSS-REFERENCE TO RELATED APPLICATIONS

This application is a continuation application of International Application No. PCT/KR2022/020954, filed on Dec. 21, 2022, which is based on and claims priority to Korean Patent Application No. 10-2021-0184294, filed on Dec. 21, 2021, in the Korean Intellectual Property Office, the disclosures of which are incorporated by reference herein in their entireties.

BACKGROUND

1. Field

The disclosure relates to the image processing field. More particularly, the disclosure relates to apparatuses and methods for processing and displaying an image based on artificial intelligence (AI).

2. Description of Related Art

An image is encoded by a codec conforming to a certain data compression standard, for example, the moving picture experts group (MPEG) standard, and is then stored in a recording medium or transmitted through a communication channel, in the form of a bitstream.

With the development and supply of hardware capable of reproducing and storing a high resolution and high-quality image, the need for a codec capable of effectively encoding and decoding the high resolution and high-quality image has increased.

SUMMARY

Provided are an artificial intelligence (AI)-based image providing apparatus and method, and an AI-based display apparatus and method, wherein an image is encoded and decoded based on AI so as to prevent saturation of a storage capacity and achieve a low bitrate.

A display apparatus according to an embodiment of the disclosure includes: at least one processor configured to execute one or more instructions; and a display, wherein the at least one processor is configured to execute the one or more instructions to identify whether a down-scale ratio between a size of an image reconstructed from image data of a previous image and a size of a first window of the display is equal to or less than a pre-set down-scale ratio, transmit a request for a first current image to an image providing apparatus, based on a result of the identifying, obtain a second current image by performing first decoding on image data of the first current image received from the image providing apparatus, based on the request for the first current image, and display, on the first window, the second current image or a down-scaled second current image, wherein a ratio between a size of the second current image or down-scaled second current image and the size of the first window is equal to or greater than the pre-set down-scale ratio.

The size of the first window may be set by a user input.

When the at least one processor executes the one or more instructions to transmit the request for the first current image to the image providing apparatus, based on the result of the identifying, the at least one processor may be further configured to execute the one or more instructions to, when the down-scale ratio between the size of the image reconstructed from the image data of the previous image and the size of the first window is equal to or less than the pre-set down-scale ratio, transmit the request for the first current image to the image providing apparatus such that a size of an image to be reconstructed from the image data of the first current image is equal to or less than a target largest image size and equal to or greater than the size of the first window, wherein the target largest image size may be determined based on the size of the first window and the pre-set down-scale ratio.

When the at least one processor executes the one or more instructions to transmit the request for the first current image to the image providing apparatus, based on the result of the identifying, the at least one processor may be further configured to execute the one or more instructions to, when the down-scale ratio between the size of the image reconstructed from the image data of the previous image and the size of the first window is greater than the pre-set down-scale ratio, transmit the request for the first current image to the image providing apparatus, based on a request for the previous image, wherein the size of the image reconstructed from the image data of the previous image may be equal to or smaller than a size of an image to be reconstructed from the image data of the first current image.

The at least one processor may be further configured to execute the one or more instructions to transmit a request for the previous image to the image providing apparatus, receive, from the image providing apparatus, image data generated as a result of performing first encoding on a first previous image, and artificial intelligence (AI) data related to AI down-scaling from at least one previous original image to the first previous image, based on the request for the previous image, obtain a second previous image corresponding to the first previous image by performing first decoding on the image data, generate a third previous image by AI up-scaling the second previous image through an up-scaling neural network operating based on neural network setting information obtained based on the AI data, and down-scale the third previous image based on the size of the first window, wherein, when the at least one processor executes the one or more instructions to transmit the request for the first current image to the image providing apparatus, based on the result of the identifying, the at least one processor may be further configured to execute the one or more instructions to, when a down-scale ratio between a size of the third previous image and the size of the first window is equal to or less than the pre-set down-scale ratio, transmit a request for the first current image obtained by performing the first encoding on a current original image without AI down-scaling to the image providing apparatus, wherein a size of the first current image is equal to or greater than the size of the first window and smaller than the size of the third previous image, and when the at least one processor executes the one or more instructions to display, on the first window, the second current image obtained by performing the first decoding on the image data of the first current image or down-scaled second current image, the at least one processor may be further configured to execute the one or more instructions to obtain the second current image by decoding the image data of the first current image received from the image providing apparatus, bypass a down-scaling operation for the obtained second current image or down-scale the obtained second current image, based on the size of the first window, and display the second current image or the down-scaled second current image on the first window, wherein an image different from the second current image or the down-scaled second current image may be displayed on a second window of the display.

The pre-set down-scale ratio may be pre-set based on performance information of hardware implementing a down-scaling operation.

The pre-set down-scale ratio may be a value related to down-scaling through a line skip.

When the at least one processor executes the one or more instructions to transmit the request for the first current image to the image providing apparatus, based on the result of the identifying, the at least one processor may be further configured to execute the one or more instructions to, when the down-scale ratio between the size of the third previous image and the size of the first window is greater than the pre-set down-scale ratio, transmit the request for the first current image obtained through AI down-scaling and the first encoding on the current original image, and receive, from the image providing apparatus, image data generated as a result of performing the first encoding on the first current image and AI data related to the AI down-scaling from the current original image to the first current image, and when the at least one processor executes the one or more instructions to display, on the first window, the second current image obtained by performing the first decoding on the image data of the first current image or down-scaled second current image, the at least one processor may be further configured to execute the one or more instructions to obtain the second current image corresponding to the first current image by performing the first decoding on the image data of the first current image, generate a third current image by AI up-scaling the second current image, through an up-scaling neural network operating based on neural network setting information obtained based on the AI data, down-scale the third current image based on the size of the first window, and display the down-scaled third current image on the first window.

The down-scaling of the third previous image may include at least one of an operation of obtaining an interpolation sample by using values of adjacent samples included in the third previous image and a coefficient of a low pass filter (LPF) based on the down-scale ratio or an operation of obtaining a sample through a line skip, without using an AI down-scaling neural network.

The at least one processor may be further configured to execute the one or more instructions to receive information indicating image data of a plurality of qualities, wherein the information indicating the image data of the plurality of qualities indicates image data of at least one image to which AI down-scaling and first encoding are applied, and image data of at least one image to which first encoding is applied without AI down-scaling, and the at least one processor may be further configured to execute the one or more instructions to transmit the request for the first current image to the image providing apparatus, based on the information indicating the image data of the plurality of qualities.

A method, performed by a display apparatus, of displaying an image, according to an embodiment of the disclosure, includes: identifying whether a down-scale ratio between a size of an image reconstructed from image data of a previous image and a size of a first window is equal to or less than a pre-set down-scale ratio; transmitting a request for a first current image to an image providing apparatus, based on a result of the identifying; obtaining a second current image by performing first decoding on image data of the first current image received from the image providing apparatus, based on the transmitted request for the first current image; and displaying, on the first window, the second current image or a down-scaled second current image, wherein a ratio between a size of the second current image and the size of the first window is equal to or greater than the pre-set down-scale ratio.

The method may further include: transmitting a request for the previous image to the image providing apparatus; receiving, from the image providing apparatus, image data generated as a result of performing first encoding on a first previous image, and artificial intelligence (AI) data related to AI down-scaling from at least one previous original image to the first previous image, based on the request for the previous image; obtaining a second previous image corresponding to the first previous image by performing first decoding on the image data; generating a third previous image by AI up-scaling the second previous image, through an up-scaling neural network operating based on neural network setting information obtained based on the AI data; and down-scaling the third previous image based on the size of the first window, wherein the transmitting of the request for the first current image to the image providing apparatus, based on the result of the identifying, may include, when a down-scale ratio between a size of the third previous image and the size of the first window is equal to or less than the pre-set down-scale ratio, transmitting the request for the first current image obtained by performing the first encoding on a current original image without AI down-scaling to the image providing apparatus, wherein the obtaining of the second current image by performing the first decoding on the image data of the first current image, and the displaying of the second current image or the down-scaled second current image on the first window may include: bypassing a down-scaling operation for the obtained second current image or down-scaling the obtained second current image, based on the size of the first window; and displaying, on the first window, the second current image or the down-scaled second current image, wherein an image different from the second current image or the down-scaled second current image may be displayed on a second window of a display.

The transmitting of the request for the first current image to the image providing apparatus, based on the result of the identifying, may include, when the down-scale ratio between the size of the image reconstructed from the image data of the previous image and the size of the first window is equal to or less than the pre-set down-scale ratio, transmitting the request for the first current image to the image providing apparatus such that a size of an image to be reconstructed from the image data of the first current image is equal to or less than a target largest image size and equal to or greater than the size of the first window, wherein the target largest image size may be determined based on the size of the first window and the pre-set down-scale ratio.

An image providing apparatus according to an embodiment of the disclosure includes a processor configured to execute one or more instructions to receive a request for a first current image from a display apparatus, and transmit, to the display apparatus, image data of the first current image on which first encoding is performed, based on the request for the first current image, wherein the request for the first current image is generated by the display apparatus based on whether a down-scale ratio between a size of an image to be reconstructed from image data of a previous image and a size of a first window is equal to or less than a pre-set down-scale ratio, and transmitted from the display apparatus, and a ratio between a size of a second current image to be obtained by performing first decoding on the image data of the first current image and the size of the first window is equal to or greater than the pre-set down-scale ratio.

The processor may be further configured to execute the one or more instructions to transmit, to the display apparatus, information indicating image data of a plurality of qualities, and receive, from the display apparatus, the request for the first current image based on the information indicating the image data of the plurality of qualities, wherein the information indicating the image data of the plurality of qualities may indicate image data generated through AI down-scaling and first encoding, and image data generated through first encoding without AI down-scaling.

An artificial intelligence (AI)-based image providing apparatus and method, and an AI-based display apparatus and method, according to an embodiment of the disclosure, can process an image at a low bitrate and prevent a storage capacity of an apparatus from being saturated, through AI-based image encoding and decoding.

BRIEF DESCRIPTION OF DRAWINGS

The above and other aspects, features, and advantages of certain embodiments of the present disclosure will be more apparent from the following description taken in conjunction with the accompanying drawings, in which:

FIG. 5 is Table showing a mapping relationship between several pieces of image-related information and several pieces of neural network setting information;

DETAILED DESCRIPTION

Figure 1:
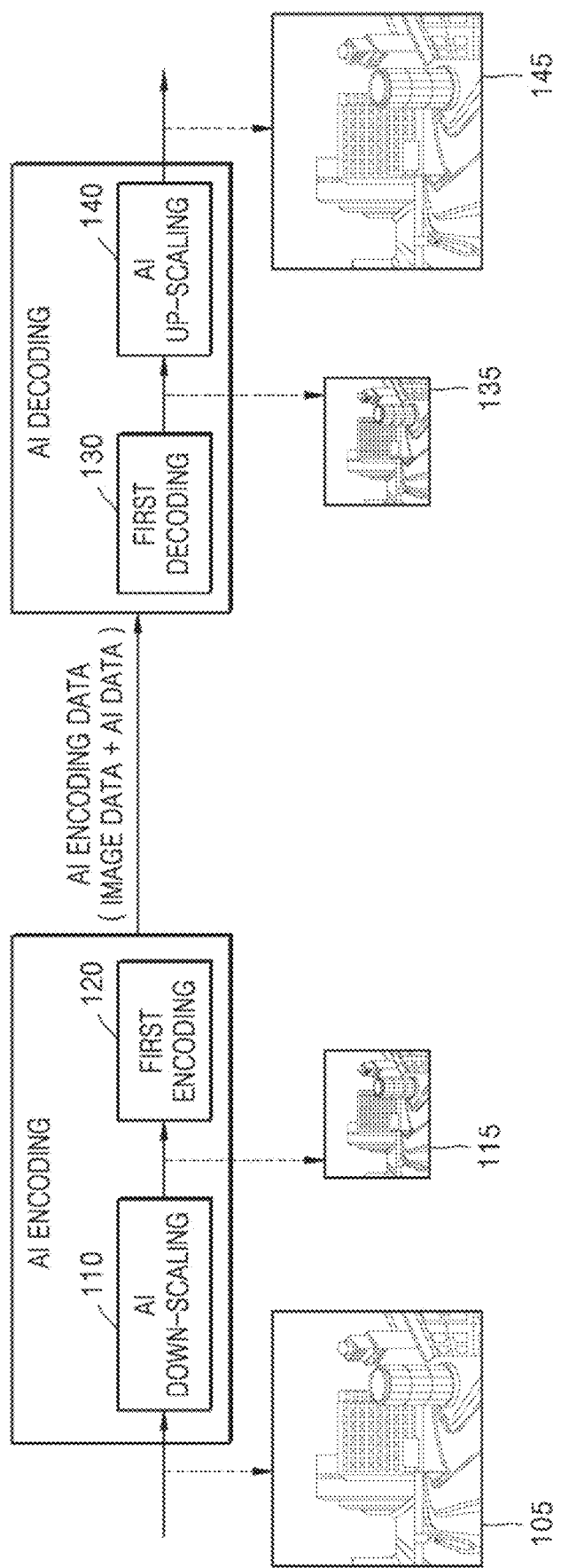
FIG. 1 is a diagram for describing an artificial intelligence (AI) encoding process and an AI decoding process, according to an embodiment of the disclosure.

As the disclosure allows for various changes and numerous examples, particular embodiments of the disclosure will be illustrated in the drawings and described in detail in the written description. However, this is not intended to limit the embodiments of the disclosure to particular modes of practice, and it will be understood that all changes, equivalents, and substitutes that do not depart from the spirit and technical scope of the disclosure are encompassed in the embodiments of the disclosure.

In the description of embodiments of the disclosure, certain detailed explanations of related art are omitted when it is deemed that they may unnecessarily obscure the essence of the disclosure. Also, numbers (for example, a first, a second, and the like) used in the description of the specification are merely identifier codes for distinguishing one element from another.

Also, in the present specification, it will be understood that when elements are "connected" or "coupled" to each other, the elements may be directly connected or coupled to each other, but may alternatively be connected or coupled to each other with an intervening element therebetween, unless specified otherwise.

In the present specification, regarding an element represented as a "-er (or)", "unit", or a "module", two or more elements may be combined into one element or one element may be divided into two or more elements based on subdivided functions. In addition, each element described hereinafter may additionally perform some or all of functions performed by another element, in addition to main functions of itself, and some of the main functions of each element may be performed entirely by another component.

Throughout the disclosure, the expression "at least one of a, b or c" indicates only a, only b, only c, both a and b, both a and c, both b and c, all of a, b, and c, or variations thereof.

In the present specification, an "image" or a "picture" may denote a still image, a moving image including a plurality of continuous still images (or frames), or a video.

Also, in the present specification, a "neural network (NN)" is a representative example of an artificial NN model simulating brain nerves, and is not limited to an artificial NN model using a specific algorithm. The NN may also be referred to as a deep neural network (DNN).

Also, in the present specification, a "parameter" is a value used in an operation process of each layer forming an NN, and for example, may include a weight used when an input value is applied to a certain operation expression. The parameter may be expressed in a matrix form. The parameter is a value set as a result of training, and may be updated through separate training data when necessary.

Also, in the present specification, a "first NN" indicates an NN used for artificial intelligence (AI) down-scaling an image, and a "second NN" indicates an NN used for AI up-scaling an image.

Also, in the present specification, "NN setting information" includes the parameter described above as information related to an element constituting an NN. The NN may be set by using the NN setting information. The NN setting information may be referred as DNN setting information.

Also, in the present specification, an "original image" denotes an image to be AI encoded, and a "first image" denotes an image obtained as a result of AI down-scaling the original image during an AI encoding process. Also, a "second image" denotes an image obtained through first decoding during an AI decoding process, and a "third image" denotes an image obtained by AI up-scaling the second image during the AI decoding process.

Also, in the present specification, "AI down-scaling" denotes a process of decreasing resolution of an image based on AI, and "first encoding" denotes an encoding process based on an image compression method based on frequency transformation. Also, "first decoding" denotes a decoding process based on an image reconstruction method based on frequency transformation, and "AI up-scaling" denotes a process of increasing resolution of an image based on AI. In the present specification, "first encoding" and "first decoding" may be referred to as "encoding" and "decoding", respectively.

FIG. 1 is a diagram for describing an AI encoding process and an AI decoding process, according to an embodiment of the disclosure.

As described above, when resolution of an image remarkably increases, the throughput of information for encoding and decoding the image is increased, and accordingly, a method for improving encoding and decoding of an image is required.

As shown in FIG. 1, according to an embodiment of the disclosure, a first image 115 is obtained by performing AI down-scaling 110 on an original image 105 having high resolution. Then, first encoding 120 and first decoding 130 are performed on the first image 115 having relatively low resolution, and thus a bit rate may be largely reduced compared to when the first encoding 120 and the first decoding 130 are performed on the original image 105.

In detail, referring to FIG. 1, the first image 115 is obtained by performing the AI down-scaling 110 on the original image 105 and the first encoding 120 is performed on the first image 115 during the AI encoding process, according to an embodiment of the disclosure. During the AI decoding process, AI encoding data including AI data and image data, which are obtained as a result of AI encoding, is received, a second image 135 is obtained through the first decoding 130, and a third image 145 is obtained by performing AI up-scaling 140 on the second image 135.

Referring to the AI encoding process in detail, when the original image 105 is input, the AI down-scaling 110 is performed on the original image 105 to obtain the first image 115 of certain resolution and/or certain quality. Here, the AI down-scaling 110 is performed based on AI, and AI for the AI down-scaling 110 needs to be jointly trained with AI for the AI up-scaling 140 of the second image 135. This is because, when the AI for the AI down-scaling 110 and the AI for the AI up-scaling 140 are separately trained, a difference between the original image 105 to be AI encoded and the third image 145 reconstructed through AI decoding is increased.

In an embodiment of the disclosure, the AI data may be used to maintain such a joint relationship during the AI encoding process and the AI decoding process. Accordingly, the AI data obtained through the AI encoding process may include information indicating an up-scaling target, and during the AI decoding process, the AI up-scaling 140 is performed on the second image 135 based on the up-scaling target verified based on the AI data.

The AI for the AI down-scaling 110 and the AI for the AI up-scaling 140 may be embodied as an NN. As will be described below with reference to FIG. 11, because a first NN and a second NN are jointly trained by sharing loss information under a certain target, an AI encoding apparatus may provide target information used during joint training of the first NN and the second NN to an AI decoding apparatus, and the AI decoding apparatus may perform the AI up-scaling 140 on the second image 135 to have target quality and/or resolution, based on the provided target information.

Regarding the first encoding 120 and the first decoding 130 of FIG. 1, the first image 115 obtained by performing the AI down-scaling 110 on the original image 105 may have a reduced information amount through the first encoding 120. The first encoding 120 may include a process of generating prediction data by predicting the first image 115, a process of generating residual data corresponding to a difference between the first image 115 and the prediction data, a process of transforming the residual data of a spatial domain component to a frequency domain component, a process of quantizing the residual data transformed to the frequency domain component, and a process of entropy-encoding the quantized residual data. Such a process of the first encoding 120 may be realized through one of image compression methods using frequency transformation, such as MPEG-2, H.264 advanced video coding (AVC), MPEG-4, high efficiency video coding (HEVC), VC-1, VP8, VP9, and AOMedia video 1 (AV1).

The second image 135 corresponding to the first image 115 may be reconstructed by performing the first decoding 130 on the image data. The first decoding 130 may include a process of generating the quantized residual data by entropy-decoding the image data, a process of inverse-quantizing the quantized residual data, a process of transforming the residual data of the frequency domain component to the spatial domain component, a process of generating the prediction data, and a process of reconstructing the second image 135 by using the prediction data and the residual data. Such a process of the first decoding 130 may be realized through an image reconstruction method corresponding to one of the image compression methods using the frequency transformation, which is used during the process of the first encoding 120.

The AI encoding data obtained through the AI encoding process may include the image data obtained as a result of performing the first encoding 120 on the first image 115, and the AI data related to the AI down-scaling 110 of the original image 105. The image data may be used during the first decoding 130 and the AI data may be used during the AI up-scaling 140.

The image data may be transmitted in the form of a bitstream. The image data may include data obtained based on pixel values in the first image 115, for example, residual data that is a difference between the first image 115 and prediction data of the first image 115. Also, the image data includes information used during the first encoding 120 performed on the first image 115. For example, the image data may include prediction mode information used to perform the first encoding 120 on the first image 115, motion information, and quantization parameter information used during the first encoding 120. The image data may be generated based on a rule, for example, a syntax, of an image compression method used during the first encoding 120 from among the image compression methods using frequency transformation, such as MPEG-2, H.264 AVC, MPEG-4, HEVC, VC-1, VP8, VP9, and AV1.

The AI data is used in the AI up-scaling 140 based on the second NN. As described above, because the first NN and the second NN are jointly trained, the AI data includes information enabling the AI up-scaling 140 to be performed accurately on the second image 135 through the second NN. During the AI decoding process, the AI up-scaling 140 may be performed on the second image 135 to have the target resolution and/or quality, based on the AI data.

The AI data may be transmitted together with the image data in the form of a bitstream. According to an embodiment of the disclosure, the AI data may be transmitted separately from the image data, in the form of a frame or a packet. Alternatively, according to an embodiment of the disclosure, the AI data may be transmitted by being included in the image data. The image data and the AI data may be transmitted through a same network or different networks.

Figure 2:
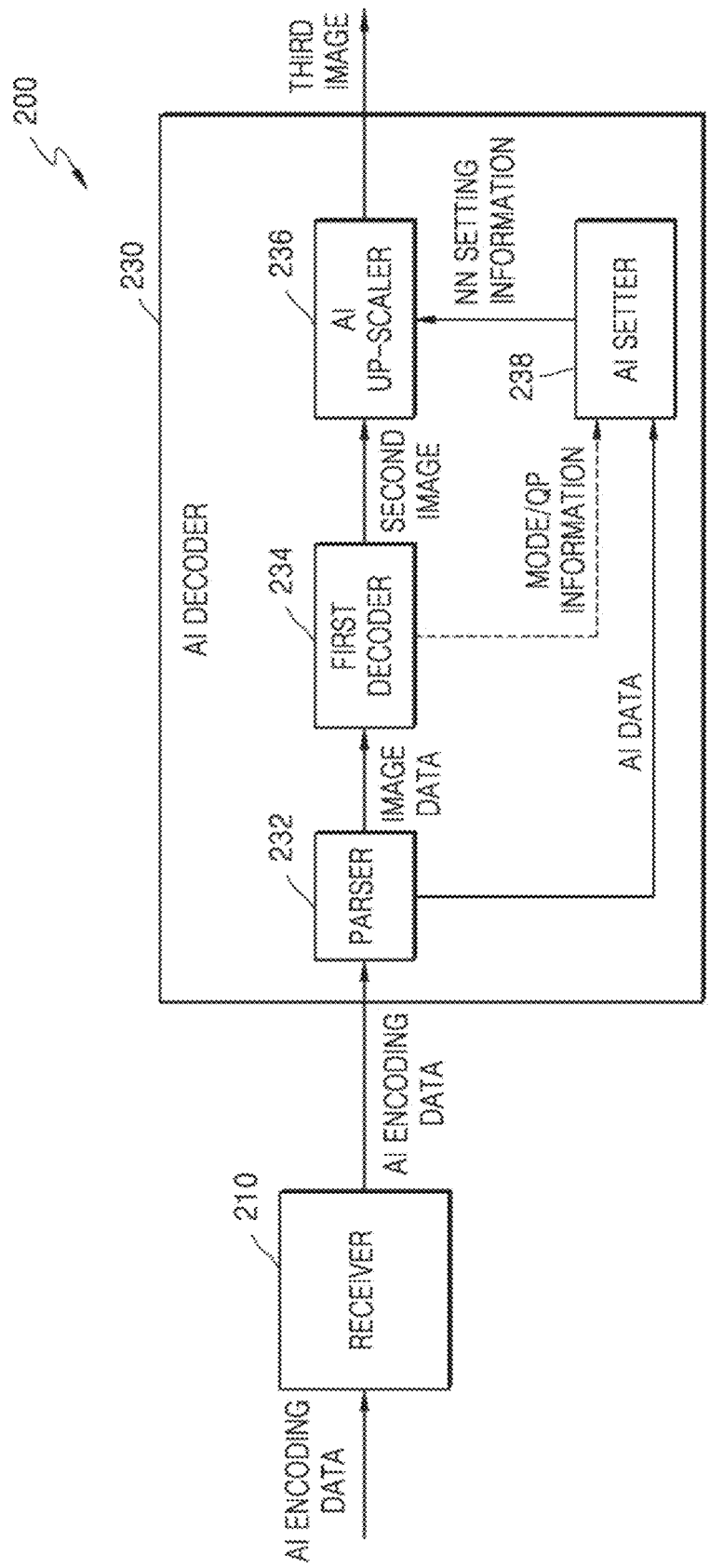
FIG. 2 is a block diagram of a configuration of an AI decoding apparatus, according to an embodiment of the disclosure.

FIG. 2 is a block diagram of a configuration of an AI decoding apparatus 200, according to an embodiment of the disclosure.

Referring to FIG. 2, the AI decoding apparatus 200 according to an embodiment of the disclosure includes a receiver 210 and an AI decoder 230. The AI decoder 230 may include a parser 232, a first decoder 234, an AI up-scaler 236, and an AI setter 238.

In FIG. 2, the receiver 210 and the AI decoder 230 are illustrated as individual apparatuses, but the receiver 210 and the AI decoder 230 may be realized through one processor. In this case, the receiver 210 and the AI decoder 230 may be realized through a dedicated processor or may be realized through a combination of software and a general-purpose processor, such as an application processor (AP), a central processing unit (CPU), or a graphics processing unit (GPU). The dedicated processor may include a memory for implementing an embodiment of the disclosure or include a memory processor for using an external memory.

The receiver 210 and the AI decoder 230 may be configured by one or more processors. In this case, the receiver 210 and the AI decoder 230 may be realized through a combination of dedicated processors or through a combination of software and a plurality of general-purpose processors such as AP, CPU or GPU. According to an embodiment of the disclosure, the receiver 210 may be realized by a first processor, the first decoder 234 may be realized by a second processor different from the first processor, and the parser 232, the AI up-scaler 236, and the AI setter 238 may be realized by a third processor different from the first processor and the second processor.

The receiver 210 receives AI encoding data obtained as a result of AI encoding. For example, the AI encoding data may be a video file in a file format of mp4 or mov.

The receiver 210 may receive the AI encoding data transmitted through a network. The receiver 210 may output the AI encoding data to the AI decoder 230.

According to an embodiment of the disclosure, the AI encoding data may be obtained from a data storage medium including a magnetic medium such as a hard disk, a floppy disk, or a magnetic tape, an optical recording medium such as CD-ROM or DVD, or a magneto-optical medium such as a floptical disk.

The parser 232 transmits, to the first decoder 234, image data generated as a result of performing first encoding on the first image 115 and transmits AI data to the AI setter 238, by parsing the AI encoding data.

According to an embodiment of the disclosure, the parser 232 may parse the image data and the AI data, which are separately included in the AI encoding data. The parser 232 may distinguish between the AI data and the image data included in the AI encoding data by reading a header in the AI encoding data. For example, the AI data may be included in Vendor Specific InfoFrame (VSIF) in a high-definition multimedia interface (HDMI) stream. A structure of the AI encoding data including the AI data and the image data, which are separated from each other, will be described below with reference to FIG. 9.

According to an embodiment of the disclosure, the parser 232 may parse the image data from the AI encoding data, extract the AI data from the image data, transmit the AI data to the AI setter 238, and transmit the remaining image data to the first decoder 234. In other words, the AI data may be included in the image data, and for example, the AI data may be included in supplemental enhancement information (SEI) that is an additional information region of a bitstream corresponding to the image data. A structure of the AI encoding data including the image data that includes the AI data, will be described below with reference to FIG. 10.

According to an embodiment of the disclosure, the parser 232 may divide a bitstream corresponding to the image data into a bitstream to be processed by the first decoder 234 and a bitstream corresponding to the AI data, and output the divided bitstreams to the first decoder 234 and the AI setter 238, respectively.

The parser 232 may identify the image data included in the AI encoding data to be image data obtained through a certain codec (for example, MPEG-2, H.264, MPEG-4, HEVC, VC-1, VP8, VP9, or AV1). In this case, the corresponding information may be transmitted to the first decoder 234 such that the image data may be processed through the identified codec.

The first decoder 234 reconstructs the second image 135 corresponding to the first image 115, based on the image data received from the parser 232. The second image 135 obtained by the first decoder 234 is provided to the AI up-scaler 236.

According to an embodiment of the disclosure, first decoding-related information, such as the prediction mode information, the motion information, and the quantization parameter information, may be provided from the first decoder 234 to the AI setter 238. The first decoding-related information may be used to obtain NN setting information.

The AI data provided to the AI setter 238 includes information enabling the second image 135 to be AI upscaled. Here, an up-scaling target of the second image 135 needs to correspond to a down-scaling target of the first NN. Accordingly, the AI data includes information for verifying the down-scaling target of the first NN.

Examples of the information included in the AI data include difference information between resolution of the original image 105 and resolution of the first image 115, and information related to the first image 115.

The difference information may be expressed as information about a resolution conversion degree of the first image 115 compared to the original image 105 (for example, resolution conversion rate information). Also, because the resolution of the first image 115 is verified through the resolution of the reconstructed second image 135 and the resolution conversion degree is verified accordingly, the difference information may be expressed only as resolution information of the original image 105. Here, the resolution information may be expressed as an aspect ratio or as a ratio (16:9, 4:3, or the like) and a size of one axis. Also, when there is pre-set resolution information, the resolution information may be expressed in the form of an index or flag.

The information related to the first image 115 may include information about at least one of resolution of the first image 115, a bit rate of the image data obtained as a result of performing first encoding on the first image 115, or a codec type used during the first encoding of the first image 115.

The AI setter 238 may determine the up-scaling target of the second image 135, based on at least one of the difference information or the information related to the first image 115, which are included in the AI data. The up-scaling target may indicate, for example, to what degree resolution is to be up-scaled for the second image 135.

When the up-scaling target is determined, the AI up-scaler 236 performs AI up-scaling on the second image 135 through the second NN to obtain the third image 145 corresponding to the up-scaling target.

Before describing a method by which the AI setter 238 determines the up-scaling target based on the AI data, an AI up-scaling process through the second NN will be described with reference to FIGS. 3 and 4.

Figure 3:
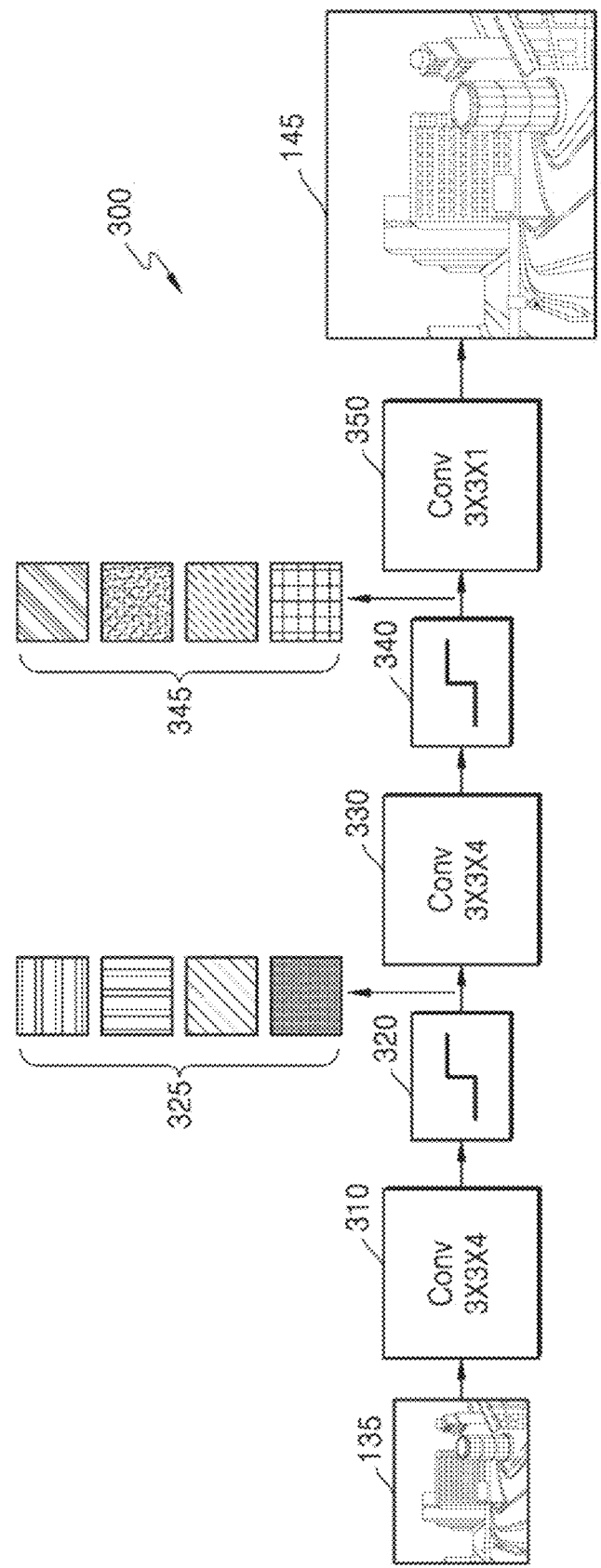
FIG. 3 is a diagram showing a second neural network for AI up-scaling a second image.
Figure 4:
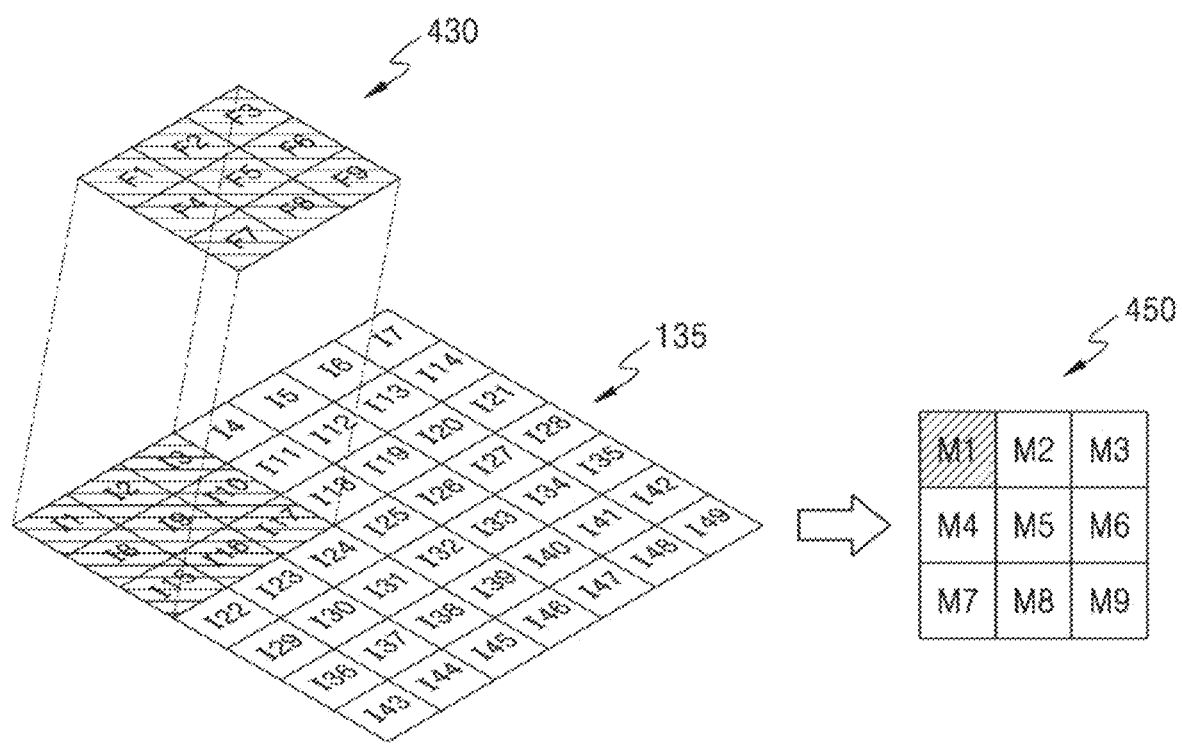
FIG. 4 is a diagram for describing a convolution operation performed at a convolution layer.

FIG. 3 is a diagram showing a second NN 300 for AI up-scaling the second image 135, and FIG. 4 is a diagram for describing a convolution operation at a first convolution layer 310 of FIG. 3.

As shown in FIG. 3, the second image 135 is input to the first convolution layer 310. 3×3×4 indicated in the first convolution layer 310 shown in FIG. 3 indicates that a convolution process is performed on one input image by using four filter kernels each having a size of 3×3. As a result of the convolution process, four feature maps are generated by the four filter kernels. Each feature map indicates unique features of the second image 135. For example, each feature map may indicate a vertical direction feature, a horizontal direction feature, or an edge feature of the second image 135.

The convolution operation in the first convolution layer 310 will be described in detail with reference to FIG. 4.

One feature map 450 may be generated through multiplication and addition between parameters of a filter kernel 430 having a size of 3×3 used in the first convolution layer 310 and corresponding pixel values in the second image 135. Four filter kernels are used in the first convolution layer 310, and thus four feature maps may be generated through the convolution operation using the four filter kernels.

I1 through I49 indicated in the second image 135 of FIG. 4 indicate pixels of the second image 135, and F1 through F9 indicated in the filter kernel 430 indicate parameters of the filter kernel 430. Also, M1 through M9 indicated in the feature map 450 indicate samples of the feature map 450.

FIG. 4 is illustrated as if the second image 135 includes 49 pixels, but this is only an example and when the second image 135 has resolution of 4 K, for example, the second image 135 may include 3480×2160 pixels.

During the convolution operation, pixel values of I1, I2, I3, I8, I9, I10, I15, I16, and I17 of the second image 135 and F1 through F9 of the filter kernel 430 are respectively multiplied, and a value of combination (for example, addition) of result values of the multiplication may be assigned as a value of M1 of the feature map 450. When a stride of the convolution operation is 2, pixel values of I3, I4, I5, I10, I11, I12, I17, I18, and I19 of the second image 135 and F1 through F9 of the filter kernel 430 are respectively multiplied, and a value of combination of result values of the multiplication may be assigned as a value of M2 of the feature map 450.

While the filter kernel 430 moves along the stride to a last pixel of the second image 135, the convolution operation is performed between the pixel values in the second image 135 and the parameters of the filter kernel 430, and thus the feature map 450 having a certain size may be obtained.

According to the disclosure, through joint training of a first NN and a second NN, values of parameters of the second NN, for example, parameters of a filter kernel used in convolution layers of the second NN (for example, F1 through F9 of the filter kernel 430), may be optimized. The AI setter 238 may determine an up-scaling target corresponding to a down-scaling target of the first NN, based on AI data, and determine parameters corresponding to the determined up-scaling target as the parameters of the filter kernel used in the convolution layers of the second NN.

Convolution layers included in the first NN and second NN may perform processes based on the convolution operation described with reference to FIG. 4, but the convolution operation described in FIG. 4 is only an example and is not limited thereto.

Referring back to FIG. 3, the feature maps output from the first convolution layer 310 are input to a first activation layer 320.

The first activation layer 320 may assign a non-linear feature to each feature map. The first activation layer 320 may include a sigmoid function, a Tanh function, a rectified linear unit (ReLU) function, or the like, but is not limited thereto.

The first activation layer 320 assigning the non-linear feature indicates that some sample values of the feature map, which is an output through the first convolution layer 310, are changed. Here, the change is performed by applying the non-linear feature.

The first activation layer 320 determines whether to transmit the sample values of the feature maps output from the first convolution layer 310 to a second convolution layer 330. For example, some of the sample values of the feature maps are activated by the first activation layer 320 and transmitted to the second convolution layer 330, and some sample values are deactivated by the first activation layer 320 and not transmitted to the second convolution layer 330. The unique features of the second image 135 indicated by the feature maps are emphasized by the first activation layer 320.

Feature maps 325 output from the first activation layer 320 are input to the second convolution layer 330. One of the feature maps 325 shown in FIG. 3 is a result of processing the feature map 450 described with reference to FIG. 4 in the first activation layer 320.

3×3×4 indicated in the second convolution layer 330 indicates that a convolution process is performed on the input feature maps 325 by using four filter kernels each having a size of 3×3. An output of the second convolution layer 330 is input to a second activation layer 340. The second activation layer 340 may assign a non-linear feature to input data.

Feature maps 345 output from the second activation layer 340 are input to a third convolution layer 350. 3×3×1 indicated in the third convolution layer 350 shown in FIG. 3 indicates that a convolution process is performed to generate one output image by using one filter kernel having a size of 3×3. The third convolution layer 350 is a layer for outputting a final image and generates one output by using one filter kernel. According to an embodiment of the disclosure, the third convolution layer 350 may output the third image 145 through a convolution operation.

There may be a plurality of pieces of NN setting information indicating the numbers of filter kernels of the first convolution layer 310, second convolution layer 330, and third convolution layer 350 of the second NN 300, parameters of the filter kernels thereof, and the like, as will be described below, and the plurality of pieces of NN setting information need to correspond to a plurality of pieces of NN setting information of the first NN. The correspondence between the plurality of pieces of NN setting information of the second NN and the plurality of pieces of NN setting information of the first NN may be realized through joint training of the first NN and the second NN.

In FIG. 3, the second NN 300 includes three convolution layers (the first, second, and third convolution layers 310, 330, and 350) and two activation layers (the first and second activation layers 320 and 340), but this is only an example, and the numbers of convolution layers and activation layers may vary according to an embodiment of the disclosure. Also, according to an embodiment of the disclosure, the second NN 300 may be implemented as a recurrent neural network (RNN). In this case, a convolutional neural network (CNN) structure of the second NN 300 according to an embodiment of the disclosure is changed to an RNN structure.

According to an embodiment of the disclosure, the AI up-scaler 236 may include at least one arithmetic logic unit (ALU) for the convolution operation and an operation of an activation layer described above. The ALU may be embodied as a processor. For the convolution operation, the ALU may include a multiplier for performing multiplication between sample values of a feature map output from the second image 135 or a previous layer, and sample values of a filter kernel, and an adder for adding result values of the multiplication. Also, for the operation of the activation layer, the ALU may include a multiplier for multiplying an input sample value by a weight used in a pre-determined sigmoid function, Tanh function, or ReLU function, and a comparator for comparing a multiplication result with a certain value to determine whether to transmit the input sample value to a next layer.

Hereinafter, methods by which the AI setter 238 determines an up-scaling target and the AI up-scaler 236 AI up-scales the second image 135 based on the up-scaling target will be described.

According to an embodiment of the disclosure, the AI setter 238 may store a plurality of pieces of NN setting information settable in a second NN.

Here, the NN setting information may include information about at least one of the number of convolution layers included in the second NN, the number of filter kernels for each convolution layer, or a parameter of each filter kernel.

The plurality of pieces of NN setting information may respectively correspond to various up-scaling targets, and the second NN may operate based on NN setting information corresponding to a certain up-scaling target. The second NN may have different structures based on the NN setting information. For example, the second NN may include three convolution layers based on any piece of NN setting information, and may include four convolution layers based on another piece of NN setting information.

According to an embodiment of the disclosure, the NN setting information may only include a parameter of a filter kernel used in the second NN. In this case, a structure of the second NN does not change, but only the parameter of the internal filter kernel may change based on the NN setting information.

The AI setter 238 may obtain the NN setting information for AI up-scaling the second image 135, from among the plurality of pieces of NN setting information. The plurality of pieces of NN setting information used at this time are each information for obtaining the third image 145 of pre-determined resolution and/or pre-determined quality, and are jointly trained with a first NN.

For example, one piece of NN setting information from among the plurality of pieces of NN setting information may include information for obtaining the third image 145 of resolution twice greater than resolution of the second image 135, for example, the third image 145 of 4 K (4096×2160) twice greater than 2 K (2048×1080) of the second image 135, and another piece of NN setting information may include information for obtaining the third image 145 of resolution four times greater than the resolution of the second image 135, for example, the third image 145 of 8 K (8192×4320) four times greater than 2 K (2048×1080) of the second image 135.

Figure 7:
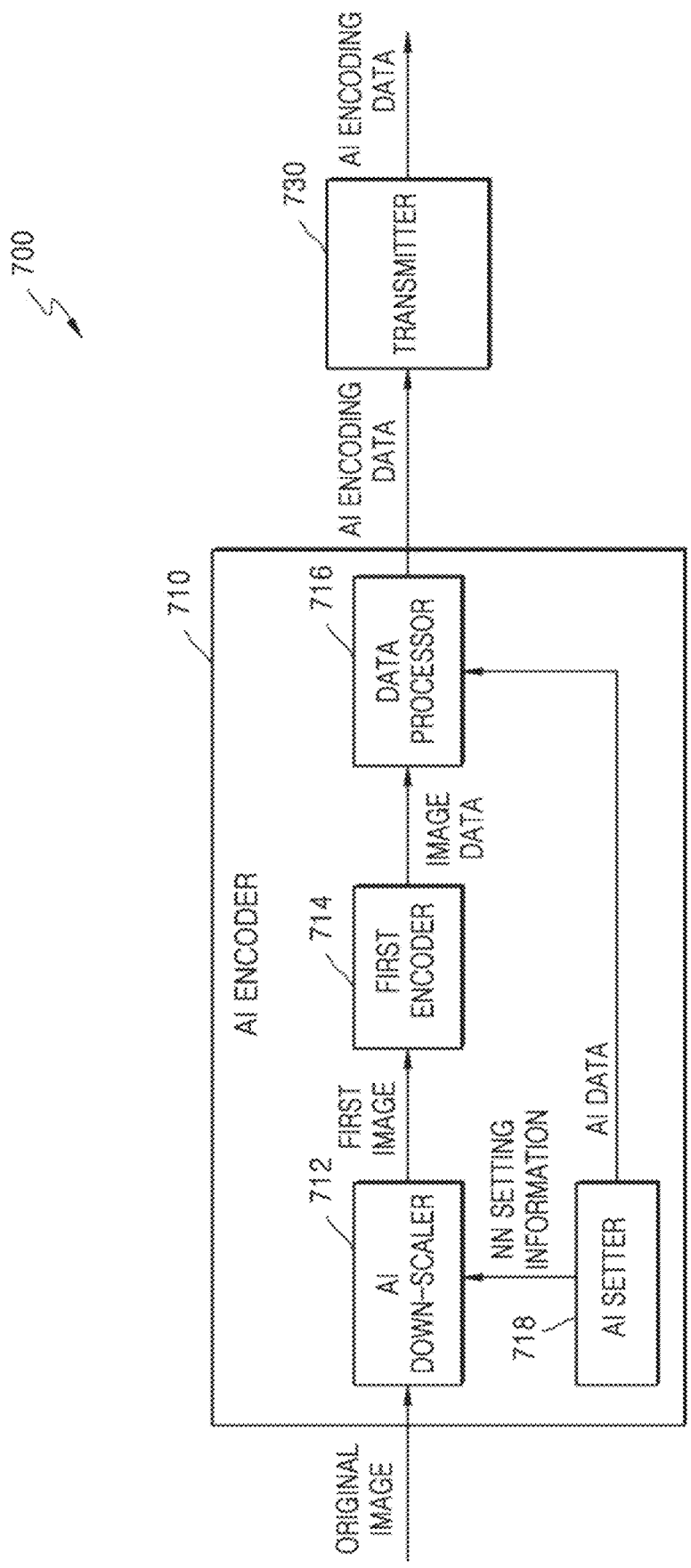
FIG. 7 is a block diagram of a configuration of an AI encoding apparatus, according to an embodiment of the disclosure.

Each of the plurality of pieces of NN setting information is generated jointly with NN setting information of the first NN of an AI encoding apparatus 700 of FIG. 7, and the AI setter 238 obtains one piece of NN setting information from among the plurality of pieces of NN setting information based on an enlargement ratio corresponding to a reduction ratio of the NN setting information of the first NN. In this regard, the AI setter 238 may verify information of the first NN. In order for the AI setter 238 to verify the information of the first NN, the AI decoding apparatus 200 according to an embodiment of the disclosure receives AI data including the information of the first NN from the AI encoding apparatus 700.

In other words, the AI setter 238 may verify information targeted by NN setting information of the first NN used to obtain the first image 115, and obtain NN setting information of the second NN jointly trained with the first NN, by using information received from the AI encoding apparatus 700.

When NN setting information for AI up-scaling the second image 135 is obtained from among the plurality of pieces of NN setting information, the NN setting information may be transmitted to the AI up-scaler 236 and input data may be processed based on the second NN operating based on the NN setting information.

For example, when any one piece of NN setting information is obtained, the AI up-scaler 236 sets the number of filter kernels included in each of the first convolution layer 310, second convolution layer 330, and third convolution layer 350 of the second NN 300 of FIG. 3, and the parameters of the filter kernels to values included in the obtained NN setting information.

In detail, when the parameters of the filter kernel 430 of 3×3 shown in FIG. 4 are {1, 1, 1, 1, 1, 1, 1, 1, 1} and there is a change in the NN setting information, the AI up-scaler 236 may replace the parameters of the filter kernel 430 to {2, 2, 2, 2, 2, 2, 2, 2, 2} that are parameters included in the changed NN setting information.

The AI setter 238 may obtain the NN setting information for AI up-scaling the second image 135 from among the plurality of pieces of NN setting information, based on information included in the AI data, and the AI data used to obtain the NN setting information will now be described in detail.

According to an embodiment of the disclosure, the AI setter 238 may obtain the NN setting information for AI up-scaling the second image 135 from among the plurality of pieces of NN setting information, based on difference information included in the AI data. For example, when it is verified that the resolution (for example, 4 K (4096×2160)) of the original image 105 is twice higher than the resolution (for example, 2 K (2048×1080)) of the first image 115, based on the difference information, the AI setter 238 may obtain NN setting information for increasing the resolution of the second image 135 two times.

According to an embodiment of the disclosure, the AI setter 238 may obtain the NN setting information for AI up-scaling the second image 135 from among the plurality of pieces of NN setting information, based on information related to the first image 115 included in the AI data. The AI setter 238 may pre-determine a mapping relationship between image-related information and NN setting information, and obtain NN setting information mapped to the information related to the first image 115.

FIG. 5 is Table showing a mapping relationship between several pieces of image-related information and several pieces of NN setting information.

Through an embodiment of the disclosure according to FIG. 5, it will be determined that AI encoding/AI decoding processes according to an embodiment of the disclosure do not only consider a change of resolution. As shown in FIG. 5, NN setting information may be selected considering, individually or all, resolution, such as standard definition (SD), high definition (HD), or full HD, a bit rate, such as 10 Mbps, 15 Mbps, or 20 Mbps, and codec information, such as AV1, H.264, or HEVC. For such consideration, training considering each element should be jointly performed with encoding and decoding processes during an AI training process (see FIG. 11).

Accordingly, when a plurality of pieces of NN setting information corresponding to image-related information including a codec type, resolution of an image, and the like, are provided as shown in FIG. 5 based on training, the AI setter 238 may select the NN setting information for AI up-scaling the second image 135, based on the information related to the first image 115 received during the AI decoding process.

In other words, the AI setter 238 may use NN setting information based on image-related information by matching the image-related information at the left of the table of FIG. 5 and the NN setting information at the right of the table.

As shown in FIG. 5, when it is verified, from the information related to the first image 115, that the resolution of the first image 115 is SD, a bit rate of image data obtained as a result of performing first encoding on the first image 115 is 10 Mbps, and the first encoding is performed on the first image 115 via AV1 codec, the AI setter 238 may obtain A NN setting information from among the plurality of pieces of NN setting information.

Also, when it is verified, from the information related to the first image 115, that the resolution of the first image 115 is HD, the bitrate of the image data obtained as the result of the first encoding is 15 Mbps, and the first encoding is performed on the first image 115 via H.264 codec, the AI setter 238 may obtain B NN setting information from among the plurality of pieces of NN setting information.

Also, when it is verified, from the information related to the first image 115, that the resolution of the first image 115 is full HD, the bitrate of the image data obtained as the result of performing the first encoding on the first image 115 is 20 Mbps, and the first encoding is performed on the first image 115 via HEVC codec, the AI setter 238 may obtain C NN setting information from among the plurality of pieces of NN setting information, and when it is verified that the resolution of the first image 115 is full HD, the bitrate of the image data obtained as the result of the first encoding on the first image 115 is 15 Mbps, and the first encoding is performed on the first image 115 via HEVC codec, the AI setter 238 may obtain D NN setting information from among the plurality of pieces of NN setting information. One of the C NN setting information and the D NN setting information is selected based on whether the bitrate of the image data obtained as the result of performing the first encoding on the first image 115 is 20 Mbps or 15 Mbps. Different bitrates of the image data, obtained when the first encoding is performed on the first image 115 of same resolution via a same codec, indicate different qualities of reconstructed images. Accordingly, a first NN and a second NN may be jointly trained based on certain image quality, and accordingly, the AI setter 238 may obtain NN setting information based on a bitrate of image data indicating the quality of the second image 135.

According to an embodiment of the disclosure, the AI setter 238 may obtain the NN setting information for AI up-scaling the second image 135 from among the plurality of pieces of NN setting information, considering all of information (prediction mode information, motion information, quantization parameter information, and the like) provided from the first decoder 234 and the information related to the first image 115 included in the AI data. For example, the AI setter 238 may receive the quantization parameter information used during the first encoding process of the first image 115 from the first decoder 234, verify the bitrate of image data obtained as a result of encoding the first image 115 from AI data, and obtain NN setting information corresponding to a quantization parameter and the bitrate. Even when bitrates are the same, qualities of reconstructed images may vary according to complexity of an image. The bitrate is a value representing the entire first image 115 on which first encoding is performed, and quality of each frame may vary even within the first image 115. Accordingly, the NN setting information more suitable to the second image 135 may be obtained when all of the prediction mode information, motion information, and/or quantization parameter, which are obtainable for each frame from the first decoder 234, are considered, compared to when only the AI data is used.

Also, according to an embodiment of the disclosure, the AI data may include an identifier of mutually agreed NN setting information. An identifier of NN setting information is information for distinguishing between a pair of pieces of NN setting information jointly trained between the first NN and the second NN, such that the second image 135 is AI up-scaled to an up-scaling target corresponding to a down-scaling target of the first NN. After obtaining the identifier of NN setting information included in the AI data, the AI setter 238 may obtain the NN setting information corresponding to the identifier of NN setting information, and the AI up-scaler 236 may AI up-scale the second image 135 by using the NN setting information. For example, an identifier indicating each of the plurality of pieces of NN setting information configurable in the first NN, and an identifier indicating each of the plurality of pieces of NN setting information configurable in the second NN may be pre-assigned. In this case, a same identifier may be assigned to a pair of pieces of NN setting information configurable in each of the first NN and the second NN. The AI data may include the identifier of NN setting information set in the first NN to perform AI down-scaling on the original image 105. Upon receiving the AI data, the AI setter 238 may obtain the NN setting information indicated by the identifier included in the AI data from among the plurality of pieces of NN setting information, and the AI up-scaler 236 may AI up-scale the second image 135 by using the NN setting information.

Also, according to an embodiment of the disclosure, the AI data may include the NN setting information itself. The AI setter 238 may obtain the NN setting information included in the AI data, and the AI up-scaler 236 may AI up-scale the second image 135 by using the NN setting information.

According to an embodiment of the disclosure, when pieces of information (for example, the number of convolution layers, the number of filter kernels for each convolution layer, a parameter of each filter kernel, and the like) constituting the NN setting information are stored in the form of a lookup table, the AI setter 238 may obtain the NN setting information by combining some values selected from values in the lookup table, based on information included in the AI data, and the AI up-scaler 236 may AI up-scale the second image 135 by using the NN setting information.

According to an embodiment of the disclosure, when a structure of NN corresponding to the up-scaling target is determined, the AI setter 238 may obtain NN setting information, for example, parameters of a filter kernel, corresponding to the determined structure of NN.

As described above, the AI setter 238 obtains NN setting information of the second NN through the AI data including information related to the first NN, and the AI up-scaler 236 AI up-scales the second image 135 through the second NN set based on the NN setting information, and in this case, a memory usage and throughput may be reduced compared to when a feature of the second image 135 is directly analyzed and up-scaled.

According to an embodiment of the disclosure, when the second image 135 includes a plurality of frames, the AI setter 238 may independently obtain NN setting information for a certain number of frames, or may obtain common NN setting information for entire frames.

Figure 6:
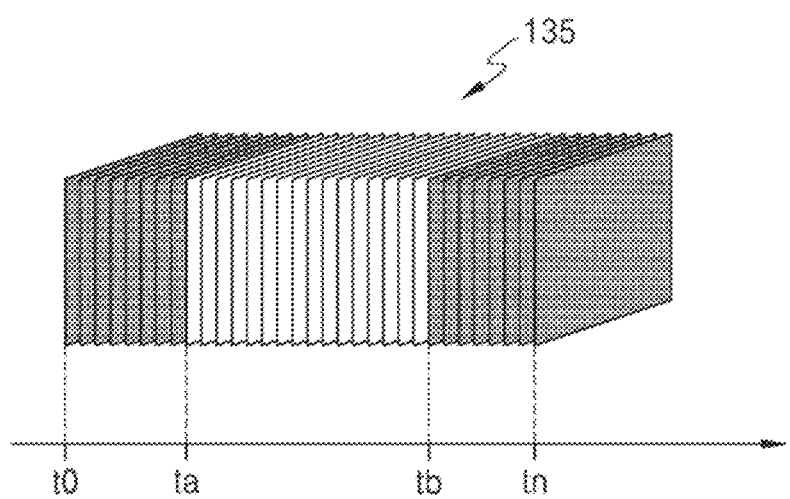
FIG. 6 is a diagram showing a second image including a plurality of frames.

FIG. 6 is a diagram showing the second image 135 including a plurality of frames.

As shown in FIG. 6, the second image 135 may include frames t0 through tn.

According to an embodiment of the disclosure, the AI setter 238 may obtain NN setting information of a second NN through AI data, and the AI up-scaler 236 may perform AI up-scaling on the frames t0 through tn, based on the obtained NN setting information. In other words, the frames t0 through tn may be AI up-scaled based on common NN setting information.

According to an embodiment of the disclosure, the AI setter 238 may obtain A NN setting information from the AI data for some of the frames t0 to tn, for example, the frames t0 to ta, and obtain B NN setting information from the AI data for the frames ta+1 to tb. Also, the AI setter 238 may obtain CNN setting information from the AI data for the frames tb+1 through tn. In other words, the AI setter 238 may independently obtain NN setting information for each group including a certain number of frames from among the plurality of frames, and the AI up-scaler 236 may perform AI up-scaling on the frames included in each group by using the independently obtained NN setting information.

As another example, the AI setter 238 may independently obtain NN setting information for each frame included in the second image 135. For example, when the second image 135 includes three frames, the AI setter 238 may obtain NN setting information in relation to a first frame, obtain NN setting information in relation to a second frame, and obtain NN setting information in relation to a third frame. In other words, the NN setting information may be independently obtained for each of the first, second, and third frames. The NN setting information may be independently obtained for each frame included in the second image 135, based on the method of obtaining NN setting information, based on the information (the prediction mode information, the motion information, the quantization parameter information, and the like) provided from the first decoder 234, and the information related to the first image 115 included in the AI data, described above. This is because the mode information, the quantization parameter information, or the like may be determined independently for each frame included in the second image 135.

As another example, the AI data may include information indicating up to which frame the NN setting information obtained based on the AI data is valid. For example, when the AI data includes information indicating that the NN setting information is valid up to the frame ta, the AI setter 238 obtains the NN setting information based on the AI data and the AI up-scaler 236 performs AI up-scaling on the frames t0 through ta based on the NN setting information. Also, when another AI data includes information indicating that NN setting information is valid up to the frame tn, the AI setter 238 may obtain the NN setting information based on the other AI data and the AI up-scaler 236 may perform AI up-scaling on the frames ta+1 through tn based on the obtained NN setting information.

Hereinafter, the AI encoding apparatus 700 for performing AI encoding on the original image 105 will be described with reference to FIG. 7.

FIG. 7 is a block diagram of a configuration of the AI encoding apparatus 700, according to an embodiment of the disclosure.

Referring to FIG. 7, the AI encoding apparatus 700 may include an AI encoder 710 and a transmitter 730. The AI encoder 710 may include an AI down-scaler 712, a first encoder 714, a data processor 716, and an AI setter 718.

In FIG. 7, the AI encoder 710 and the transmitter 730 are illustrated as separate devices, but the AI encoder 710 and the transmitter 730 may be realized through one processor. In this case, the AI encoder 710 and the transmitter 730 may be realized through a dedicated processor or through a combination of software and a general-purpose processor, such as AP, CPU or GPU. The dedicated processor may include a memory for implementing an embodiment of the disclosure or include a memory processor for using an external memory.

Also, the AI encoder 710 and the transmitter 730 may be configured by a plurality of processors. In this case, the AI encoder 710 and the transmitter 730 may be realized through a combination of dedicated processors or through a combination of software and a plurality of general-purpose processors such as AP, CPU or GPU. According to an embodiment of the disclosure, the first encoder 714 may be configured by a first processor, the AI down-scaler 712, the data processor 716, and the AI setter 718 may be configured by a second processor different from the first processor, and the transmitter 730 may be configured by a third processor different from the first processor and the second processor.

The AI encoder 710 performs AI down-scaling on the original image 105 and first encoding on the first image 115, and transmits AI encoding data to the transmitter 730. The transmitter 730 transmits the AI encoding data to the AI decoding apparatus 200.

Image data includes data obtained as a result of performing the first encoding on the first image 115. The image data may include data obtained based on pixel values in the first image 115, for example, residual data that is a difference between the first image 115 and prediction data of the first image 115. Also, the image data includes information used during a first encoding process of the first image 115. For example, the image data may include prediction mode information used to perform the first encoding on the first image 115, motion information, and quantization parameter information used to perform the first encoding on the first image 115.

AI data includes information enabling the AI up-scaler 236 to perform AI up-scaling on the second image 135 to an up-scaling target corresponding to a down-scaling target of a first NN.

According to an embodiment of the disclosure, the AI data may include difference information between the original image 105 and the first image 115.

According to an embodiment of the disclosure, the AI data may include information related to the first image 115. The information related to the first image 115 may include information about at least one of resolution of the first image 115, a bit rate of the image data obtained as a result of performing first encoding on the first image 115, or a codec type used during the first encoding of the first image 115.

According to an embodiment of the disclosure, the AI data may include an identifier of mutually agreed NN setting information such that the second image 135 is AI up-scaled to the up-scaling target corresponding to the down-scaling target of the first NN.

Also, according to an embodiment of the disclosure, the AI data may include NN setting information settable in a second NN.

The AI down-scaler 712 may obtain the first image 115 by performing AI down-scaling on the original image 105 through the first NN. The AI down-scaler 712 may perform AI down-scaling on the original image 105 by using the NN setting information provided from the AI setter 718.

The AI setter 718 may determine the down-scaling target of the original image 105, based on a pre-determined standard.

To obtain the first image 115 matching the down-scaling target, the AI setter 718 may store a plurality of pieces of NN setting information settable in the first NN. The AI setter 718 may obtain NN setting information corresponding to the down-scaling target from among the plurality of pieces of NN setting information, and provide the obtained NN setting information to the AI down-scaler 712.

Each of the plurality of pieces of NN setting information may be trained to obtain the first image 115 of pre-determined resolution and/or pre-determined quality. For example, one piece of NN setting information from among the plurality of pieces of NN setting information may include information for obtaining the first image 115 of resolution ½ times less than resolution of the original image 105, for example, the first image 115 of 2 K (2048×1080) ½ times less than 4 K (4096×2160) of the original image 105, and another piece of NN setting information may include information for obtaining the first image 115 of resolution ¼ times less than the resolution of the original image 105, for example, the first image 115 of 2 K (2048×1080) ¼ times less than 8 K (8192×4320) of the original image 105.

According to an embodiment of the disclosure, when pieces of information (for example, the number of convolution layers, the number of filter kernels for each convolution layer, a parameter of each filter kernel, and the like) configuring the NN setting information are stored in the form of a lookup table, the AI setter 718 may obtain the NN setting information by combining some values selected from values in the lookup table, based on the down-scaling target, and provide the obtained NN setting information to the AI down-scaler 712.

According to an embodiment of the disclosure, the AI setter 718 may determine a structure of NN corresponding to the down-scaling target, and obtain NN setting information corresponding to the determined structure of NN, for example, parameters of a filter kernel.

The plurality of pieces of NN setting information for performing the AI down-scaling on the original image 105 may have optimized values as the first NN and the second NN are jointly trained. Here, each piece of NN setting information includes at least one of the number of convolution layers included in the first NN, the number of filter kernels for each convolution layer, or a parameter of each filter kernel.

The AI down-scaler 712 may set the first NN based on the NN setting information determined for performing the AI down-scaling on the original image 105, and obtain the first image 115 of certain resolution and/or certain quality through the first NN. When the NN setting information for performing the AI down-scaling on the original image 105 is obtained from the plurality of pieces of NN setting information, each layer in the first NN may process input data based on information included in the NN setting information.

Hereinafter, a method by which the AI setter 718 determines the down-scaling target will be described. The down-scaling target may indicate, for example, by how much resolution needs to be decreased from the original image 105 to obtain the first image 115.

The AI setter 718 obtains one or more pieces of input information. According to an embodiment of the disclosure, the input information may include at least one of target resolution of the first image 115, a target bitrate of the image data, a bitrate type (for example, a variable bitrate type, a constant bitrate type, or an average bitrate type) of the image data, a color format (a luminance component, a chrominance component, a read component, a green component, or a blue component) to which AI down-scaling is applied, a codec type for first encoding of the first image 115, compression history information, resolution of the original image 105, or a type of the original image 105.

The one or more pieces of input information may include information pre-stored in the AI encoding apparatus 700 or input from a user.

The AI setter 718 controls operations of the AI down-scaler 712, based on the input information. According to an embodiment of the disclosure, the AI setter 718 may determine the down-scaling target based on the input information and provide NN setting information corresponding to the determined down-scaling target to the AI down-scaler 712.

According to an embodiment of the disclosure, the AI setter 718 may transmit at least a part of the input information to the first encoder 714 such that the first encoder 714 performs first encoding on the first image 115 by using a bit rate of a certain value, a bit rate of a certain type, and a certain codec.

According to an embodiment of the disclosure, the AI setter 718 may determine the down-scaling target, based on at least one of a compression ratio (for example, a target bitrate and a resolution difference between the original image 105 and the first image 115), compression quality (for example, a bitrate type), compression history information, or a type of the original image 105.

For example, the AI setter 718 may determine the down-scaling target based on the compression ratio or the compression quality, which is pre-set or input from the user.

As another example, the AI setter 718 may determine the down-scaling target by using the compression history information stored in the AI encoding apparatus 700. For example, based on the compression history information usable by the AI encoding apparatus 700, encoding quality or a compression ratio preferred by the user may be determined, and the down-scaling target may be determined based on the encoding quality determined based on the compression history information. For example, the resolution, quality, or the like of the first image 115 may be determined based on the encoding quality that has been used most often based on the compression history information.

As another example, the AI setter 718 may determine the down-scaling target based on the encoding quality that has been used more frequently than a certain threshold value (for example, average quality of encoding qualities that has been used more frequently than the certain threshold value), based on the compression history information.

As another example, the AI setter 718 may determine the down-scaling target, based on the resolution, type (for example, a file format), or the like of the original image 105.

According to an embodiment of the disclosure, when the original image 105 includes a plurality of frames, the AI setter 718 may independently obtain NN setting information for each of a certain number of frames, and provide the independently obtained NN setting information to the AI down-scaler 712.

For example, the AI setter 718 may divide the frames included in the original image 105 into a certain number of groups, and independently obtain NN setting information for each group. Same or different pieces of NN setting information may be obtained for each group. The number of frames included in the groups may be the same or different according to the each group.

As another example, the AI setter 718 may independently determine NN setting information for each frame included in the original image 105. Same or different pieces of NN setting information may be determined for each frame.

Hereinafter, an example of a structure of a first NN 800 on which AI down-scaling is based will be described.

Figure 8:
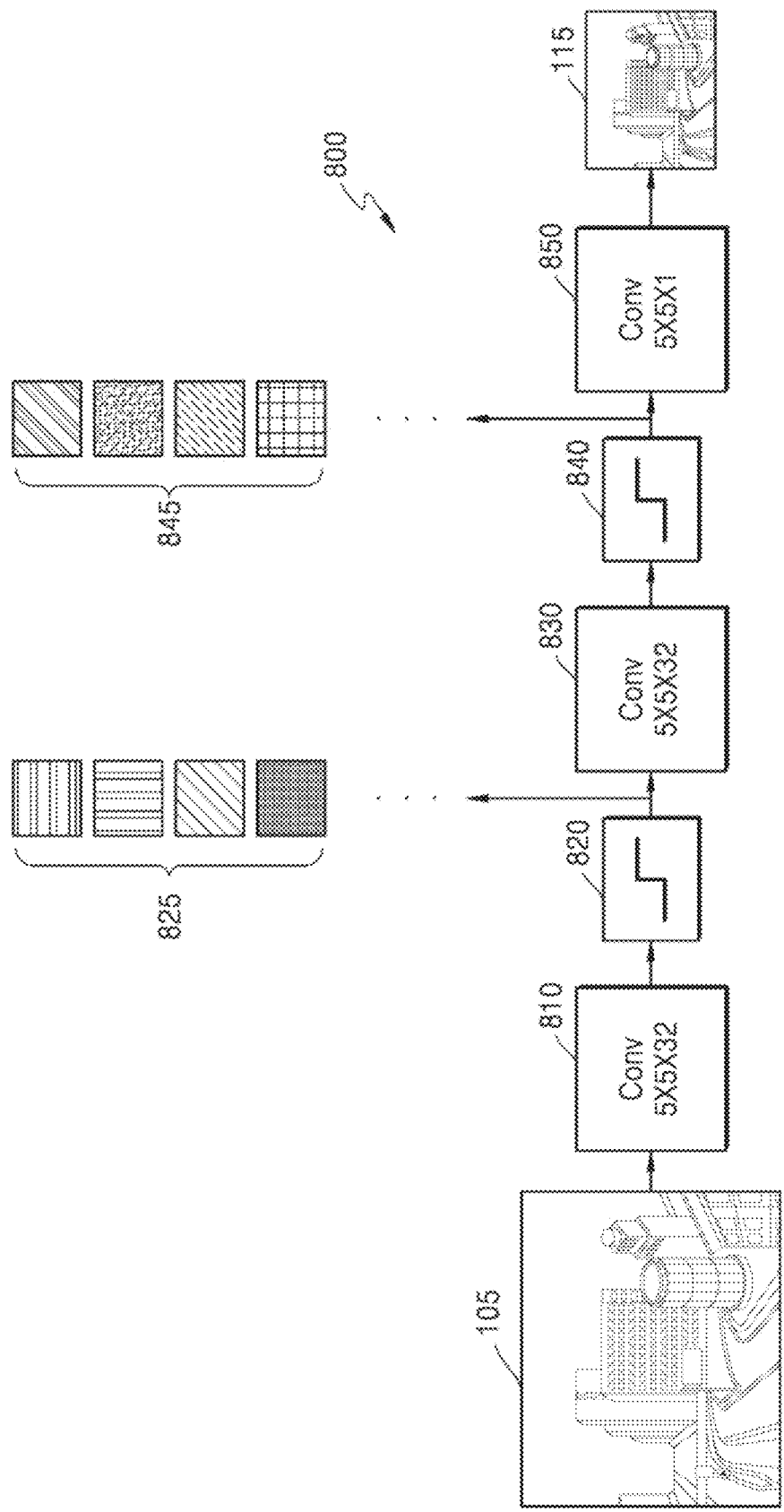
FIG. 8 is a diagram showing a first neural network for performing AI down-scaling on an original image.

FIG. 8 is a diagram showing the first NN 800 for performing AI down-scaling on the original image 105.

As shown in FIG. 8, the original image 105 is input to a first convolution layer 810. The first convolution layer 810 performs a convolution process on the original image 105 by using 32 filter kernels having a size of 5×5. 32 feature maps generated as a result of the convolution process are input to a first activation layer 820.

The first activation layer 820 may assign a non-linear feature to the 32 feature maps.

The first activation layer 8820 determines whether to transmit sample values of the feature maps output from the first convolution layer 810 to a second convolution layer 830. For example, some of the sample values of the feature maps are activated by the first activation layer 820 and transmitted to the second convolution layer 830, and some sample values are deactivated by the first activation layer 820 and not transmitted to the second convolution layer 830. Information indicated by the feature maps output from the first convolution layer 810 are emphasized by the first activation layer 820.

An output 825 of the first activation layer 820 is input to the second convolution layer 830. The second convolution layer 830 performs a convolution process on input data by using 32 filter kernels having a size of 5×5. 32 feature maps output as a result of the convolution process are input to a second activation layer 840, and the second activation layer 840 may assign a non-linear feature to the 32 feature maps.

An output 845 of the second activation layer 840 is input to a third convolution layer 850. The third convolution layer 850 performs a convolution process on input data by using one filter kernel having a size of 5×5. As a result of the convolution process, one image may be output from the third convolution layer 850. The third convolution layer 850 is a layer for outputting a final image, and obtains one output by using one filter kernel. According to an embodiment of the disclosure, the third convolution layer 850 may output the first image 115 as a result of a convolution operation.

There may be a plurality of pieces of NN setting information indicating the numbers of filter kernels of the first convolution layer 810, second convolution layer 830, and third convolution layer 850 of the first NN 800, parameters of the filter kernels thereof, and the like, and the plurality of pieces of NN setting information need to correspond to a plurality of pieces of NN setting information of a second NN. The correspondence between the plurality of pieces of NN setting information of the first NN and the plurality of pieces of NN setting information of the second NN may be realized through joint training of the first NN and the second NN.

In FIG. 8, the first NN 800 includes three convolution layers (the first, second, and third convolution layers 810, 830, and 850) and two activation layers (the first and second activation layers 820 and 840), but this is only an example, and the numbers of convolution layers and activation layers may vary according to an embodiment of the disclosure. Also, according to an embodiment of the disclosure, the first NN 800 may be implemented as an RNN. In this case, a CNN structure of the first NN 800 according to an embodiment of the disclosure is changed to an RNN structure.

According to an embodiment of the disclosure, the AI down-scaler 712 may include at least one ALU for the convolution operation and an operation of an activation layer. The ALU may be embodied as a processor. For the convolution operation, the ALU may include a multiplier for performing multiplication between sample values of a feature map output from the original image 105 or previous layer, and sample values of a filter kernel, and an adder for adding result values of the multiplication. Also, for the operation of the activation layer, the ALU may include a multiplier for multiplying an input sample value by a weight used in a pre-determined sigmoid function, Tanh function, or ReLU function, and a comparator for comparing a multiplication result with a certain value to determine whether to transmit the input sample value to a next layer.

Referring back to FIG. 7, the AI setter 718 transmits the AI data to the data processor 716. The AI data includes information enabling the AI up-scaler 236 to perform AI up-scaling on the second image 135 to the up-scaling target corresponding to the down-scaling target of the first NN.

Upon receiving the first image 115 from the AI down-scaler 712, the first encoder 714 may reduce an information amount of the first image 115 by performing first encoding on the first image 115 based on a frequency transformation-based image compression method. The image data is obtained as a result of the first encoding through a certain codec (for example, MPEG-2, H.264, MPEG-4, HEVC, VC-1, VP8, VP9, or AV1). The image data is obtained based on a rule of the certain codec, for example, syntax. The image data may include residual data that is a difference between the first image 115 and prediction data of the first image 115, prediction mode information used to perform first encoding on the first image 115, motion information, and quantization parameter information used to perform first encoding on the first image 115.

The image data obtained as a result of performing the first encoding by the first encoder 714 is provided to the data processor 716.

The data processor 716 generates AI encoding data including the image data received from the first encoder 714 and the AI data received from the AI setter 718.

According to an embodiment of the disclosure, the data processor 716 may generate the AI encoding data including the image data and the AI data in separated states. For example, the AI data may be included in VSIF in an HDMI stream.

According to an embodiment of the disclosure, the data processor 716 may include the AI data to the image data obtained as a result of performing the first encoding by the first encoder 714, and generate the AI encoding data including the image data. For example, the data processor 716 may generate the image data in the form of one bitstream by combining a bitstream corresponding to the image data and a bitstream corresponding to the AI data. In this regard, the data processor 716 may represent the AI data in bits having values of 0 or 1, i.e., in a bitstream. According to an embodiment of the disclosure, the data processor 716 may include the bitstream corresponding to the AI data to SEI that is an additional information region of a bitstream obtained as a result of the first encoding.

The AI encoding data is transmitted to the transmitter 730. The transmitter 730 transmits the AI encoding data obtained as a result of AI encoding, through a network.

According to an embodiment of the disclosure, the AI encoding data may be stored in a data storage medium including a magnetic medium such as a hard disk, a floppy disk, or a magnetic tape, an optical recording medium such as CD-ROM or DVD, or a magneto-optical medium such as a floptical disk.

Figure 9:
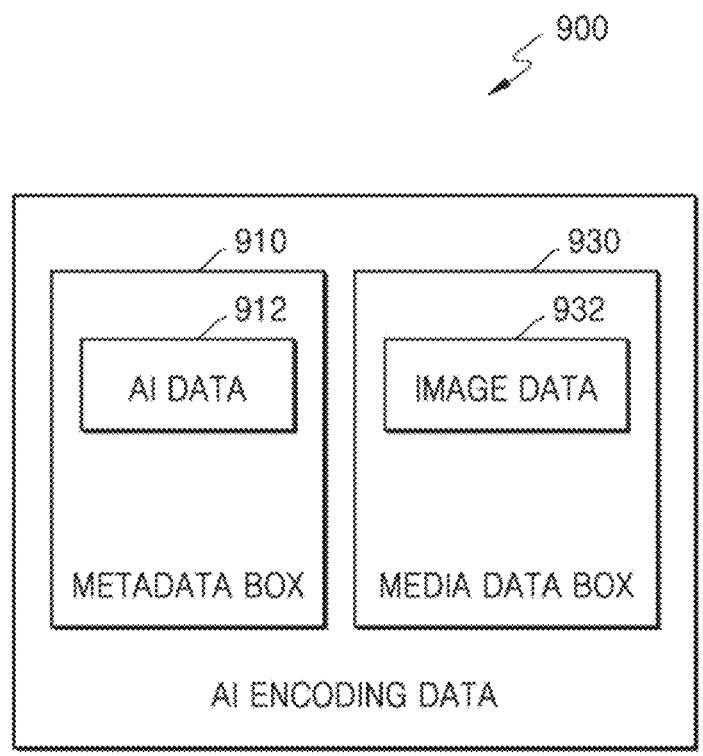
FIG. 9 is a diagram of a structure of AI encoding data, according to an embodiment of the disclosure.

FIG. 9 is a diagram of a structure of AI encoding data 900, according to an embodiment of the disclosure.

As described above, AI data 912 and image data 932 may be separately included in the AI encoding data 900. Here, the AI encoding data 900 may be in a container format, such as MP4, AVI, MKV, or FLV. The AI encoding data 900 may include a metadata box 910 and a media data box 930.

The metadata box 910 includes information about the image data 932 included in the media data box 930. For example, the metadata box 910 may include information about a type of the first image 115, a type of codec used to encode the first image 115, and a reproduction time of the first image 115. Also, the metadata box 910 may include the AI data 912. The AI data 912 may be stored in the metadata box 910 by being encoded based on an encoding method provided by a certain container format.

The media data box 930 may include the image data 932 generated based on syntax of a certain image compression method.

Figure 10:
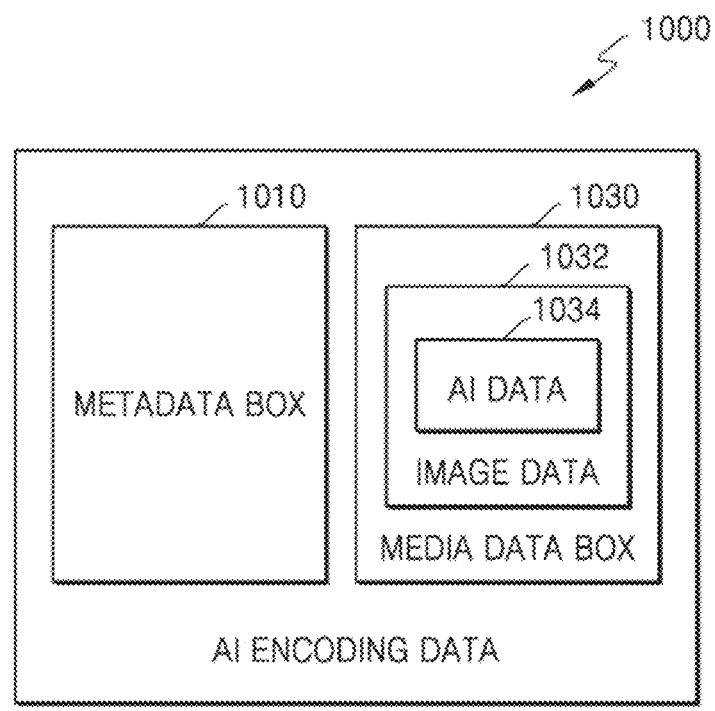
FIG. 10 is a diagram of a structure of AI encoding data, according to an embodiment of the disclosure.

FIG. 10 is a diagram of a structure of AI encoding data 1000, according to an embodiment of the disclosure.

Referring to FIG. 10, AI data 1034 may be included in image data 1032. The AI encoding data 1000 may include a metadata box 1010 and a media data box 1030, and when the AI data 1034 is included in the image data 1032, the metadata box 1010 may not include the AI data 1034.

The media data box 1030 includes the image data 1032 including the AI data 1034. For example, the AI data 1034 may be included in an additional information region of the image data 1032.

Hereinafter, a method of jointly training the first NN 800 and the second NN 300 will be described with reference to FIG. 11.

Figure 11:
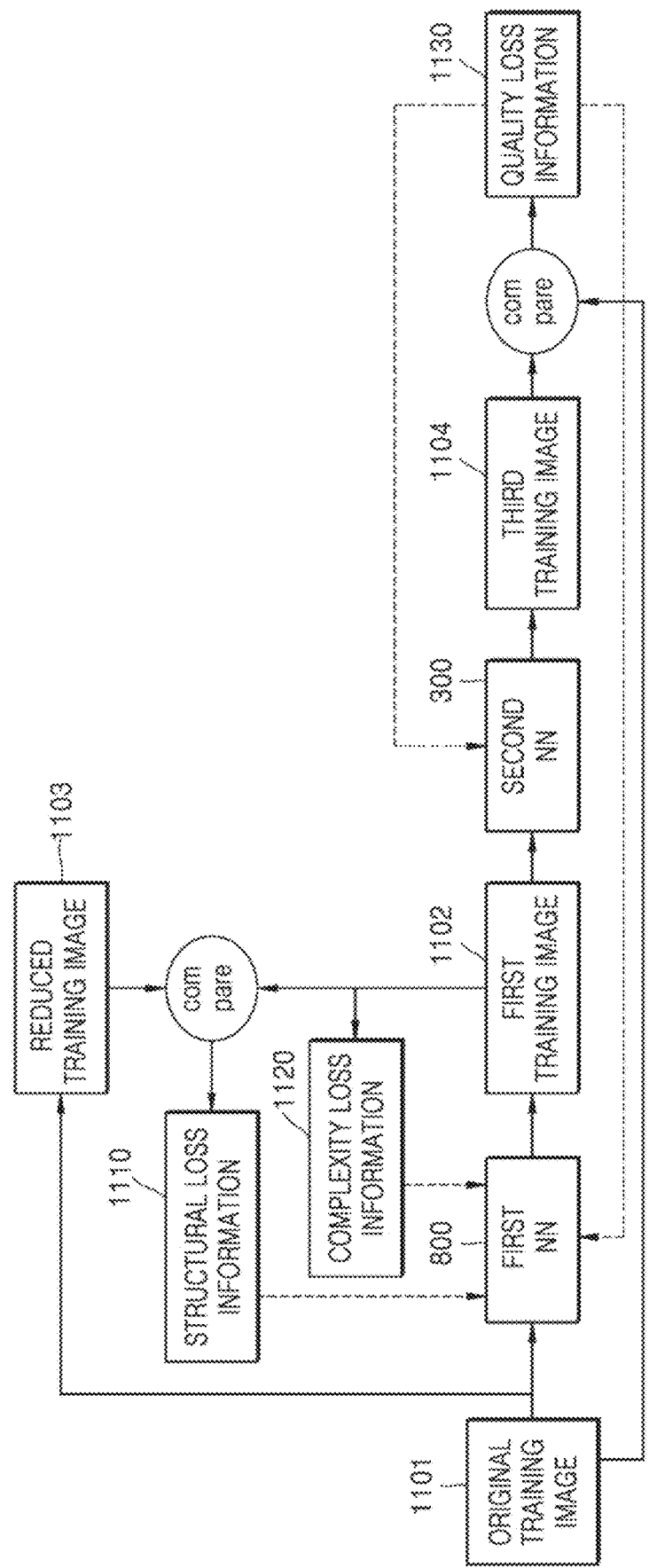
FIG. 11 is a diagram for describing a method of training a first neural network and a second neural network.

FIG. 11 is a diagram for describing a method of training the first NN 800 and the second NN 300.

In an embodiment of the disclosure, the original image 105 on which AI encoding is performed through an AI encoding process is reconstructed to the third image 145 through an AI decoding process, and to maintain similarity between the original image 105 and the third image 145 obtained as a result of AI decoding, a correlation between the AI encoding process and the AI decoding process is required. In other words, information lost during the AI encoding process needs to be reconstructed during the AI decoding process, and in this regard, the first NN 800 and the second NN 300 need to be jointly trained.

For accurate AI decoding, quality loss information 1130 corresponding to a result of comparing a third training image 1104 and an original training image 1101 shown in FIG. 11 needs to be reduced ultimately. Accordingly, the quality loss information 1130 is used to train both the first NN 800 and the second NN 300.

First, a training process shown in FIG. 11 will be described.

In FIG. 11, the original training image 1101 is an image on which AI down-scaling is to be performed and a first training image 1102 is an image obtained by performing AI down-scaling on the original training image 1101. Also, the third training image 1104 is an image obtained by performing AI up-scaling on the first training image 1102.

The original training image 1101 includes a still image or a moving image including a plurality of frames. According to an embodiment of the disclosure, the original training image 1101 may include a luminance image extracted from the still image or the moving image including the plurality of frames. Also, according to an embodiment of the disclosure, the original training image 1101 may include a patch image extracted from the still image or the moving image including the plurality of frames. When the original training image 1101 includes the plurality of frames, the first training image 1102, a second training image, and the third training image 1104 may also include pluralities of frames. When the plurality of frames of the original training image 1101 are sequentially input to the first NN 800, pluralities of frames of the first training image 1102, the second training image, and the third training image 1104 may be sequentially obtained through the first NN 800 and the second NN 300.

For joint training of the first NN 800 and the second NN 300, the original training image 1101 is input to the first NN 800. The original training image 1101 input to the first NN 800 is output as the first training image 1102 through the AI down-scaling, and the first training image 1102 is input to the second NN 300. The third training image 1104 is output as a result of performing the AI up-scaling on the first training image 1102.

Referring to FIG. 11, the first training image 1102 is input to the second NN 300, and according to an embodiment of the disclosure, the second training image obtained as first encoding and first decoding are performed on the first training image 1102 may be input to the second NN 300. To input the second training image to the second NN, any one codec from among MPEG-2, H.264, MPEG-4, HEVC, VC-1, VP8, VP9, and AV1 may be used. In detail, any one codec from among MPEG-2, H.264, MPEG-4, HEVC, VC-1, VP8, VP9, and AV1 may be used to perform first encoding on the first training image 1102 and first decoding on image data corresponding to the first training image 1102.

Referring to FIG. 11, separately from the first training image 1102 being output through the first NN 800, a reduced training image 1103 obtained by performing legacy down-scaling on the original training image 1101 is obtained. Here, the legacy down-scaling may include at least one of bilinear scaling, bicubic scaling, Lanczos scaling, or stair step scaling.

To prevent a structural feature of the first image 115 from deviating greatly from a structural feature of the original image 105, the reduced training image 1103 is obtained to preserve the structural feature of the original training image 1101.

Before training is performed, the first NN 800 and the second NN 300 may be set to pre-determined NN setting information. When the training is performed, structural loss information 1110, complexity loss information 1120, and the quality loss information 1130 may be determined.

The structural loss information 1110 may be determined based on a result of comparing the reduced training image 1103 with the first training image 1102. For example, the structural loss information 1110 may correspond to a difference between structural information of the reduced training image 1103 and structural information of the first training image 1102. The structural information may include various features extractable from an image, such as luminance, contrast, histogram, or the like of the image. The structural loss information 1110 indicates how much structural information of the original training image 1101 is maintained in the first training image 1102. When the structural loss information 1110 is small, the structural information of the first training image 1102 is similar to the structural information of the original training image 1101.

The complexity loss information 1120 may be determined based on spatial complexity of the first training image 1102. For example, a total variance value of the first training image 1102 may be used as the spatial complexity. The complexity loss information 1120 is related to a bitrate of the image data obtained by performing the first encoding on the first training image 1102. It is defined that the bitrate of the image data is low when the complexity loss information 1120 is small.

The quality loss information 1130 may be determined based on a result of comparing the original training image 1101 with the third training image 1104. The quality loss information 1130 may include at least one of a L1-norm value, a L2-norm value, a structural similarity (SSIM) value, a peak signal-to-noise ratio-human vision system (PSNR-HVS) value, a multiscale SSIM (MS-SSIM) value, a variance inflation factor (VIF) value, or a video multimethod assessment fusion (VMAF) value regarding a difference between the original training image 1101 and the third training image 1104. The quality loss information 1130 indicates how similar the third training image 1104 is to the original training image 1101. The third training image 1104 is more similar to the original training image 1101 when the quality loss information 1130 is small.

Referring to FIG. 11, the structural loss information 1110, the complexity loss information 1120, and the quality loss information 1130 are used to train the first NN 800, and the quality loss information 1130 is used to train the second NN 300. In other words, the quality loss information 1130 is used to train both the first NN 800 and the second NN 300.

The first NN 800 may update a parameter such that final loss information determined based on the structural loss information 1110, the complexity loss information 1120, and the quality loss information 1130 is reduced or minimized. Also, the second NN 300 may update a parameter such that the quality loss information 1130 is reduced or minimized.

The final loss information for training the first NN 800 and the second NN 300 may be determined as Equation 1 below.

$$\text{LossDS} = a \times \text{Structural Loss Information} + b \times \text{Complexity Loss Information} + c \times \text{Quality Loss Information}$$

$$\text{LossUS} = d \times \text{Quality Loss Information} \qquad [\text{EQN. 1}]$$

In Equation 1, LossDS indicates final loss information to be reduced or minimized to train the first NN 800, and LossUS indicates final loss information to be reduced or minimized to train the second NN 300. Also, a, b, c, and d may correspond to pre-determined certain weights.

In other words, the first NN 800 updates parameters in a direction LossDS of Equation 1 is reduced, and the second NN 300 updates parameters in a direction LossUS is reduced. When the parameters of the first NN 800 are updated based on LossDS derived during the training process, the first training image 1102 obtained based on the updated parameters becomes different from the first training image 1102 of a previous training process, and accordingly, the third training image 1104 also becomes different from the third training image 1104 of the previous training process. When the third training image 1104 becomes different from the third training image 1104 of the previous training process, the quality loss information 1130 is also newly determined, and the second NN 300 updates the parameters accordingly. When the quality loss information 1130 is newly determined, LossDS is also newly determined, and the first NN 800 updates the parameters based on newly determined LossDS. In other words, the updating of the parameters of the first NN 800 leads to the updating of the parameters of the second NN 300, and the updating of the parameters of the second NN 300 leads to the updating of the parameters of the first NN 800. In other words, because the first NN 800 and the second NN 300 are jointly trained by sharing the quality loss information 1130, the parameters of the first NN 800 and the parameters of the second NN 300 may be optimized with a correlation.

Referring to Equation 1, LossUS is determined based on the quality loss information 1130, but this is only an example and LossUS may be determined based on the quality loss information 1130 and at least one of the structural loss information 1110 or the complexity loss information 1120.

Hereinabove, it has been described that the AI setter 238 of the AI decoding apparatus 200 and the AI setter 718 of the AI encoding apparatus 700 store the plurality of pieces of NN setting information, and methods of training each of the plurality of pieces of NN setting information stored in the AI setter 238 and the AI setter 718 will now be described.

As described with reference to Equation 1, the first NN 800 updates the parameters considering the similarity (the structural loss information 1110) between the structural information of the first training image 1102 and the structural information of the original training image 1101, the bitrate (the complexity loss information 1120) of the image data obtained as the result of performing the first encoding on the first training image 1102, and the difference (the quality loss information 1130) between the third training image 1104 and the original training image 1101.

In particular, the parameters of the first NN 800 may be updated such that the first training image 1102 having similar structural information as the original training image 1101 is obtainable, wherein a bit rate of the image data obtained when the first encoding is performed on the first training image 1102 is small, and at the same time, the second NN 300 performing AI up-scaling on the first training image 1102 obtains the third training image 1104 similar to the original training image 1101.

A direction in which the parameters of the first NN 800 are optimized may vary by adjusting the weights a, b, and c of Equation 1. For example, when the weight b is determined to be high, the parameters of the first NN 800 may be updated by prioritizing a low bitrate over high quality of the third training image 1104. Also, when the weight c is determined to be high, the parameters of the first NN 800 may be updated by prioritizing high quality of the third training image 1104 over a high bitrate or maintaining the structural information of the original training image 1101.

Also, the direction in which the parameters of the first NN 800 are optimized may vary based on a type of codec used to perform the first encoding on the first training image 1102. This is because the second training image to be input to the second NN 300 may vary based on the type of codec.

In other words, the parameters of the first NN 800 and the parameters of the second NN 300 may be jointly updated based on the weights a, b, and c, and the type of codec for performing the first encoding on the first training image 1102. Accordingly, when the first NN 800 and the second NN 300 are trained after determining the weights a, b, and c each to a certain value and determining the type of codec to a certain type, the parameters of the first NN 800 and the parameters of the second NN 300 jointly optimized may be determined.

Also, when the first NN 800 and the second NN 300 are trained after changing the weights a, b, and c, and the type of codec, the parameters of the first NN 800 and the parameters of the second NN 300 jointly optimized may be determined. In other words, the plurality of pieces of NN setting information jointly trained with each other may be determined in the first NN 800 and the second NN 300 when the first NN 800 and the second NN 300 are trained while changing values of the weights a, b, and c, and the type of codec.

As described above with reference to FIG. 5, the pluralities of pieces of NN setting information of the first NN 800 and second NN 300 may be mapped to pieces of information related to a first image. To set such a mapping relationship, first encoding may be performed on the first training image 1102 output from the first NN 800, based on a certain bitrate and in a certain codec, and the second training image obtained by performing first decoding on a bitstream obtained as a result of the first encoding may be input to the second NN 300. In other words, the first NN 800 and the second NN 300 are trained after setting a configuration such that first encoding is performed on the first training image 1102 of certain resolution, based on a certain bitrate by a certain codec, thereby determining a pair of pieces of NN setting information mapped to the resolution of the first training image 102, the type of codec used to perform the first encoding on the first training image 1102, and the bitrate of the bitstream obtained as the result of performing the first encoding on the first training image 1102. The mapping relationship between the pluralities of pieces of NN setting information of the first NN 800 and second NN 300, and the pieces of information related to the first image may be determined by variously changing the resolution of the first training image 1102, the type of codec used to perform the first encoding on the first training image 1102, and the bitrate of the bitstream obtained as the result of performing the first encoding on the first training image 1102.

Figure 12:
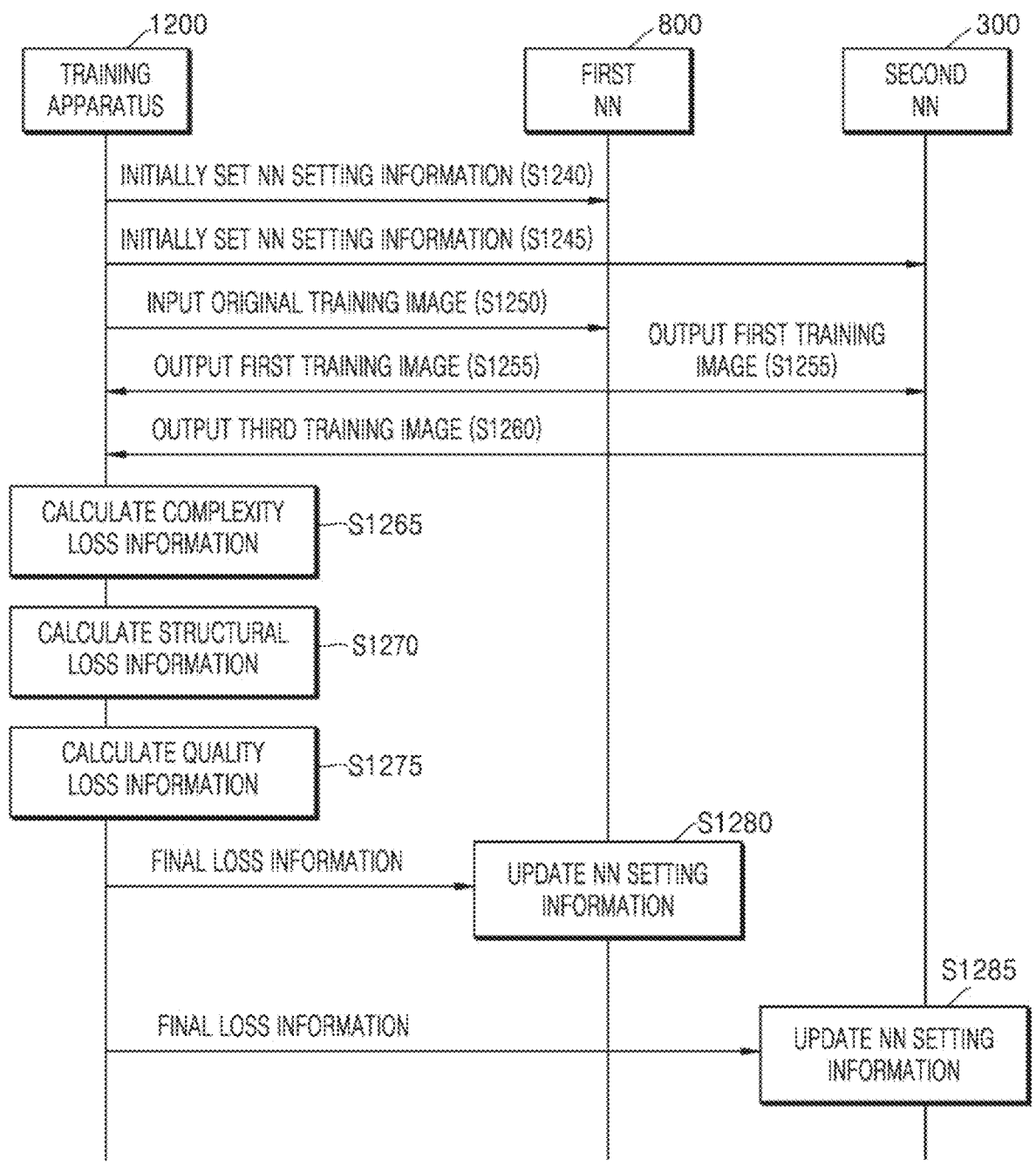
FIG. 12 is a diagram for describing processes by which a training apparatus trains a first neural network and a second neural network.

FIG. 12 is a diagram for describing processes by which a training apparatus 1200 trains the first NN 800 and the second NN 300.

The training of the first NN 800 and second NN 300 described with reference to FIG. 11 may be performed by the training apparatus 1200. The training apparatus 1200 includes the first NN 800 and the second NN 300. The training apparatus 1200 may be, for example, the AI encoding apparatus 700 or a separate server. Pieces of NN setting information of the second NN 300, which are obtained as a result of training, are stored in the AI decoding apparatus 200.

Referring to FIG. 12, the training apparatus 1200 initially sets pieces of NN setting information of the first NN 800 and second NN 300 (operations S1240 and S1245). Accordingly, the first NN 800 and the second NN 300 may perform based on pre-determined NN setting information. The NN setting information may include information about at least one of the numbers of convolution layers included in the first NN 800 and second NN 300, the number of filter kernels for each convolution layer, a size of a filter kernel for each convolution layer, or a parameter of each filter kernel.

The training apparatus 1200 inputs the original training image 1101 to the first NN 800 (operation S1250). The original training image 1101 may include a still image or at least one frame configuring a moving image.

The first NN 800 processes the original training image 1101 based on the initially set NN setting information, and outputs the first training image 1102 obtained by performing AI down-scaling on the original training image 1101 (operation S1255). FIG. 12 illustrates as if the first training image 1102 output from the first NN 800 is directly input to the second NN 300, but the first training image 1102 output from the first NN 800 may be input to the second NN 300 by the training apparatus 1200. Also, the training apparatus 1200 may perform first encoding and first decoding on the first training image 1102 by using a certain codec, and input the second training image to the second NN 300.

The second NN 300 processes the first training image 1102 or second training image based on the initially set NN setting information, and outputs the third training image 1104 obtained by performing AI up-scaling on the first training image 1102 or second training image (operation S1260).

The training apparatus 1200 calculates the complexity loss information 1120, based on the first training image 1102 (operation S1265).

The training apparatus 1200 calculates the structural loss information 1110 by comparing the reduced training image 1103 and the first training image 1102 (operation S1270).

The training apparatus 1200 calculates the quality loss information 1130 by comparing the original training image 1101 and the third training image 1104 (operation S1275).

The first NN 800 updates the initially set NN setting information through a back propagation process based on final loss information (operation S1280). The training apparatus 1200 may calculate the final loss information for training the first NN 800, based on the complexity loss information 1120, the structural loss information 1110, and the quality loss information 1130.

The second NN 300 updates the initially set NN setting information through a back propagation process based on the quality loss information 1130 or the final loss information (operation S1285). The training apparatus 1200 may calculate the final loss information for training the second NN 300, based on the quality loss information 1130.

Then, the training apparatus 1200, the first NN 800, and the second NN 300 update the NN setting information while repeating operations S1250 and S1285 until the pieces of final loss information are minimized. Here, during each repetition, the first NN 800 and the second NN 300 operate based on the NN setting information updated during a previous process.

Table 1 below shows effects when AI encoding and AI decoding are performed on the original image 105, based on an embodiment of the disclosure, and when encoding and decoding are performed on the original image 105 based on HEVC.

TABLE 1

| Content | Resolution | Number of Frames | Information Amount (Bitrate) (Mbps) | | Subjective Image Quality Score (VMAF) | |
| --- | --- | --- | --- | --- | --- | --- |
| | | | HEVC | AI Encoding/ AI Decoding | HEVC | AI Encoding/ AI Decoding |
| Content_01 | 8K | 300 Frames | 46.3 | 21.4 | 94.80 | 93.54 |
| Content_02 | (7680 × 4320) | | 46.3 | 21.6 | 98.05 | 98.98 |
| Content_03 | | | 46.3 | 22.7 | 96.08 | 96.00 |
| Content_04 | | | 46.1 | 22.1 | 86.26 | 92.00 |
| Content_05 | | | 45.4 | 22.7 | 93.42 | 92.98 |
| Content_06 | | | 46.3 | 23.0 | 95.99 | 95.61 |
| | | Average | 46.11 | 22.25 | 94.10 | 94.85 |

As shown in Table 1, despite that an average of subjective image qualities obtained when AI encoding and AI decoding are performed on content including 300 frames of resolution of 8 K, according to an embodiment of the disclosure, is higher than an average of subjective image qualities obtained when encoding and decoding are performed based on HEVC, a bitrate according to the embodiment of the disclosure is reduced by at least 50%.

The AI encoding apparatus 700 and the AI decoding apparatus 200 may be useful in a server-client (server-terminal) structure. In detail, a server obtains the first image 115 by performing AI down-scaling on the original image 105 based on an image request of a client, and transmits AI encoding data including image data obtained as a result of encoding the first image 115 to the client.

The client obtains the second image 135 by decoding the image data, and displays the third image 145 obtained by performing AI up-scaling on the second image 135.

Hereinafter, AI encoding/decoding processes (or image data streaming processes) for preventing a quality loss caused by excessive down-scaling and efficiently using a network resource, considering a window size corresponding to at least one view among a multi-view will be described with reference to FIGS. 13 through 24.

Figure 13:
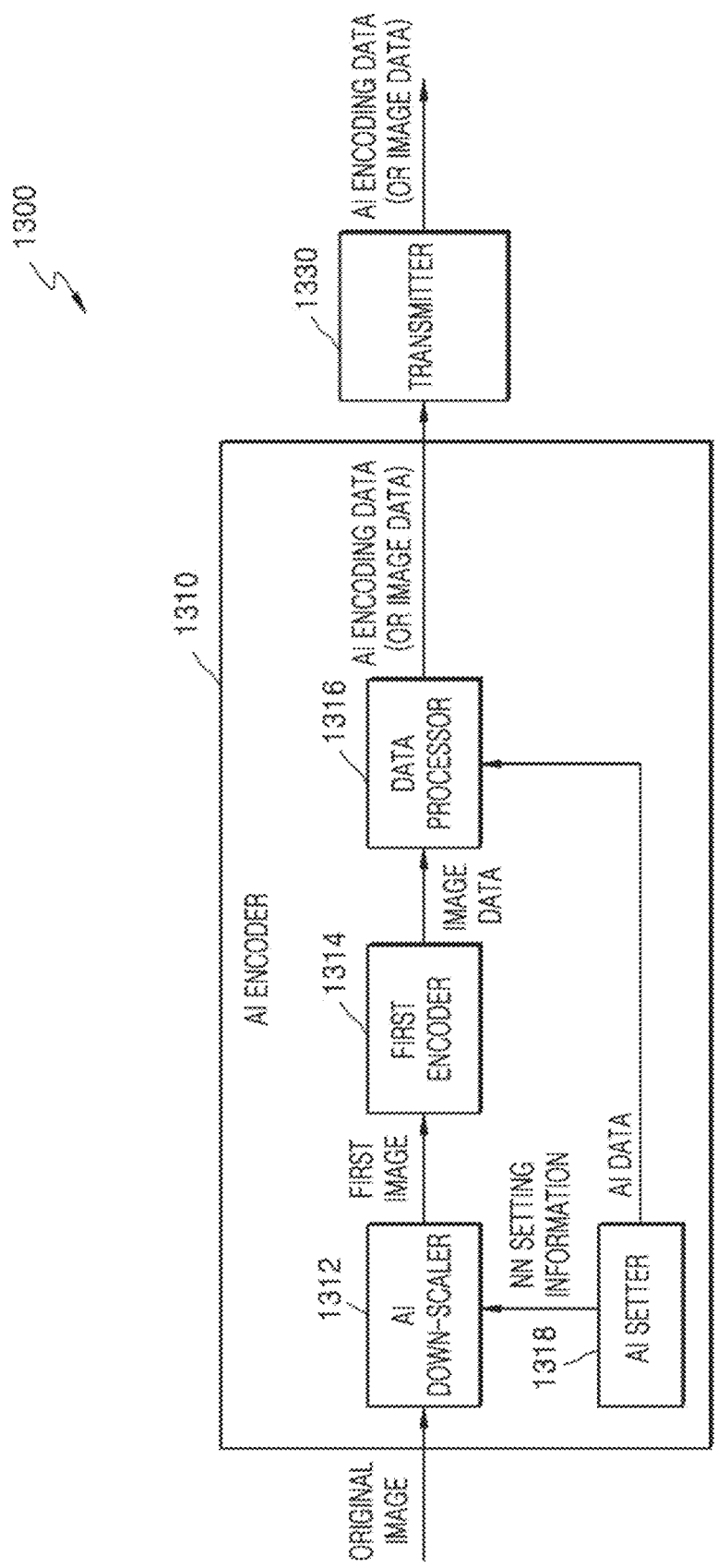
FIG. 13 is a block diagram of a configuration of an image providing apparatus (or an AI encoding apparatus), according to an embodiment of the disclosure.

FIG. 13 is a block diagram of a configuration of an image providing apparatus 1300, according to an embodiment of the disclosure.

According to an embodiment of the disclosure, the image providing apparatus 1300 may also be referred to as an AI encoding apparatus.

Referring to FIG. 13, the image providing apparatus 1300 may include an AI encoder 1310 and a transmitter 1330. The AI encoder 1310 may include an AI down-scaler 1312, a first encoder 1314, a data processor 1316, and an AI setter 1318.

In FIG. 13, the AI encoder 1310 and the transmitter 1330 are illustrated as separate devices, but the AI encoder 1310 and the transmitter 1330 may be realized through one processor. In this case, the AI encoder 1310 and the transmitter 1330 may be realized through a dedicated processor or through a combination of software and a general-purpose processor, such as AP, CPU or GPU. The dedicated processor may include a memory for implementing an embodiment of the disclosure or include a memory processor for using an external memory.

Also, the AI encoder 1310 and the transmitter 1330 may be configured by a plurality of processors. In this case, the AI encoder 1310 and the transmitter 1330 may be realized through a combination of dedicated processors or through a combination of software and a plurality of general-purpose processors such as AP, CPU or GPU.

According to an embodiment of the disclosure, the first encoder 1314 may be configured by a first processor, the AI down-scaler 1312, the data processor 1316, and the AI setter 1318 may be configured by a second processor different from the first processor, and the transmitter 1330 may be configured by a third processor different from the first processor and the second processor.

The AI encoder 1310 obtains the original image 105. The AI encoder 1310 may obtain the original image 105 captured by a camera of the image providing apparatus 1300 (or a camera connected to the image providing apparatus 1300), or obtain the original image 105 received from an external device through a network.

The AI encoder 1310 may obtain performance information of a display apparatus (for example, an AI decoding apparatus, an electronic device, or a terminal) for reproducing an image. Upon receiving a request to provide an image from the display apparatus or a user, the AI encoder 1310 may obtain the performance information of the display apparatus.

The performance information of the display apparatus may be received from the display apparatus or input by the user.

Although not shown in FIG. 13, the image providing apparatus 1300 may further include a receiver (not shown) for receiving the original image 105 and the performance information of the display apparatus.

According to an embodiment of the disclosure, the performance information of the display apparatus may include information indicating whether an AI up-scaling function is supported.

The AI encoder 1310 may perform AI encoding on the original image 105 based on whether the display apparatus supports the AI up-scaling function.

According to an embodiment of the disclosure, when the display apparatus supports the AI up-scaling function, the AI encoder 1310 may perform at least one of AI down-scaling or first encoding depending on whether the request received from the display apparatus is a request to provide an image on which first encoding is performed after AI down-scaling or a request to provide an image on which first encoding is performed without AI down-scaling, and transmit AI encoding data or encoding data to the display apparatus.

Hereinafter, operations of the components included in the AI encoder 1310 will be described in detail.

The AI down-scaler 1312 obtains the first image 115 by AI down-scaling the original image 105. The AI down-scaler 1312 may AI down-scale the original image 105 through a first NN to which NN setting information is applied. The first NN used by the AI down-scaler 1312 may have a structure of the first NN 800 of FIG. 8, but the structure of the first NN is not limited to the first NN 800 of FIG. 8.

Hereinafter, NN setting information applicable to the first NN for AI down-scaling will be referred to as first NN setting information, and NN setting information applicable to a second NN for AI up-scaling will be referred to as second NN setting information. The first NN setting information (or the second NN setting information) may include information about at least one of the number of convolution layers included in the first NN (or the second NN), the number of filter kernels for each convolution layer, or a parameter of each filter kernel.

The AI setter 1318 provides the first NN setting information for AI down-scaling to the AI down-scaler 1312 to control the AI down-scaler 1312 to AI down-scale the original image 105 based on the first NN setting information.

The number of pieces of first NN setting information stored in the AI setter 1318 may be one or more. When one piece of first NN setting information is stored in the AI setter 1318, the AI setter 1318 may transmit one piece of first NN setting information to the AI down-scaler 1312. When a plurality of pieces of first NN setting information are stored in the AI setter 1318, the AI setter 1318 may select first NN setting information to be used for AI down-scaling from among the plurality of pieces of first NN setting information and transmit the selected first NN setting information to the AI down-scaler 1312.

The AI setter 1318 provides AI data related to the AI down-scaling of the original image 105 to the data processor 1316. As described above, the AI data includes information enabling an AI up-scaler of the display apparatus to perform AI up-scaling on the second image 135 to an up-scaling target corresponding to a down-scaling target of the first NN.

For example, the AI data may include difference information between the original image 105 and the first image 115.

As another example, the AI data may include information related to the first image 115. The information related to the first image 115 may include information about at least one of resolution of the first image 115, a bit rate of first image data obtained as a result of encoding on the first image 115, or a codec type used during the encoding of the first image 115.

As another example, the AI data may include an identifier (for example, an index) of mutually agreed NN setting information such that the second image 135 is AI up-scaled to the up-scaling target corresponding to the down-scaling target of the first NN.

As another example, the AI data may include second NN setting information settable in the second NN.

According to an embodiment of the disclosure, the original image 105 may be encoded without AI down-scaling. This may be understood as the AI down-scaler 1312 bypassing an AI down-scaling operation regarding the original image 105.

The first encoder 1314 encodes the first image 115 to obtain the first image data. The first image data generated by the first encoder 1314 may be stored in a storage medium of the image providing apparatus 1300.

The first image data includes data obtained as a result of encoding the first image 115. The first image data may include data obtained based on pixel values in the first image 115, for example, residual data that is a difference between the first image 115 and prediction data of the first image 115. Also, the first image data includes pieces of information (for example, encoding parameter information) used during an encoding process of the first image 115. For example, the first image data may include prediction mode information used to encode the first image 115, motion information, and quantization parameter information used to encode the first image 115.

When the image provision request is received from the display apparatus or the user and the display apparatus supports the AI up-scaling function, the first image data and AI data may be provided from the first encoder 1314 and AI setter 1318 to the data processor 1316.

According to an embodiment of the disclosure, the original image 105 may be encoded without AI down-scaling, based on the image provision request. Here, the first encoder 1314 may generate second image data by performing first encoding on the original image 105, instead of the first image 115. The second image data may be provided from the first encoder 1314 to the data processor 1316. At this time, AI data may not be generated.

The data processor 1316 may generate AI encoding data including the first image data received from the first encoder 1314 and the AI data received from the AI setter 1318.

According to an embodiment of the disclosure, the data processor 1316 may generate the AI encoding data including the first image data and the AI data in separated states. For example, the AI data may be included in VSIF in an HDMI stream.

According to an embodiment of the disclosure, the data processor 1316 may include the AI data to the first image data obtained as a result of encoding by the first encoder 1314, and generate the AI encoding data from the first image data including the AI data. For example, the data processor 1316 may generate image data in the form of one bitstream by combining a bitstream corresponding to the first image data and a bitstream corresponding to the AI data. In this regard, the data processor 1316 may represent the AI data in bits having values of 0 or 1, i.e., in a bitstream. According to an embodiment of the disclosure, the data processor 1316 may include the bitstream corresponding to the AI data to SEI that is an additional information region of a bitstream obtained as a result of the encoding.

According to an embodiment of the disclosure, the data processor 1316 may generate encoding data including the second image data.

The AI encoding data or encoding data is transmitted to the transmitter 1330. As described above, the AI encoding data may include the AI data and the first image data. Also, the encoding data may include the second image data.

The transmitter 1330 transmits the encoding data or the AI encoding data obtained as a result of AI encoding to the display apparatus through a network.

Hereinafter, a process of transmitting encoded image data (the AI encoding data or encoding data) based on a request to provide information indicating image data of a plurality of qualities will be described.

A receiver (not shown) of the image providing apparatus 1300 may receive, from the display apparatus, the request for the information indicating the image data of the plurality of qualities. The transmitter 1330 may transmit, to the display apparatus, the information indicating the image data of the plurality of qualities, based on the request for the information indicating the image data of the plurality of qualities. Here, the image data of the plurality of qualities may include at least one piece of image data encoded after AI down-scaling and at least one piece of image data encoded without AI down-scaling.

The receiver may receive, from the display apparatus, a request for an encoded image, based on the information indicating the image data of the plurality of qualities. In other words, the receiver may receive, from the display apparatus, a request for image data of one quality among the image data of the plurality of qualities.

The transmitter 1330 may transmit, to the display apparatus, the encoded image data based on the request for the image data, the request being received from the display apparatus.

Hereinafter, a process of transmitting the image data to the display apparatus based on a request for an image having a size smaller than a size of a previous image will be described.

It is presupposed that a request for image data is generated based on a size of an image reconstructed from image data corresponding to the previous image and a size of a first window. Here, the first window may be a graphics user interface for displaying an image on a display of the display apparatus. The size of the first window may be adjusted by the user and a size of an image displayed on the first window may be adjusted based on the size of the first window.

Based on a request for a first current image of the display apparatus, the transmitter 1330 may transmit image data of the first current image to the display apparatus. The image data of the first current image may be obtained by performing first encoding on the first current image.

The display apparatus may transmit the request for the first current image to the display apparatus such that a size of an image to be reconstructed from the image data of the first current image is equal to or greater than the size of the first window and equal to or less than a size of a target largest image.

A size of the target largest image may be determined based on the size of the first window and a limiting down-scale ratio. Here, the size of the first current image may be less than a size of the previous image. The size of the image to be reconstructed from the image data of the first current image by the display apparatus may be less than the size of the image reconstructed from the image data of the previous image. Alternatively, the size of the first current image may be the same as the size of the previous image, but the AI data may not be included in a bitstream related to the first current image.

Hereinafter, a process of transmitting encoded image data based on an image provision request of the display apparatus, based on a window size and a size of a third previous image will be described. Here, the third previous image may be an image obtained by AI up-scaling a second previous image. The second previous image may be an image obtained by performing first decoding on image data of the first previous image. The first previous image may be an image obtained by AI down-scaling a previous original image.

Based on the image provision request of the display apparatus, based on the window size for at least one view among a multi-view and the size of the third previous image, the transmitter 1330 may 1) transmit, to the display apparatus, image data of the first current image obtained by performing first encoding on a current original image after AI down-scaling, and AI data related to the AI down-scaling to the first current image, or 2) transmit the image data of the first current image obtained by performing first encoding on the current original image without AI down-scaling.

For example, when a down-scale ratio between the size of the third previous image and the window size is equal to or less than a certain first threshold value (or when a scale ratio is equal to or greater than the certain first threshold value), the display apparatus may transmit, to the image providing apparatus 1300, a request for a current image obtained by performing first encoding on the current original image without AI down-scaling. Here, the scale ratio may be a reciprocal number of the down-scale ratio. The down-scale ratio between the size of the third previous image and the window size may denote a ratio between the size of the third previous image and a size of a window. The down-scale ratio may decrease when the size of the third previous image is greater than the size of the window.

Based on the request for the current image, the transmitter 1330 may transmit, to the display apparatus, the image data of the first current image, which is obtained by performing first encoding on the current original image without AI down-scaling.

When the down-scale ratio is greater than the certain first threshold value (or when the scale ratio is less than the certain first threshold value), the display apparatus may transmit, to the image providing apparatus 1300, the request for the first current image obtained by performing first encoding on the current original image after AI down-scaling.

Based on the request for the first current image, the transmitter 1330 may transmit, to the image providing apparatus 1300, the image data of the first current image generated as a result of performing first encoding on the current original image after AI down-scaling, and the AI data related to the AI down-scaling.

According to an embodiment of the disclosure, the image providing apparatus 1300 is not limited to streaming image data based on a network state, but streams the image data considering a size of a window for at least one view among a multi-view when the display apparatus supports the multi-view, thereby efficiently using a bandwidth and preventing a quality loss caused by down-scaling.

According to an embodiment of the disclosure, the image providing apparatus 1300 is not limited to streaming image data based on a network state, but streams the image data in which AI down-scaling is bypassed, considering a size of a window for at least one view among a multi-view when the display apparatus supports the multi-view, thereby efficiently using a bandwidth and preventing a quality loss caused by down-scaling.

Figure 14:
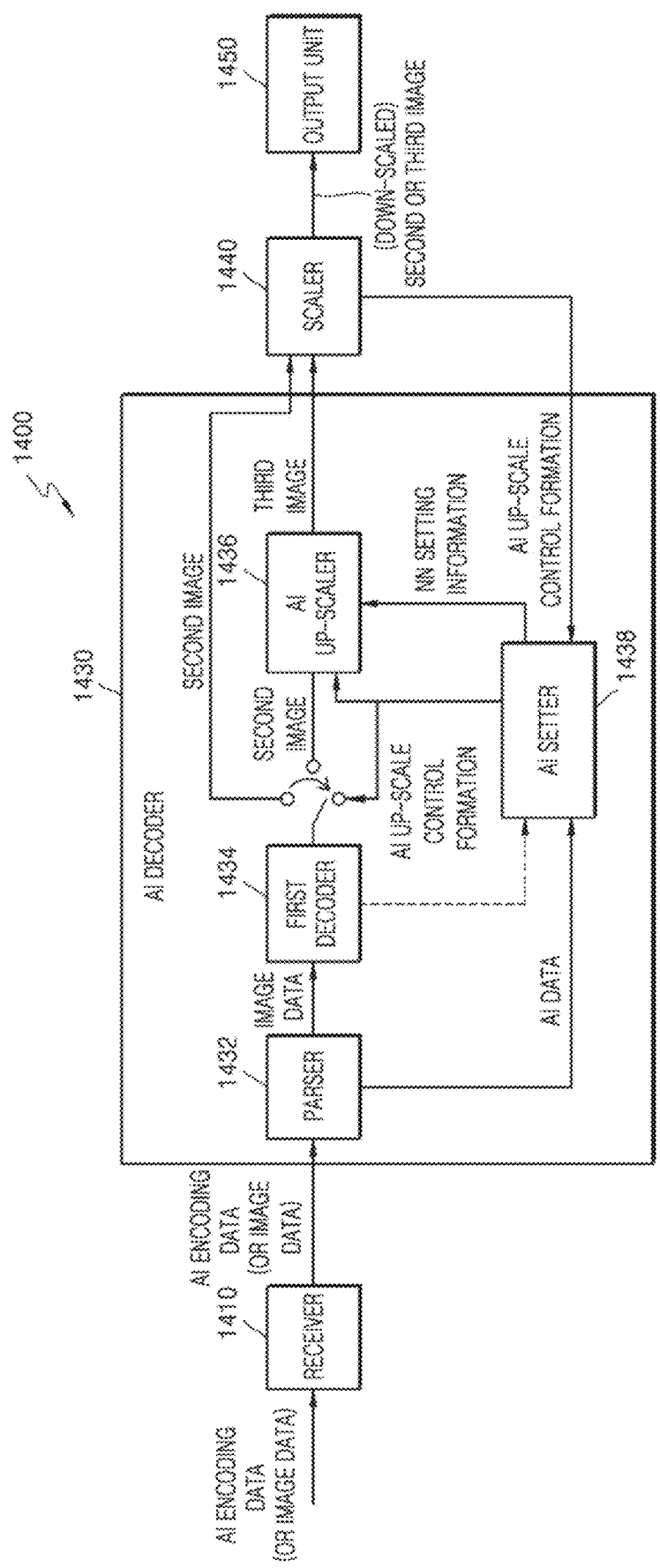
FIG. 14 is a block diagram of a configuration of an AI decoding apparatus (or a display apparatus), according to an embodiment of the disclosure.

FIG. 14 is a block diagram of a configuration of an AI decoding apparatus (or a display apparatus) 1400, based on an embodiment of the disclosure. Referring to FIG. 14, the display apparatus 1400 may include a receiver 1410, an AI decoder 1430, a scaler 1440, and an output unit 1450.

The AI decoder 1430 may include a parser 1432, a first decoder 1434, an AI up-scaler 1436, and an AI setter 1438.

In FIG. 14, the receiver 1410, the AI decoder 1430, the scaler 1440, and the output unit 1450 are illustrated as separate devices, but the receiver 1410, the AI decoder 1430, the scaler 1440, and the output unit 1450 may be realized through one processor. In this case, the receiver 1410, the AI decoder 1430, the scaler 1440, and the output unit 1450 may be realized through a dedicated processor or through a combination of software and a general-purpose processor, such as AP, CPU or GPU. The dedicated processor may include a memory for implementing an embodiment of the disclosure or include a memory processor for using an external memory.

Also, the receiver 1410, the AI decoder 1430, the scaler 1440, and the output unit 1450 may be configured as a plurality of processors. In this case, the receiver 1410, the AI decoder 1430, the scaler 1440, and the output unit 1450 may be realized through a combination of dedicated processors or through a combination of software and a plurality of general-purpose processors such as AP, CPU or GPU.

According to an embodiment of the disclosure, the first decoder 1434 may be realized as a first processor, the parser 1432, the AI up-scaler 1436, and the AI setter 1438 may be realized as a second processor different from the first processor, the receiver 1410 may be realized as a third processor different from the first and second processors, and the scaler 1440 and the output unit 1450 may be realized as a fourth processor.

The configuration of the display apparatus 1400 may mostly correspond to the configuration of the AI decoding apparatus 200, and operations thereof may also correspond thereto. Hereinafter, the configuration and operations of the display apparatus 1400, which are different from the configuration and operations of the AI decoding apparatus 200, will be mainly described.

A transmitter (not shown) of the display apparatus 1400 may request the image providing apparatus 1300 for information indicating image data of a plurality of qualities, and the receiver 1410 may receive the information indicating the image data of the plurality of qualities from the image providing apparatus 1300. Here, the image data of the plurality of qualities may include image data generated through AI down-scaling and encoding, and image data generated through encoding.

The information indicating the image data of the plurality of qualities may include information indicating resolution of a plurality of pieces of image data, information indicating bitrates of the plurality of pieces of image data, and information indicating whether AI down-scaling is applied.

The transmitter of the display apparatus 1400 may request the image providing apparatus 1300 for an image segment of a lowest bitrate when image streaming starts.

Here, the image segment (or segment) is a transmission unit of the image streaming, and for example, an image may be split in segment units of a certain time and transmitted to the display apparatus 1400 in the form of bitstream. For example, the certain time may be between 2 seconds to 10 seconds, but is not limited thereto. In other words, the segment may be a data transmission unit including a certain number of frames.

When a network throughput is measured in the display apparatus 1400 and it is identified that the network throughput is higher than a bit rate of a segment including a current image, the display apparatus 1400 may request a segment of a subsequent image of a higher bitrate. In other words, the display apparatus 1400 requests the image segment based on the network throughput.

According to an embodiment of the disclosure, the display apparatus 1400 may request the segment considering a size of a window (i.e., a size of an output image regarding a certain view displayed on a display), in addition to the network throughput.

Hereinafter, processes by which the image providing apparatus 1300 and the display apparatus 1400 stream an image, considering a window size in addition to a network throughput will be described.

The scaler 1440 may identify whether a down-scale ratio between a size of an image reconstructed from a previous image (in detail, an image reconstructed from image data of the previous image, i.e., a second previous image or third previous image described above) and a size of a first window is equal to or less than a pre-set limiting down-scale ratio, i.e., a pre-set down-scale ratio. The image reconstructed from the previous image may be an input image of the scaler 1440.

For example, the image reconstructed from the previous image may be an image AI up-scaled through the AI up-scaler 1436, but is not limited thereto, and may be an image on which first decoding is performed through the first decoder 1434.

The transmitter may transmit a request for a first current image to the image providing apparatus 1300, based on a result of the identifying.

The receiver 1410 may transmit image data of the first current image on which first encoding is performed, to the image providing apparatus 1300 based on the request for the first current image.

The parser 1432 may parse the image data of the first current image, and the parsed image data may be input to the first decoder 1434. When AI data is included in the image data of the first current image, the parsed AI data may be input to the AI setter 1438.

The first decoder 1434 may obtain a second current image by performing first decoding on the image data of the first current image.

The AI setter 1438 may output AI up-scale control information, and the AI up-scale control information may be input to the AI up-scaler 1436. The AI up-scale control information may be generated based on the AI data, but is not limited thereto.

The AI up-scaler 1436 may generate a third current image by performing AI up-scaling on the second current image, based on the AI up-scale control information.

The scaler 1440 may perform down-scaling on the second current image or third current image, or bypass a down-scaling operation, based on the size of the first window.

When a size of the second current image or third current image is greater than the size of the first window, the down-scaling may be performed, and when the size of the second current image or third current image is the same as the size of the first window, the down-scaling operation may be bypassed.

As described above, the request for the first current image may be transmitted from the display apparatus 1400 to the image providing apparatus 1300 such that a size of an image to be reconstructed from the first current image is equal to or less than a size of a target largest image. Accordingly, a down-scale ratio between the size of the second current image or the size of the third current image and the size of the first window may be greater than the limiting down-scale ratio. Accordingly, even when the down-scaling operation is performed, image quality deterioration caused by hardware performance deficiency may not occur.

Hereinafter, an image streaming process in which the display apparatus 1400 receives an image encoded without AI scaling based on a size of a window while receiving an image encoded after AI down-scaling will be described.

The transmitter of the display apparatus 1400 may transmit a request for a first previous image to the image providing apparatus 1300.

The receiver 1410 may receive first image data generated as a result of performing first encoding on the first previous image, and AI data related to AI down-scaling from at least one previous original image to the first previous image, based on the request for the first previous image. Here, the first image data and the AI data may be included in AI encoding data.

The parser 1432 may parse the first image data and the AI data from the AI encoding data. The parsed first image data may be input to the first decoder 1434 and the parsed AI data may be input to the AI setter 1438.

The first decoder 1434 may obtain the second previous image by performing first decoding on the first image data.

The AI setter 1438 may determine, based on the AI up-scale control information, whether to input the second previous image output from the first decoder 1434 to the AI up-scaler 1436 or to the scaler 1440. The AI up-scale control information may be obtained based on the AI data. For example, an AI up-scale activation flag indicating AI up-scaling for each segment may be included in the AI data and the AI up-scale control information may be obtained based on the AI up-scale activation flag.

When the second previous image is input to the AI up-scaler 1436, the AI setter 1438 may identify NN setting information based on the AI data (and image-related information).

The AI up-scaler 1436 may generate the third previous image by performing AI up-scaling on the second previous image based on the AI data.

The scaler 1440 may perform down-scaling on the third previous image generated after the AI up-scaling is performed on the second previous image.

Here, the scaler 1440 may perform down-scaling on the third previous image based on a window size for at least one view among a multi-view.

The down-scaling of the scaler 1440 may be performed by performing scaling at intervals of scale ratios by using values of samples in an image and a coefficient value of a low pass filter, instead of performing AI down-scaling using an AI down-scaling NN. In other words, the down-scaling may be performed by performing interpolation with reference to values of adjacent pixels of a current pixel that is being sampled (hereinafter, a low pass filter sampling method). Here, the scale ratio denotes a reciprocal number of the down-scale ratio, and for example, when the down-scale ratio is 1/2, the scale ratio is 2. In other words, when a height of the third previous image is 2160 px and a height of the window size is 1080 px, the down-scale ratio may be 1/2 and the scale ratio may be 2.

According to an embodiment of the disclosure, the down-scaling of the scaler 1440 may be performed in a line skip method. For example, in vertical down-scaling, at least one line (row) may be sampled, next at least one line (row) may be skipped, and then at least one line may be sampled. In horizontal down-scaling, like the vertical down-scaling, at least one line (column) may be sampled, net at least one line (column) may be skipped, and then at least one line may be sampled.

Descriptions about a specific embodiment of the disclosure of the vertical down-scaling in the low pass filter sampling method and the line skip method will be described below with reference to FIG. 24.

The scaler 1440 may down-scale the third previous image based on a size of the third previous image and the window size. The scaler 1440 may down-scale the third previous image based on a down-scale ratio (or a scale ratio) of the size of the third previous image to the window size. For example, when the down-scale ratio is 1/2 (when the scale ratio is 2), an image having a 1/2 size of the third previous image may be obtained by down-scaling the third previous image. Accordingly, the size of the down-scaled third previous image may become the same as the window size.

The transmitter may transmit, to the image providing apparatus 1300, a request for a first current image considering the size of the third previous image and the window size. The first previous image and the first current image may be images belonging to different segments.

When the down-scale ratio between the size of the third previous image and the window size is equal to or less than a certain first value (or the scale ratio is equal to or greater than the certain first value), the transmitter may transmit, to the image providing apparatus 1300, the request for the first current image obtained by performing first encoding on an original image without AI down-scaling.

The certain first value may be a value indicating the limiting down-scale ratio. The certain first value may be 1/2, 1/3, or 1/4, but is not limited thereto, and may be pre-set based on a hardware performance of the scaler 1440 as described below. In other words, the certain first value may be pre-set to a reference value where image quality deterioration starts to occur due to a down-scaling operation. For example, the certain first value may be pre-set to a value related to the down-scaling operation based on the line skip method. This will be described in detail below with reference to FIG. 24.

When the down-scale ratio between the size of the third previous image and the window size is greater than the certain first value (or the scale ratio is less than the certain first value), the transmitter may transmit, to the image providing apparatus 1300, the request for the first current image obtained by performing first encoding on the original image after AI down-scaling.

The image providing apparatus 1300 may transmit image data of the first current image obtained by performing first encoding on the current original image without AI down-scaling, based on the request for the first current image obtained by performing first encoding on the original image without AI down-scaling. The size of the first current image may be equal to or smaller than a size of a target largest image. The size of the target largest image may be determined based on a size of a first window and the limiting down-scale ratio.

The receiver 1410 may receive the image data of the first current image. The parser 1432 may parse the image data of the first current image. The first decoder 1434 may obtain a second current image by performing first decoding on the image data of the first current image.

The scaler 1440 may bypass a down-scaling operation of the second current image based on the size of the second current image and the window size. For example, when it is identified that the size of the second current image is the same as a window size of a multi-view, the scaler 1440 may bypass the down-scaling operation of the second current image.

According to an embodiment of the disclosure, the image providing apparatus 1300 may transmit the image data of the first current image obtained by performing first encoding on the current original image after AI down-scaling and the AI data related to the AI down-scaling, based on the request for the first current image obtained by performing first encoding on the current original image after AI down-scaling. Here, the image data and the AI data may be included in the AI encoding data.

The receiver 1410 may receive the AI encoding data, and the parser 1432 may parse the image data of the first current image and the AI data related to the AI down-scaling from the AI encoding data.

The first decoder 1434 may obtain the second current image by performing first decoding on the image data of the first current image.

The AI setter 1438 may output NN setting information to the AI up-scaler 1436, based on the AI data.

The AI up-scaler 1436 may generate a third current image by performing AI up-scaling on the second current image.

The scaler 1440 may down-scale the third current image based on a size of the third current image and the window size. For example, when it is identified that the size of the third current image is greater than the window size, the scaler 1440 may perform down-scaling on the third current image.

According to an embodiment of the disclosure, when it is identified that a down-scale ratio between a size of an image reconstructed from the previous image (the second previous image or the third previous image) and the window size is equal to or less than the limiting down-scale ratio, the scaler 1440 may transmit, to the image providing apparatus 1300, a request for a new image of a next segment through the transmitter, based on a result of the identifying, and input the AI up-scale control information to the AI setter 1438, based on the result of the identifying. Based on the AI up-scale control information, AI up-scaling is not performed on subsequent images included in a current segment unit, and the subsequent images may be input to the scaler 1440. Because the AI up-scaling is not performed, a size of the subsequent image input to the scaler 1440 is smaller than a size of a previously reconstructed image, and thus image quality deterioration may not occur during down-scaling of the scaler 1440.

Also, according to an embodiment of the disclosure, an up-scaling degree of the AI up-scaling may be set to be low through the AI up-scale control information, in addition to not performing the AI up-scaling on the subsequent image in the current segment unit, through the AI up-scale control information. By setting the AI up-scaling to be low, the size of the subsequent image input to the scaler 1440 after AI up-scaling is smaller than the size of the previously reconstructed image, and thus image quality deterioration may not occur during down-scaling of the scaler 1440.

According to an embodiment of the disclosure, the scaler 1440 may identify whether the down-scale ratio between the size of the AI up-scaled third current image and the size of the first window is equal to or less than the limiting down-scale ratio, before performing the down-scaling. When the down-scale ratio is equal to or less than the limiting down-scale ratio, the second current image that is not AI up-scaled may be down-scaled or a down-scaling operation of the second current image may be bypassed. In other words, when the second current image or the third current image is stored in a buffer, the scaler 1440 may select an image to be down-scaled, thereby preventing image quality deterioration caused by down-scaling.

The output unit 1450 may output an image output from the scaler 1440 to a display (not shown). The down-scaled second current image (or the down-scaled third current image) or the second current image in which the down-scaling operation is bypassed (or the third current image in which the down-scaling operation is bypassed) may be output to the display.

Figure 15A:
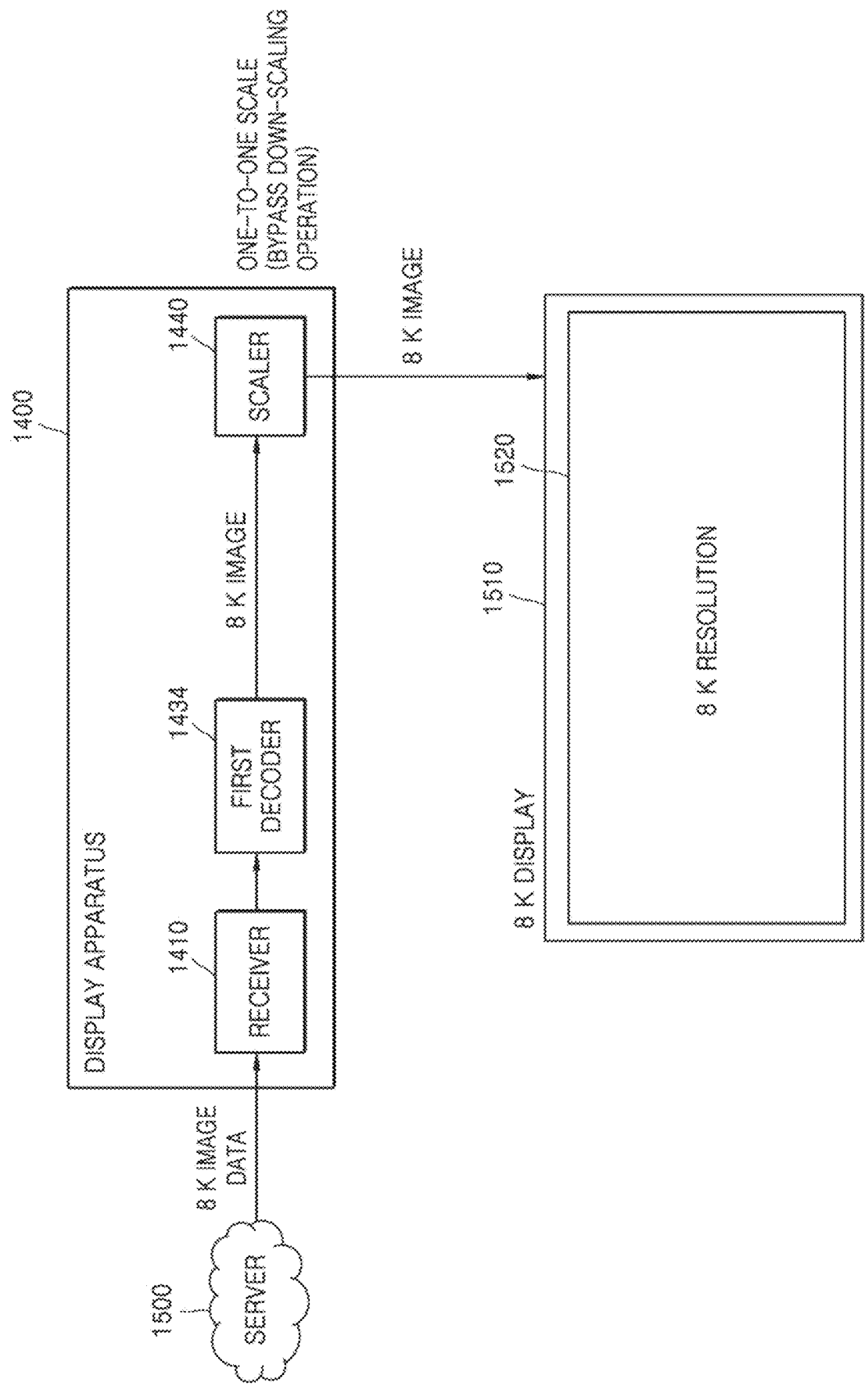
FIG. 15A is a diagram for describing processes by which a display apparatus displays an AI down-scaled image that is an image received from a server, according to a single view, according to an embodiment of the disclosure.

FIG. 15A is a diagram for describing processes by which a display apparatus 1400 displays an AI down-scaled image that is an image received from a server 1500 (or an image providing apparatus described above), based on a single view, according to an embodiment of the disclosure.

Referring to FIG. 15A, the display apparatus 1400 may transmit a request for an image of 8 K resolution to the server 1500, and the receiver 1410 may receive, from the server 1500, image data of 8 K resolution based on the request.

The first decoder 1434 may obtain the image (second image) of 8 K resolution by performing first decoding on the 8 K image data.

Because an entire size (8 K) of a display 1510 and a size of the image (second image) of the 8 K resolution are the same, the scaler 1440 may bypass a down-scaling operation on the image of the 8 K resolution. Accordingly, an image 1520 of the 8 K resolution may be displayed on the display 1510. In other words, in a case of an image of a single view, a separate down-scaling operation may not be performed when a size of an image and an entire size of a display are the same.

Figure 15B:
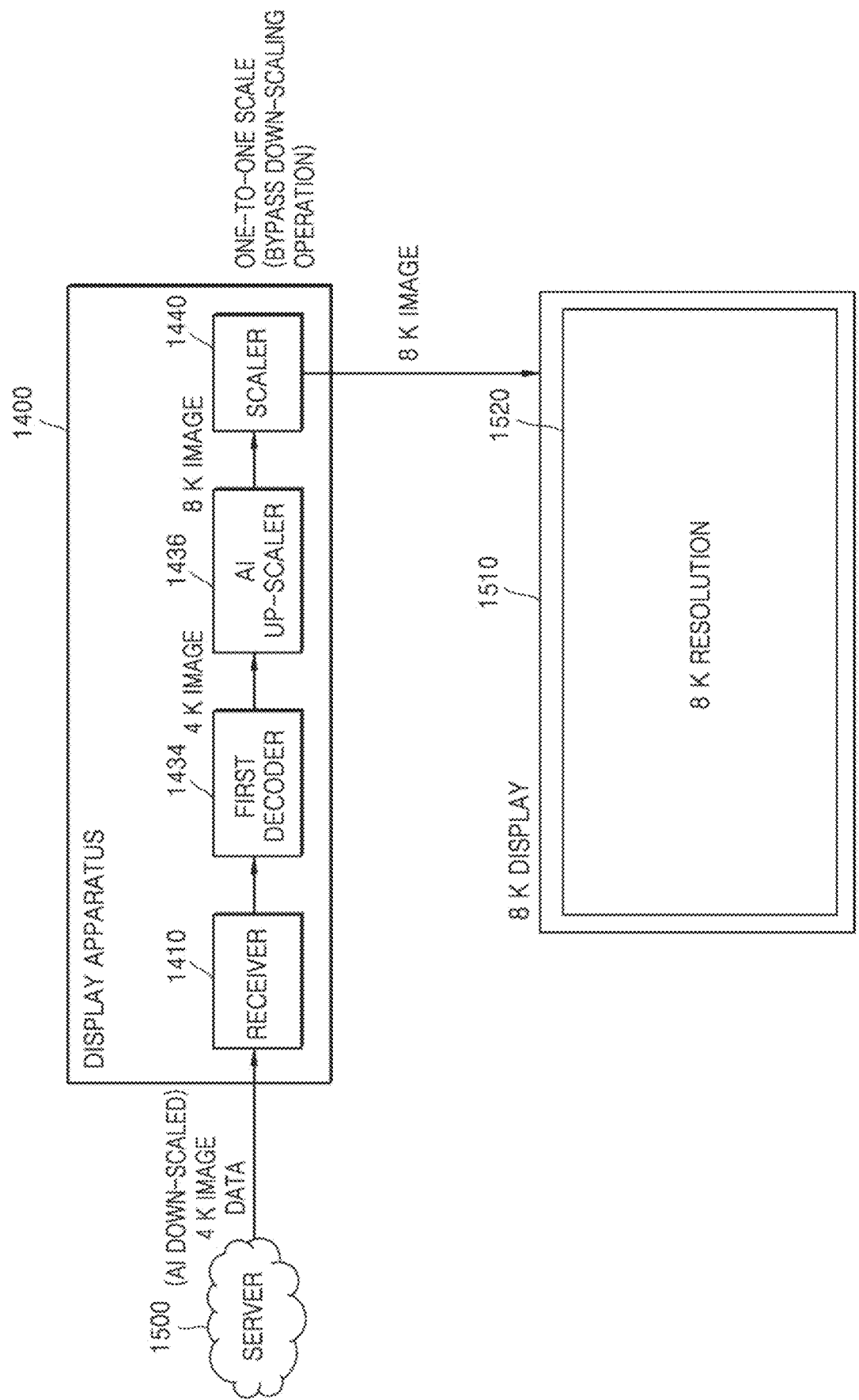
FIG. 15B is a diagram for describing processes by which a display apparatus AI up-scales an image received from a server and displays the same, according to a single view, according to an embodiment of the disclosure.

FIG. 15B is a diagram for describing processes by which the display apparatus 1400 AI up-scales an image received from the server 1500 and displays the same, based on a single view, according to an embodiment of the disclosure.

Referring to FIG. 15B, the display apparatus 1400 (AI decoding apparatus) may transmit, to the server 1500, a request for an AI down-scaled image of 4 K resolution, and the receiver 1410 may receive, from the server 1500, (AI down-scaled) image data of 4 K resolution based on the request. The image data of 4 K resolution may be image data regarding an image AI-down-scaled from an original image, but is not limited thereto, and may be image data of an image that is not AI down-scaled from the original image.

The first decoder 1434 may obtain the image (second image) of 4 K resolution by performing first decoding on the 4 K image data.

The AI up-scaler 1436 may generate an image (third image) of 8 K resolution by up-scaling the image of 4 K resolution by using an NN for up-scaling.

When the image data of 4 K resolution is image data of an image of 4 K resolution that is not AI down-scaled from the original image, data received from the server 1500 may not include AI data. In this case, AI up-scaling may be performed based on pre-set NN setting information.

When the image data of 4 K resolution is image data of an image of 4 K resolution that is AI down-scaled from the original image, the data received from the server 1500 may include AI data. In this case, the AI up-scaling may be performed based on the AI data.

When the data received from the server 1500 includes the AI data, AI up-scaling may be performed. However, an embodiment of the disclosure is not limited thereto, and the AI up-scaling may be performed regardless of whether the AI down-scaling is performed on the original image in the server 1500. Also, the AI up-scaling may be performed regardless of whether the data received from the server 1500 includes the AI data.

Because an entire size (8 K) of the display 1510 and a size of the image (third image) of the 8 K resolution are the same, the scaler 1440 may bypass a down-scaling operation on the image of the 8 K resolution. Accordingly, the image 1520 of the 8 K resolution may be displayed on the display 1510. In other words, in a case of an image of a single view, a separate down-scaling operation may not be performed when a size of an AI up-scaled image and a size of a display are the same.

Figure 16A:
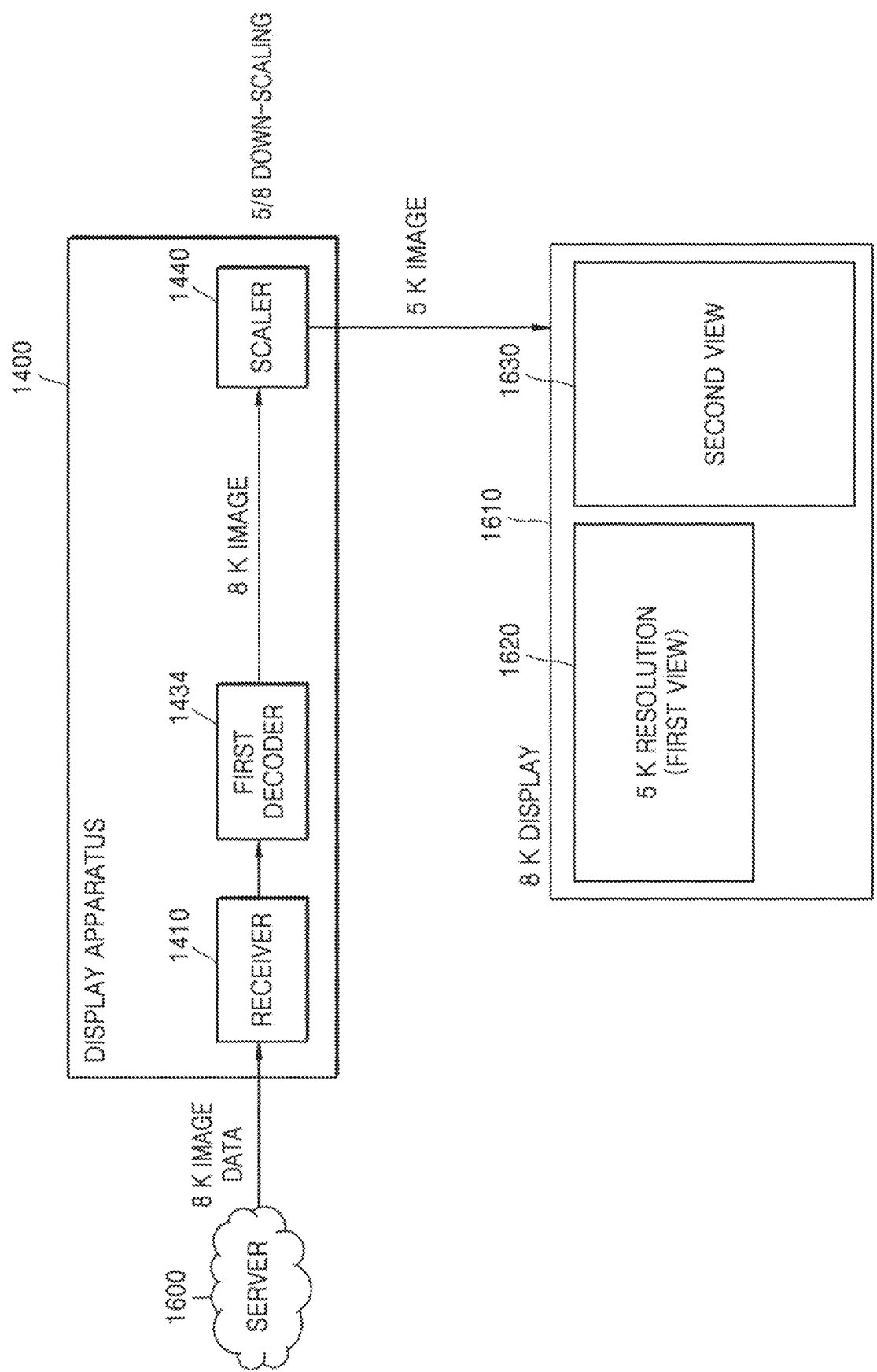
FIG. 16A is a diagram for describing processes by which a display apparatus displays an image received from a server, according to a multi-view, according to an embodiment of the disclosure.

FIG. 16A is a diagram for describing processes by which the display apparatus 1400 displays an image received from a server 1600, based on a multi-view, according to an embodiment of the disclosure.

The server 1600 may transmit, to the display apparatus 1400, image data of a previous image of 8 K resolution, and the receiver 1410 of the display apparatus 1400 may receive the image data of the previous image of 8 K resolution. The first decoder 1434 may obtain the previous image (for example, a second previous image described above) of 8 K resolution by performing first decoding on the image data of 8 K resolution.

A user of the display apparatus 1400 may select a multi-view display request from a user menu by manipulating a remote controller. At this time, an image of a second view 1630 different from a first view 1620 may be displayed on the display apparatus 1400. Accordingly, a size of a window regarding the first view 1620 in a display 1610 may become smaller than overall resolution of the display 1610, for example, 5 K resolution.

The scaler 1440 may perform down-scaling on the previous image of 8 K resolution, considering the size of the window of the first view 1620 of 5 K resolution. In other words, the scaler 1440 may obtain a previous image of 5 K resolution by performing down-scaling on the previous image of 8 K resolution, based on a down-scale ratio 5/8.

The display apparatus 1400 may display the reconstructed previous image of 5 K resolution on the first view 1620 of the display 1610.

For example, the scaler 1440 may exhibit a hardware performance that does not generate image quality deterioration based on 5/8 down-scaling.

Because the image quality deterioration does not occur due to the 5/8 down-scaling, the display apparatus 1400 may transmit, to the server 1600, a request for a current image obtained by performing first encoding on a current original image.

Based on the request, the server 1600 may transmit, to the display apparatus 1400, image data of a first current image (8 K resolution) obtained by performing first encoding on the original image, and AI data related to AI down-scaling.

The receiver 1410 of the display apparatus 1400 may receive the AI data and image data of the first current image.

The first decoder 1434 of the display apparatus 1400 may obtain a second current image of 8 K resolution by performing first decoding on the image data of the first current image.

The scaler 1440 may perform down-scaling on the second current image of 8 K resolution, considering a window size of the first view 1620 of 5 K resolution. In other words, the scaler 1440 may obtain the second current image of 5 K resolution by performing down-scaling on the second current image of 8 K resolution, based on a down-scale ratio 5/8. The display apparatus 1400 may display the second current image of 5 K resolution on the display 1610.

In other words, when the window size of the first view 1620 is not greatly smaller than an entire size (or a size of a decoded image) of the display 1610 of the display apparatus 1400, down-scaling is possible without exceeding the hardware performance of the scaler 1440, and thus the display apparatus 1400 may afterwards display an image of high quality by requesting the server 1600 for an image of a same size.

Figure 16B:
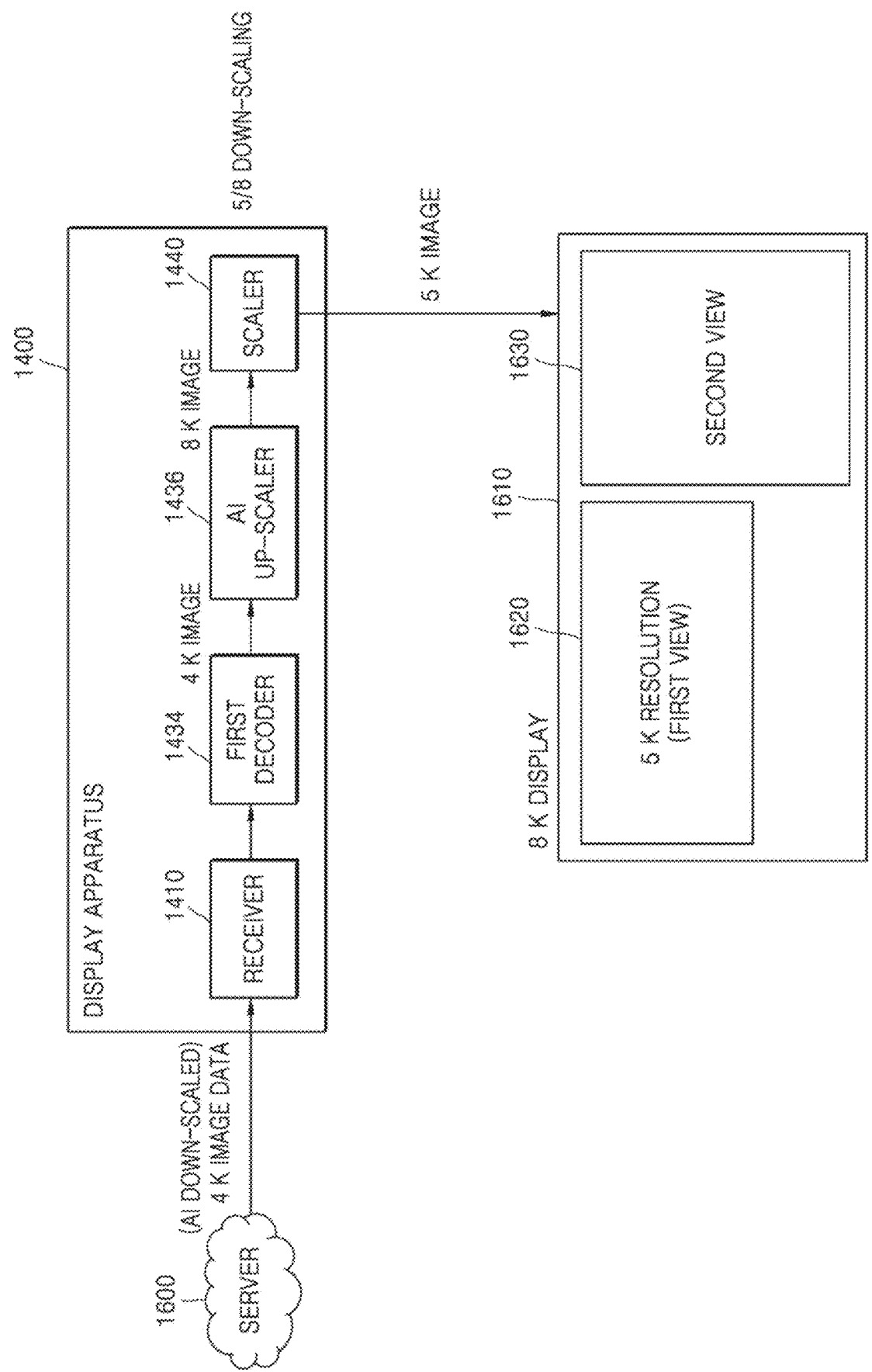
FIG. 16B is a diagram for describing processes by which a display apparatus AI up-scales an image received from a server, and down-scales and displays the same according to a multi-view, according to an embodiment of the disclosure.

FIG. 16B is a diagram for describing processes by which the display apparatus 1400 AI up-scales an image received from the server 1600, and down-scales and displays the same based on a multi-view, according to an embodiment of the disclosure.

The server 1600 may transmit, to the display apparatus 1400, image data of an (AI down-scaled) first previous image of 4 K resolution, and the receiver 1410 of the display apparatus 1400 may receive the image data of the first previous image of 4 K resolution. The first decoder 1434 may obtain a second previous image of 4 K resolution by performing first decoding on the image data of the first previous image of 4 K resolution.

The AI up-scaler 1436 may generate a third previous image of 8 K resolution by performing AI up-scaling on the second previous image of 4 K resolution. As described above, AI up-scaling may be performed even when the first previous image is not an image obtained through AI down-scaling. In other words, AI up-scaling may be performed even when AI data is not received.

A user of the display apparatus 1400 may select a multi-view display request from a user menu by manipulating a remote controller. At this time, an image of the second view 1630 different from the first view 1620 may be displayed on the display apparatus 1400. Accordingly, a size of a window regarding the first view 1620 in the display 1610 may become smaller than overall resolution of the display 1610, for example, 5 K resolution.

The scaler 1440 may perform down-scaling on the third previous image of 8 K resolution, considering a window size of the first view 1620 of 5 K resolution. In other words, the scaler 1440 may obtain the third previous image of 5 K resolution by performing down-scaling on the third previous image of 8 K resolution, based on a down-scale ratio 5/8.

The display apparatus 1400 may display the third previous image of 5 K resolution on the display 1610.

For example, the scaler 1440 may exhibit a hardware performance that does not generate image quality deterioration based on 5/8 down-scaling.

Because the image quality deterioration does not occur due to the 5/8 down-scaling, the display apparatus 1400 may transmit, to the server 1600, a request for a first current image obtained by performing first encoding on an original image (after AI down-scaling).

The server 1600 may transmit, to the display apparatus 1400, image data of the first current image (4 K resolution) obtained by performing first encoding on the original image (after AI down-scaling) (and AI data related to AI down-scaling).

The receiver 1410 of the display apparatus 1400 may receive the image data of the first current image (and the AI data).

The first decoder 1434 of the display apparatus 1400 may obtain a second current image of 4 K resolution by performing first decoding on the image data of the first current image.

The AI up-scaler 1436 may generate a third current image of 8 K resolution by AI up-scaling the second current image of 4 K resolution (based on the AI data).

The scaler 1440 may perform down-scaling on the third current image of 8 K resolution, considering a window size of the first view 1620 of 5 K resolution. In other words, the scaler 1440 may reconstruct the third current image of 5 K resolution by performing down-scaling on the third current image of 8 K resolution, based on a down-scale ratio 5/8. The display apparatus 1400 may display the reconstructed third current image of 5 K resolution on the display 1610.

In other words, when the window size of the first view 1620 is not sufficiently smaller than an entire size (or a size of an AI up-scaled image) of the display 1610 of the display apparatus 1400, down-scaling is possible without exceeding the hardware performance of the scaler 1440, and thus the display apparatus 1400 may afterwards display an image of high quality by requesting the server 1600 for an image of a same size.

Figure 17A:
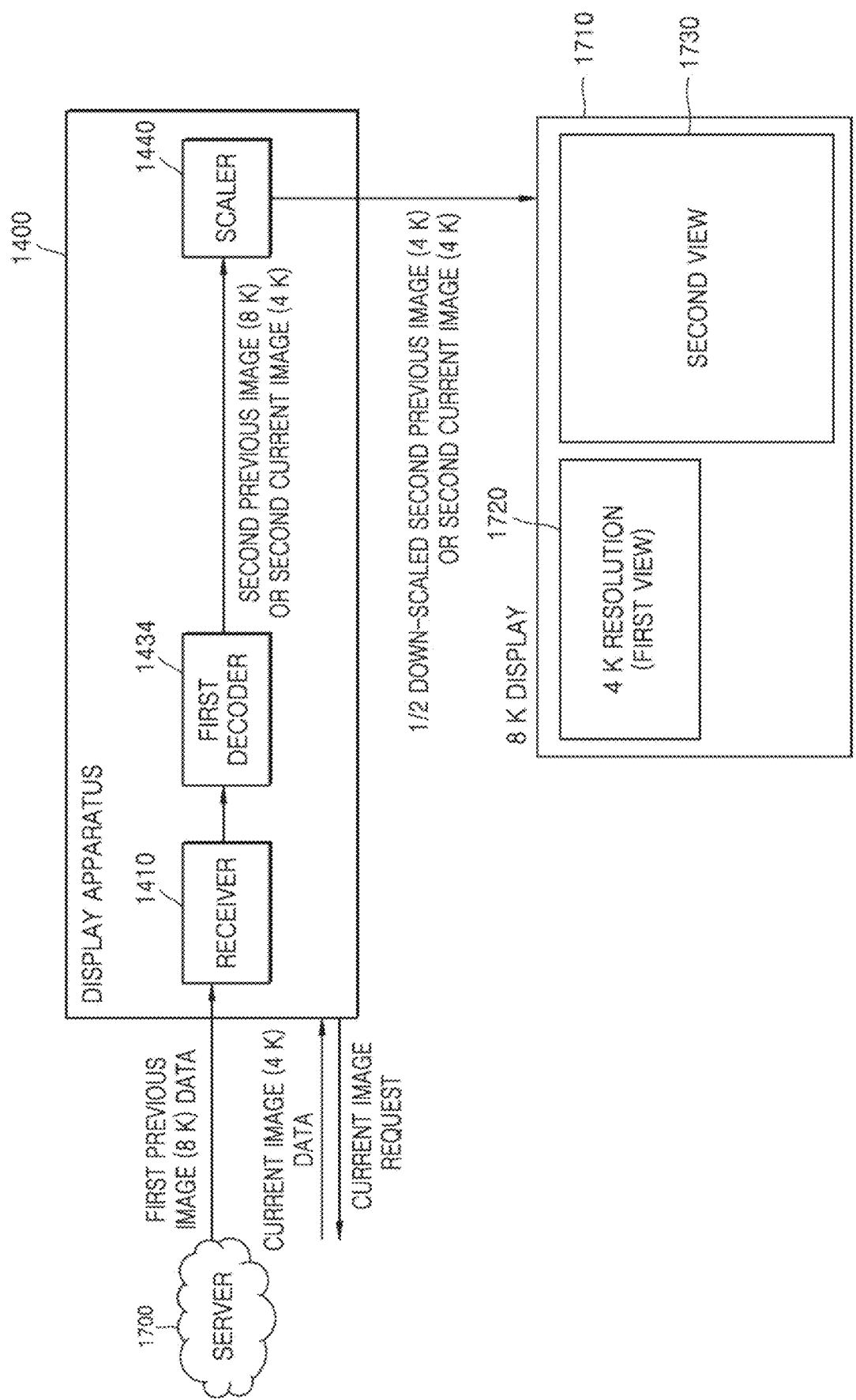
FIG. 17A is a diagram for describing processes by which a display apparatus requests an image having a small size due to a change in a window size of a multi-view, while displaying an image received from a server, according to the multi-view, according to an embodiment of the disclosure.

FIG. 17A is a diagram for describing processes by which the display apparatus 1400 requests an image having a small size due to a change in a window size of a multi-view, while displaying an image received from a server 1700, based on the multi-view, according to an embodiment of the disclosure.

The server 1700 may transmit, to the display apparatus 1400, image data of a first previous image of 8 K resolution based on an image request of the display apparatus 1400, and the receiver 1410 of the display apparatus 1400 may receive the image data of the first previous image of 8 K resolution. The first decoder 1434 may obtain a second previous image of 8 K resolution by performing first decoding on the image data of the first previous image of 8 K resolution.

A user of the display apparatus 1400 may adjust a window size of a multi-view from a user menu by manipulating a remote controller. Here, an image of a first view 1720 may be displayed as a size of a window of the first view 1720 is adjusted in the display apparatus 1400. Accordingly, the size of the window of the first view 1720 in a display 1710 may be decreased to 4 K, which is smaller than 5 K that is the size of the window of the first view 1620 of FIG. 16A.

The scaler 1440 may perform down-scaling on a second previous image of 8 K resolution, considering the window size of the first view 1720 of 4 K resolution. In other words, the scaler 1440 may reconstruct the second previous image of 4 K resolution by performing down-scaling on the second previous image of 8 K resolution, based on a down-scale ratio 1/2. The display apparatus 1400 may display the reconstructed second previous image of 4 K resolution on the display 1710.

For example, when the down-scaling is performed at a down-scale ratio of 1/2 or lower, the scaler 1440 may exhibit a hardware performance enough to generate image quality deterioration.

When the down-scaling is performed at the down-scale ratio of 1/2 or less, image quality deterioration may occur, and thus the display apparatus 1400 may transmit, to the server 1700, a request for a first current image on which first encoding is performed, considering the hardware performance of the scaler 1440. Here, the first current image may be smaller than the first previous image (or the second previous image).

The server 1700 may transmit, to the display apparatus 1400, image data of the first current image (4 K resolution) on which first encoding is performed.

The receiver 1410 of the display apparatus 1400 may receive the image data of the first current image.

The first decoder 1434 of the display apparatus 1400 may obtain a second current image of 4 K resolution by performing first decoding on the image data of the first current image.

The scaler 1440 may bypass a down-scaling operation considering a size (4 K) of the second current image and the window size of the first view 1720 of 4 K resolution. In other words, because the size of the second current image and the window size of the first view 1720 are the same, the scaler 1440 may bypass the down-scaling operation.

Accordingly, not only image quality deterioration caused by the down-scaling operation of the scaler 1440 does not occur, but also an amount of image data is reduced by requesting an image having a smaller size than before, and thus a network usage may be reduced.

Figure 17B:
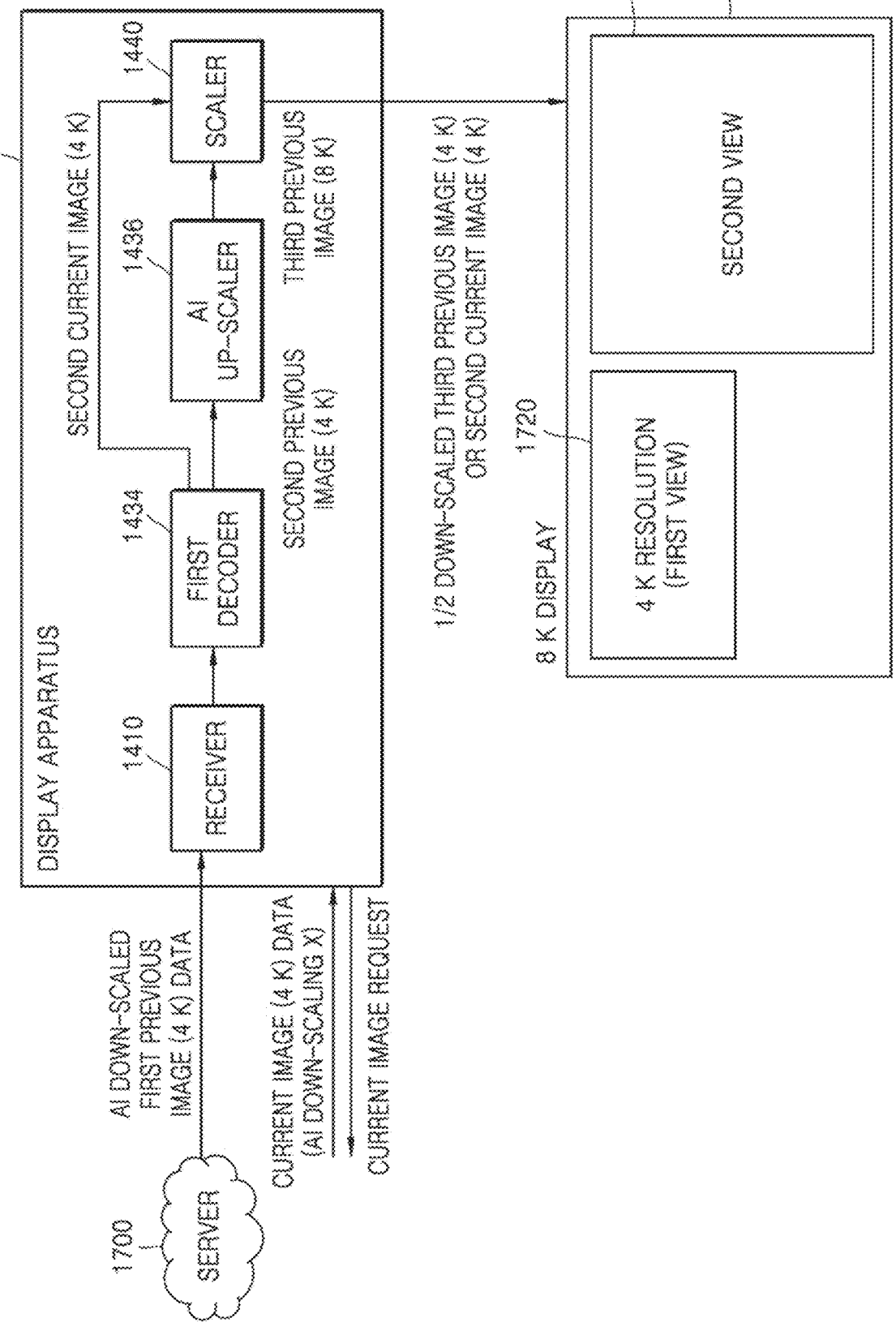
FIG. 17B is a diagram for describing processes by which a display apparatus requests image data having a small size due to a change in a window size of a multi-view, while displaying an image received from a server, according to the multi-view, according to an embodiment of the disclosure.

FIG. 17B is a diagram for describing processes by which the display apparatus 1400 requests image data having a small size due to a change in a window size of a multi-view, while displaying an image received from the server 1700, based on the multi-view, according to an embodiment of the disclosure.

The server 1700 may transmit, to the display apparatus 1400, image data of an AI down-scaled first previous image of 4 K resolution based on an image request of the display apparatus 1400, and the receiver 1410 of the display apparatus 1400 may receive the image data of the first previous image of 4 K resolution. The first decoder 1434 may obtain a second previous image of 4 K resolution by performing first decoding on the image data of the first previous image of 4 K resolution.

The AI up-scaler 1436 may generate a third previous image of 8 K resolution by performing AI up-scaling on the second previous image of 4 K resolution.

A user of the display apparatus 1400 may adjust a window size of a multi-view from a user menu by manipulating a remote controller. Here, an image of the first view 1720 may be displayed as a size of a window of the first view 1720 is adjusted in the display apparatus 1400. Accordingly, the size of the window of the first view 1720 in the display 1710 may be decreased to 4 K, which is smaller than 5 K that is the size of the window of the first view 1620 of FIG. 16B.

The scaler 1440 may perform down-scaling on the third previous image of 8 K resolution, considering the window size of the first view 1720 of 4 K resolution. In other words, the scaler 1440 may reconstruct the third previous image of 4 K resolution by performing down-scaling on the third previous image of 8 K resolution, based on a down-scale ratio 1/2. The display apparatus 1400 may display the reconstructed third previous image of 4 K resolution on the display 1710.

For example, when the down-scaling is performed at a down-scale ratio of 1/2 or lower, the scaler 1440 may exhibit a hardware performance enough to generate image quality deterioration. Accordingly, the display apparatus 1400 may transmit, to the server 1700, a request for a first current image obtained by performing first encoding on a current original image without AI down-scaling, considering the hardware performance of the scaler 1440.

The server 1700 may transmit, to the display apparatus 1400, image data of the first current image (4 K resolution) obtained by performing first encoding on the current original image without after AI down-scaling.

The receiver 1410 of the display apparatus 1400 may receive the image data of the first current image.

The first decoder 1434 of the display apparatus 1400 may obtain a second current image of 4 K resolution by performing first decoding on the image data of the first current image.

The scaler 1440 may bypass a down-scaling operation considering a size (4 K) of the second current image and the window size of the first view 1720 of 4 K resolution. In other words, because the size of the second current image and the window size of the first view 1720 are the same, the scaler 1440 may bypass the down-scaling operation.

Accordingly, not only image quality deterioration caused by the down-scaling operation of the scaler 1440 does not occur, but also an amount of data is reduced when image data of an image obtained by encoding an original image without AI down-scaling is received compared to when data of an AI down-scaled image of same resolution is received, and thus a network usage may be effectively reduced.

According to an embodiment of the disclosure, the display apparatus 1400 receives the image data of the first current image (4 K) on which first encoding is performed without AI down-scaling while receiving the image data of the first previous image (4 K) encoded after AI down-scaling, but an embodiment of the disclosure is not limited thereto, and the display apparatus 1400 may receive the image data of the first current image encoded after AI down-scaling while receiving the image data of the first previous image (4 K) encoded after AI down-scaling. In this case, down-scaling may be performed after AI up-scaling.

Also, the first current image does not necessarily need to be an AI down-scaled image, and image data that is not AI down-scaled may be received. In this case as well, down-scaling may be performed after AI up-scaling.

Meanwhile, the display apparatus 1400 receives image data of an AI down-scaled previous image, but an embodiment of the disclosure is not limited thereto, and image data of a previous image (4 K) that is not AI down-scaled may be received. In this case, AI data may not be included in a bitstream and AI up-scaling may be performed without AI data.

Figure 18A:
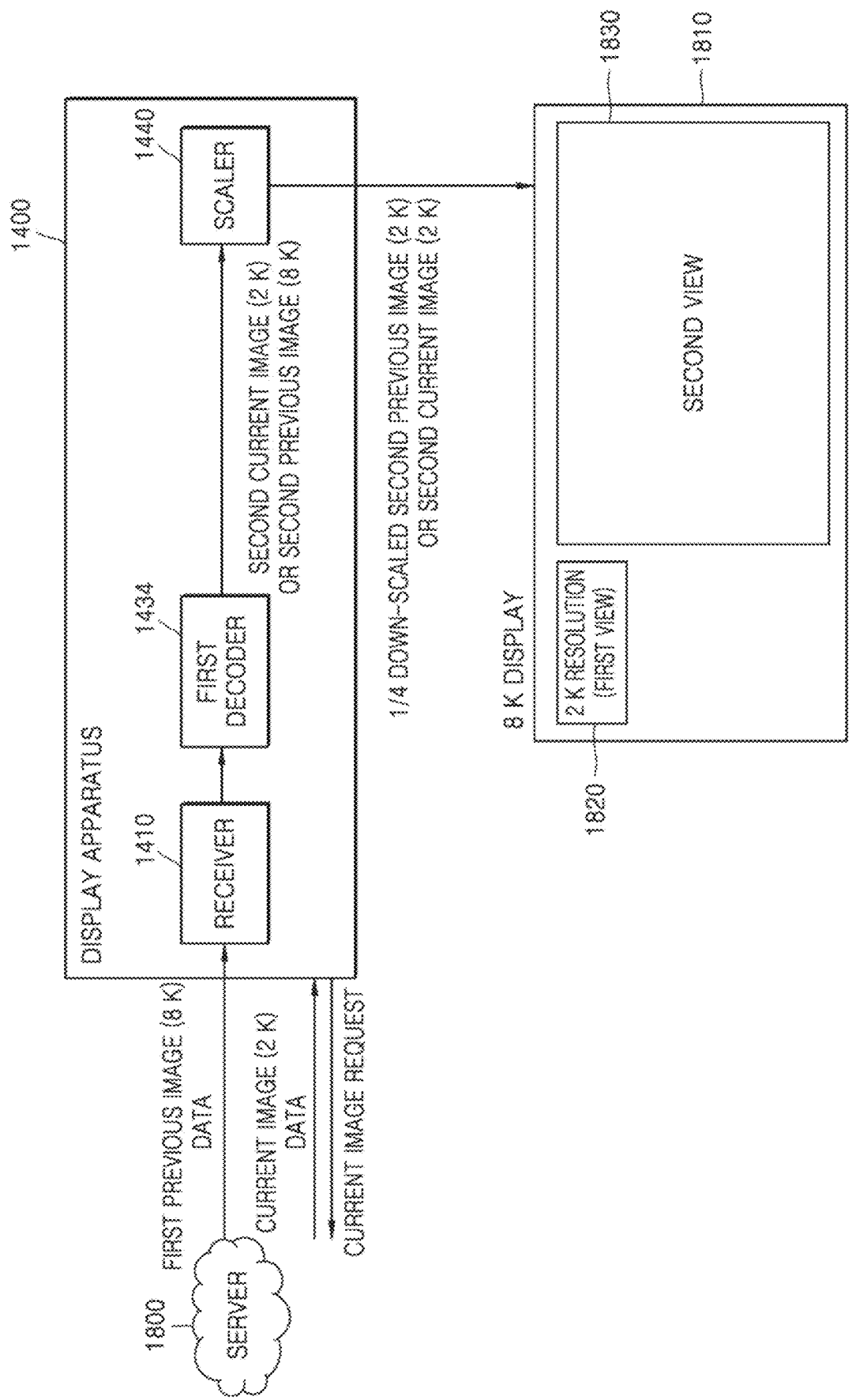
FIG. 18A is a diagram for describing processes by which a display apparatus requests an image having a smaller size due to a change in a window size of a multi-view, while displaying a down-scaled image received from a server, according to the multi-view, according to an embodiment of the disclosure.

FIG. 18A is a diagram for describing processes by which the display apparatus 1400 requests an image having a smaller size due to a change in a window size of a multi-view, while displaying a down-scaled image received from a server 1800, based on the multi-view, according to an embodiment of the disclosure.

The server 1800 may transmit, to the display apparatus 1400, image data of a first previous image of 8 K resolution based on an image request of the display apparatus 1400, and the receiver 1410 of the display apparatus 1400 may receive the image data of the first previous image of 8 K resolution. The first decoder 1434 may obtain a second previous image of 8 K resolution by performing first decoding on the image data of the first previous image of 8 K resolution.

A user of the display apparatus 1400 may adjust a window size of a multi-view from a user menu by manipulating a remote controller. Here, an image of a first view 1820 may be displayed as a window size of the first view 1820 is adjusted in the display apparatus 1400. Accordingly, the window size of the first view 1820 in a display 1810 may be decreased to 2 K, which is smaller than the window sizes (5 K and 4 K) of the first views 1620 and 1720 of FIGS. 16A and 17A.

The scaler 1440 may perform down-scaling on a second previous image of 8 K resolution, considering the window size of the first view 1820 of 2 K resolution. In other words, the scaler 1440 may reconstruct the down-scaled second previous image of 2 K resolution by performing down-scaling on the second previous image of 8 K resolution, based on a down-scale ratio 1/4.

The scaler 1440 may display the reconstructed second previous image of 2 K resolution on the display 1810.

As described above with reference to FIG. 17A, when the down-scaling is performed at a down-scale ratio of 1/2 or lower, the scaler 1440 may exhibit a hardware performance enough to generate image quality deterioration.

Accordingly, the display apparatus 1400 may transmit, to the server 1800, a request for a first current image on which first encoding is performed, considering the hardware performance of the scaler 1440. Here, the first current image may be smaller than the first previous image (or the second previous image).

For example, the server 1800 may transmit, to the display apparatus 1400, image data of the first current image (2 K resolution) on which first encoding is performed.

The receiver 1410 of the display apparatus 1400 may receive the image data of the first current image.

The first decoder 1434 of the display apparatus 1400 may obtain a second current image of 2 K resolution by performing first decoding on the image data of the first current image.

The scaler 1440 may bypass a down-scaling operation considering a size (2 K) of the second current image and the window size of the first view 1820 of 2 K resolution.

Not only image quality deterioration caused by the down-scaling operation of the scaler 1440 does not occur, but also an amount of image data is reduced by requesting an image having a smaller size than before, and thus a network usage may be reduced.

According to an embodiment of the disclosure, the display apparatus 1400 receives the image data of the first current image (4 K) on which first encoding is performed without AI down-scaling while receiving the image data of the first previous image (4 K) encoded after AI down-scaling, but an embodiment of the disclosure is not limited thereto, and the display apparatus 1400 may receive the image data of the first current image (1 K) encoded after AI down-scaling while receiving the image data of the first previous image (4 K encoded after AI down-scaling. In this case, down-scaling may be performed after AI up-scaling.

Also, the first current image does not necessarily need to be an AI down-scaled image, and image data that is not AI down-scaled may be received. In this case as well, down-scaling may be performed after AI up-scaling.

According to an embodiment of the disclosure, the display apparatus 1400 receives image data of an AI down-scaled previous image, but an embodiment of the disclosure is not limited thereto, and image data of a previous image (4 K) that is not AI down-scaled may be received. In this case, AI data may not be included in a bitstream and AI up-scaling may be performed without AI data.

Figure 18B:
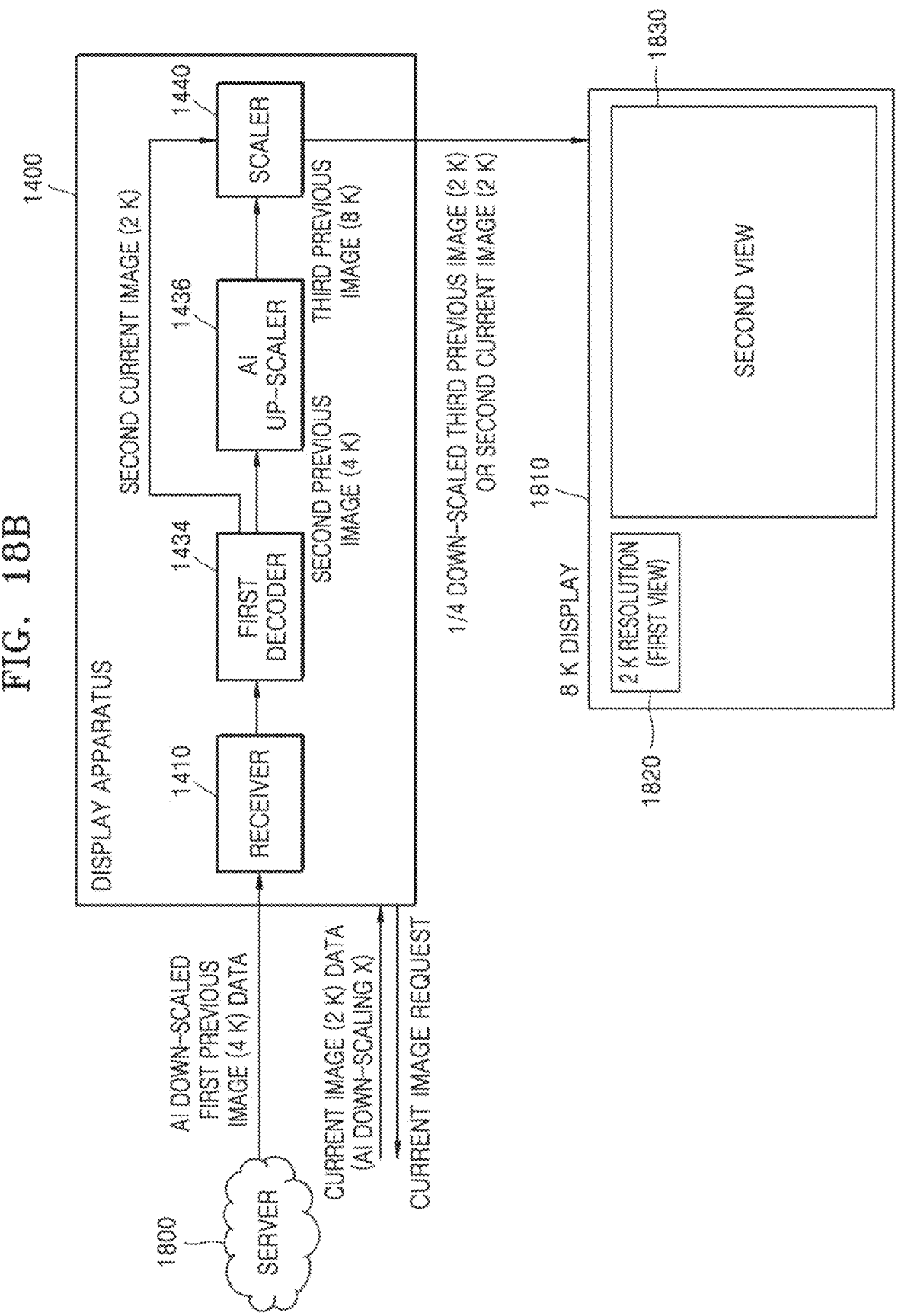
FIG. 18B is a diagram for describing processes by which a display apparatus requests an image that is not AI down-scaled, due to a change in a window size of a multi-view, while displaying a down-scaled image received from a server, according to the multi-view, according to an embodiment of the disclosure.

FIG. 18B is a diagram for describing processes by which the display apparatus 1400 requests an image that is not AI down-scaled, due to a change in a window size of a multi-view, while displaying a down-scaled image received from the server 1800, based on the multi-view, according to an embodiment of the disclosure.

The server 1800 may transmit, to the display apparatus 1400, the image data of the down-scaled first previous image of 4 K resolution based on an image request of the display apparatus 1400, and the receiver 1410 of the display apparatus 1400 may receive the image data of the first previous image of 4 K resolution. The first decoder 1434 may obtain the second previous image of 4 K resolution by performing first decoding on the image data of the first previous image of 4 K resolution.

The AI up-scaler 1436 may generate the third previous image of 8 K resolution by performing AI up-scaling on the second previous image of 4 K resolution.

A user of the display apparatus 1400 may adjust a window size of a multi-view from a user menu by manipulating a remote controller. Here, an image of the first view 1820 may be displayed as the window size of the first view 1820 is adjusted in the display apparatus 1400. Accordingly, the window size of the first view 1820 in the display 1810 may be decreased to 2 K, which is smaller than the window sizes (5 K and 4 K) of the first views 1620 and 1720 of FIGS. 16B and 17B.

The scaler 1440 may perform down-scaling on the third previous image of 8 K resolution, considering the window size of the first view 1820 of 2 K resolution. In other words, the scaler 1440 may obtain the down-scaled third previous image of 2 K resolution by performing down-scaling on the third previous image of 8 K resolution, based on a down-scale ratio 1/4.

The scaler 1440 may display the third previous image of 2 K resolution on the display 1810.

As described above with reference to FIG. 17B, when the down-scaling is performed at a down-scale ratio of 1/2 or lower, the scaler 1440 may exhibit a hardware performance enough to generate image quality deterioration.

Accordingly, the display apparatus 1400 may transmit, to the server 1800, a request for a first current image obtained by performing first encoding on an original image without AI down-scaling, considering the hardware performance of the scaler 1440.

The server 1800 may transmit, to the display apparatus 1400, image data of the first current image (2 K resolution) obtained by performing first encoding on the original image without after AI down-scaling.

The receiver 1410 of the display apparatus 1400 may receive the image data of the first current image.

The first decoder 1434 of the display apparatus 1400 may obtain a second current image of 2 K resolution by performing first decoding on the image data of the first current image.

The scaler 1440 may bypass a down-scaling operation considering a size (2 K) of the second current image and the window size of the first view 1820 of 2 K resolution.

Image quality deterioration caused by the down-scaling operation of the scaler 1440 does not occur and an amount of data is reduced when image data of an image obtained by encoding an original image is received compared to when data of an AI down-scaled image of same resolution is received because AI data is not received, and thus a network usage may be effectively reduced.

Figure 19A:
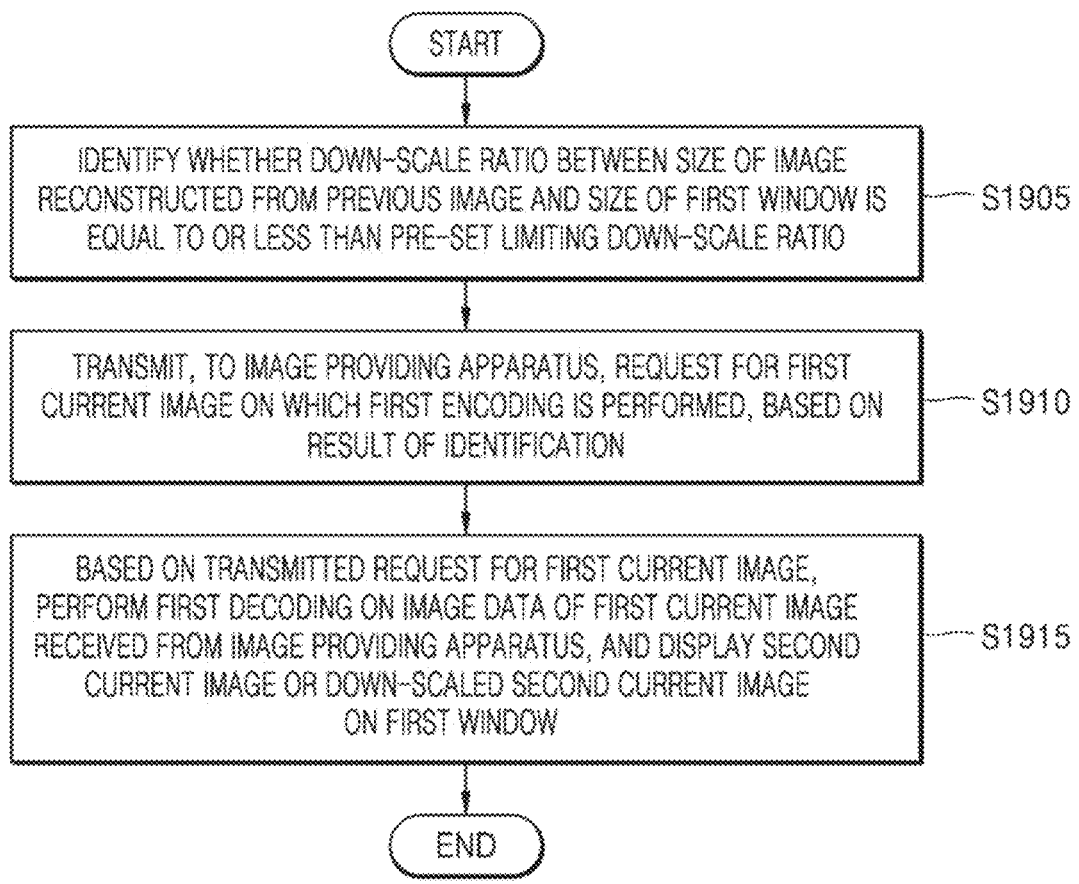
FIG. 19A is a flowchart of a method by which a display apparatus streams an image, according to an embodiment of the disclosure.

FIG. 19A is a flowchart of a method by which the display apparatus 1400 streams an image, according to an embodiment of the disclosure.

Referring to FIG. 19A, in operation S1905, the display apparatus 1400 may identify whether a down-scale ratio between a size of an image reconstructed from a previous image and a size of a first window is equal to or less than a pre-set down-scale ratio. The image reconstructed from the previous image may indicate an image before down-scaling, and the size of the first window may indicate a size of an image to be output after down-scaling.

In operation S1910, the display apparatus 1400 may transmit, to the image providing apparatus 1300, a request for a first current image on which first encoding is performed, based on a result of the identifying.

In operation S1915, based on the transmitted request for the first current image, the display apparatus 1400 may perform first decoding on image data of the first current image received from the image providing apparatus 1300, and display a second current image or down-scaled second current image on the first window. The down-scaled second current image may be an image down-scaled based on the size of the first window. Alternatively, the second current image displayed on the first window may be an image in which a down-scaling operation is bypassed based on the size of the first window.

Figure 19B:
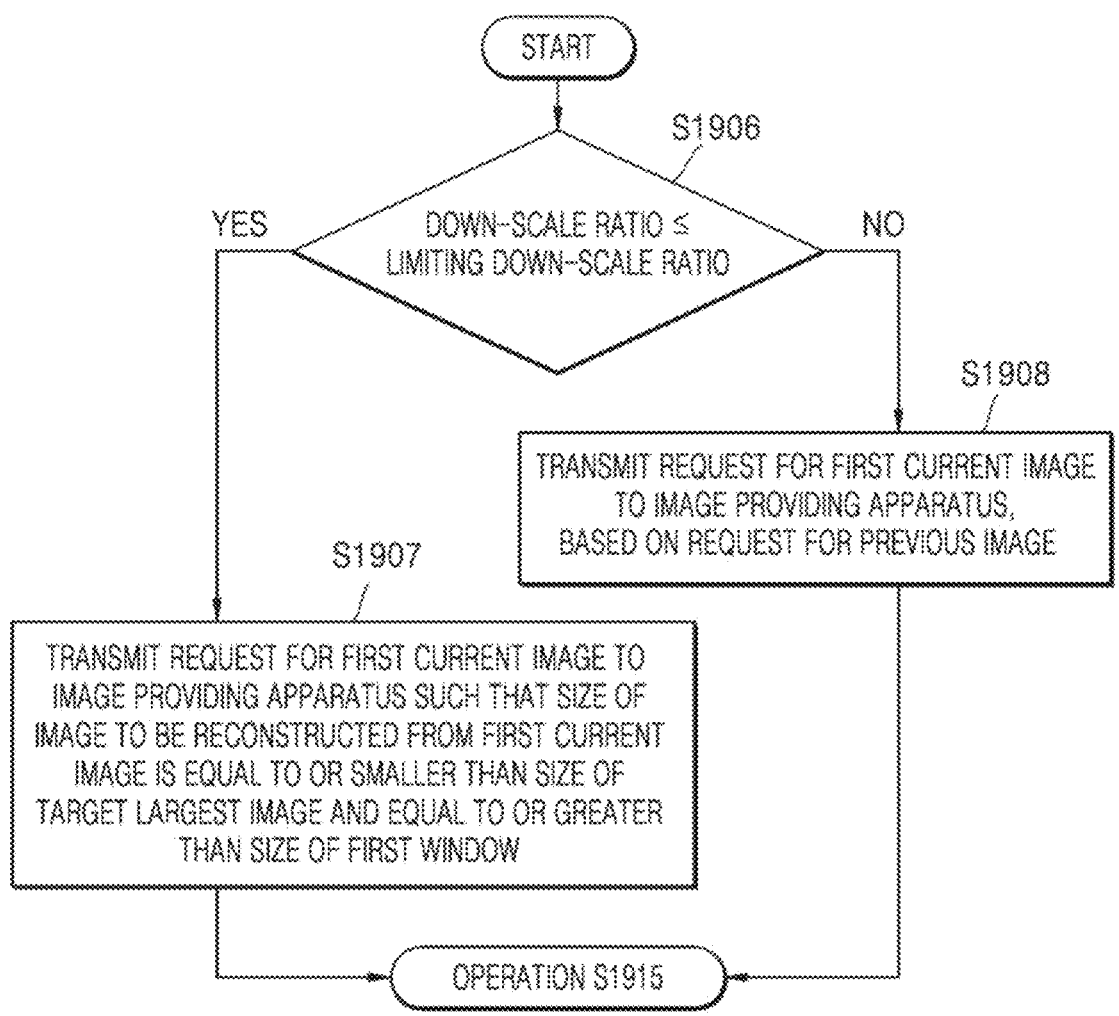
FIG. 19B is a flowchart of a method by which a display apparatus streams an image, according to an embodiment of the disclosure.

FIG. 19B is a flowchart of a method by which the display apparatus 1400 streams an image, according to an embodiment of the disclosure.

Referring to FIG. 19B, in operation S1906, the display apparatus 1400 may identify whether a down-scale ratio is equal to or less than a limiting down-scale ratio, as in operation S1905 of FIG. 19A.

In operation S1907, when the down-scale ratio is equal to or less than the limiting down-scale ratio, the display apparatus 1400 may transmit a request for a first current image to the image providing apparatus 1300 such that a size of an image to be reconstructed from the first current image is equal to or smaller than a size of a target largest image and equal to or greater than a size of a first window. Here, the image to be reconstructed from the first current image may be an image reconstructed through first decoding, but is not limited thereto, and may be an image reconstructed through AI up-scaling after first decoding. The size of the target largest image may be determined based on the size of the first window and the limiting down-scale ratio.

In operation S1908, when the down-scale ratio is greater than the limiting down-scale ratio, the display apparatus 1400 may transmit the request for the first current image to the image providing apparatus 1300, based on a request for a previous image. The display apparatus 1400 may transmit the request for the first current image having a size equal to or smaller than the previous image, to the image providing apparatus 1300. A size of an image reconstructed from the previous image may be equal to or smaller than the size of the image to be reconstructed from the first current image and equal to or greater than the size of the first window.

Figure 20A:
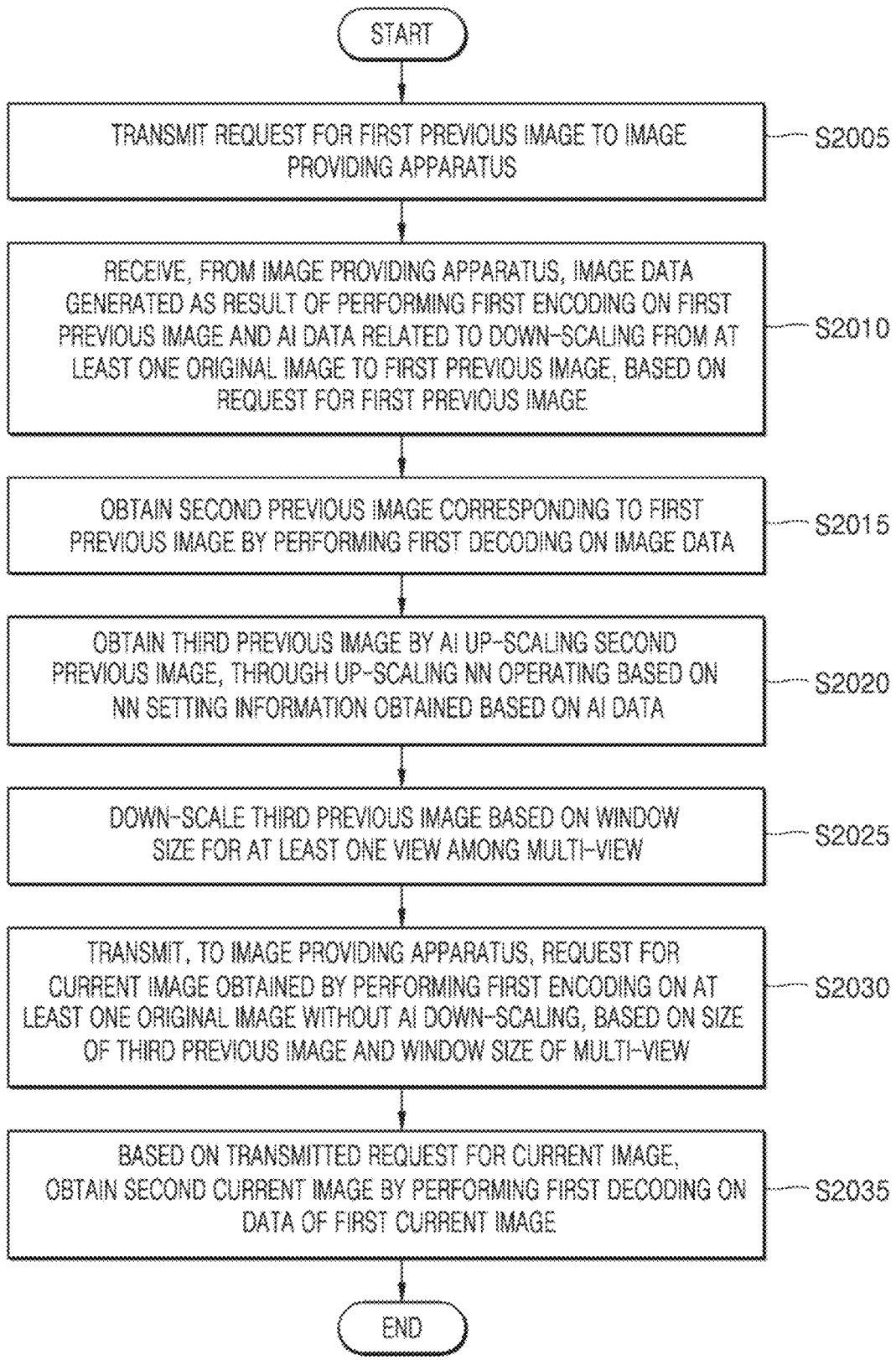
FIG. 20A is a flowchart of a method by which a display apparatus streams an image, according to an embodiment of the disclosure.

FIG. 20A is a flowchart of a method by which the display apparatus 1400 streams an image, according to an embodiment of the disclosure.

Referring to FIG. 20A, in operation S2005, the display apparatus 1400 may transmit a request for a first previous image to the image providing apparatus 1300. Here, the first previous image may be an image obtained by AI down-scaling an original image.

In operation S2010, the display apparatus 1400 may receive, from the image providing apparatus 1300, image data generated as a result of performing first encoding on the first previous image and AI data related to down-scaling from at least one original image to the first previous image, based on the request for the first previous image.

In operation S2015, the display apparatus 1400 may obtain a second previous image corresponding to the first previous image by performing first decoding on the image data.

In operation S2020, the display apparatus 1400 may obtain a third previous image by AI up-scaling the second previous image, through an up-scaling NN operating based on NN setting information obtained based on the AI data.

In operation S2025, the display apparatus 1400 may down-scale the third previous image based on a window size for at least one view among a multi-view.

In operation S2030, the display apparatus 1400 may transmit, to the image providing apparatus 1300, a request for a current image obtained by performing first encoding on the at least one original image without AI down-scaling, based on a size of the third previous image and the window size.

In operation S2035, based on the transmitted request for the current image, the display apparatus 1400 may obtain a second current image by performing first decoding on image data of the current image received from the image providing apparatus 1300.

Figure 20B:
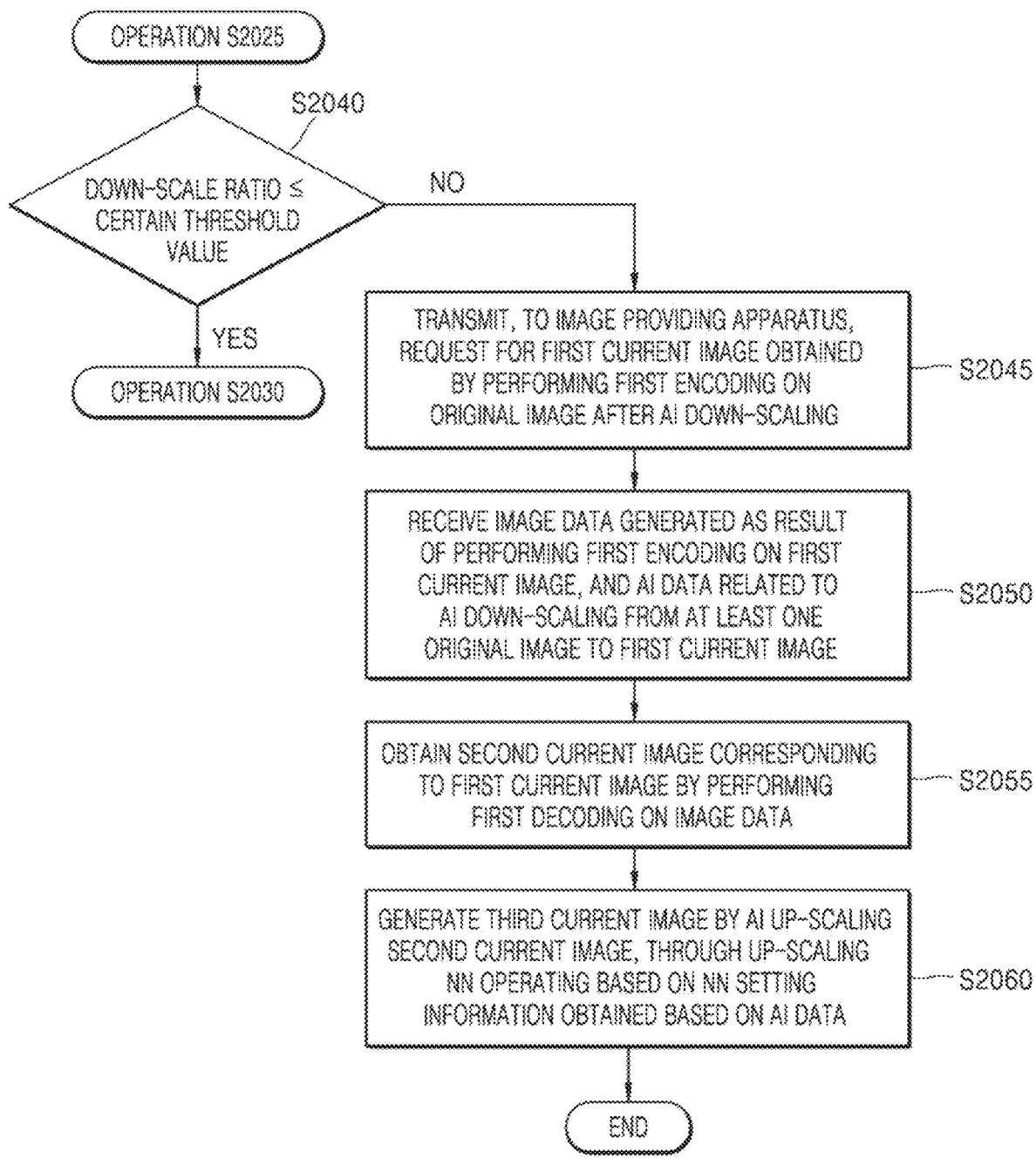
FIG. 20B is a flowchart of a method by which a display apparatus streams an AI up-scaled image according to a result of comparing a down-scale ratio and a certain threshold value, according to an embodiment of the disclosure.

FIG. 20B is a flowchart of a method by which the display apparatus 1400 streams an AI up-scaled image based on a result of comparing a down-scale ratio and a certain threshold value, according to an embodiment of the disclosure.

In operation S2040, the display apparatus 1400 may identify whether a down-scale ratio between a size of a third previous image and a window size is equal to or less than a certain threshold value. When it is identified that the down-scale ratio is equal to or less than the threshold value, the display apparatus 1400 may perform operation S2030.

When it is identified that the down-scale ratio is not equal to or less than the threshold value (i.e., greater than the threshold value), the display apparatus 1400 may transmit, to the image providing apparatus 1300, a request for a first current image obtained by performing first encoding on an original image after AI down-scaling, in operation S2045.

In operation S2050, the display apparatus 1400 may receive, from the image providing apparatus 1300, image data generated as a result of performing first encoding on the first current image, and AI data related to AI down-scaling from at least one original image to the first current image.

In operation S2055, the display apparatus 1400 may obtain a second current image corresponding to the first current image by performing first decoding on the image data.

In operation S2060, the display apparatus 1400 may generate a third current image by AI up-scaling the second current image, through an up-scaling NN operating based on NN setting information obtained based on the AI data.

Figure 20C:
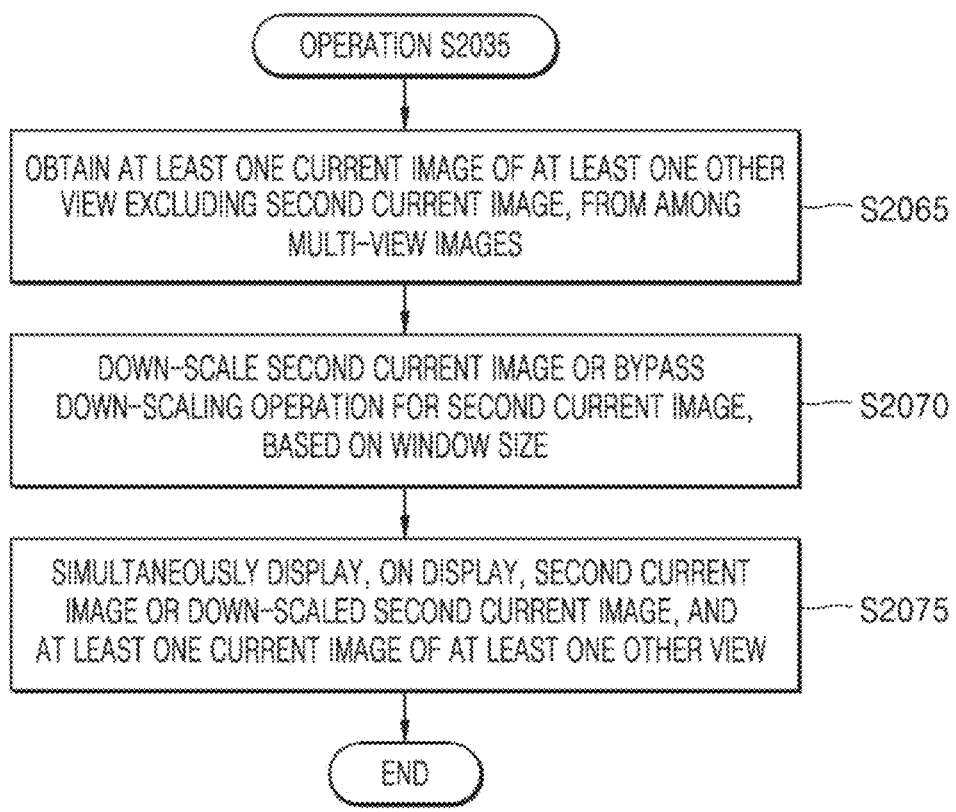
FIG. 20C is a flowchart of a method by which a display apparatus displays a multi-view image, according to an embodiment of the disclosure.

FIG. 20C is a flowchart of a method by which the display apparatus 1400 displays a multi-view image, according to an embodiment of the disclosure.

In operation S2065, the display apparatus 1400 may obtain at least one current image of at least one other view excluding a second current image, from among multi-view images. Here, the display apparatus 1400 may obtain the at least one current image of the at least one other view, based on a user input regarding a multi-view.

In operation S2070, the display apparatus 1400 may down-scale the second current image or bypass a down-scaling operation for the second current image, based on a window size. The display apparatus 1400 may down-scale the second current image or bypass the down-scaling operation, based on a size of the second current image and the window size of the multi-view.

In operation S2075, the display apparatus 1400 may simultaneously display the second current image and the at least one current image of the at least one other view. Alternatively, the display apparatus 1400 may simultaneously display the down-scaled second current image and the at least one current image of the at least one other view.

Figure 21:
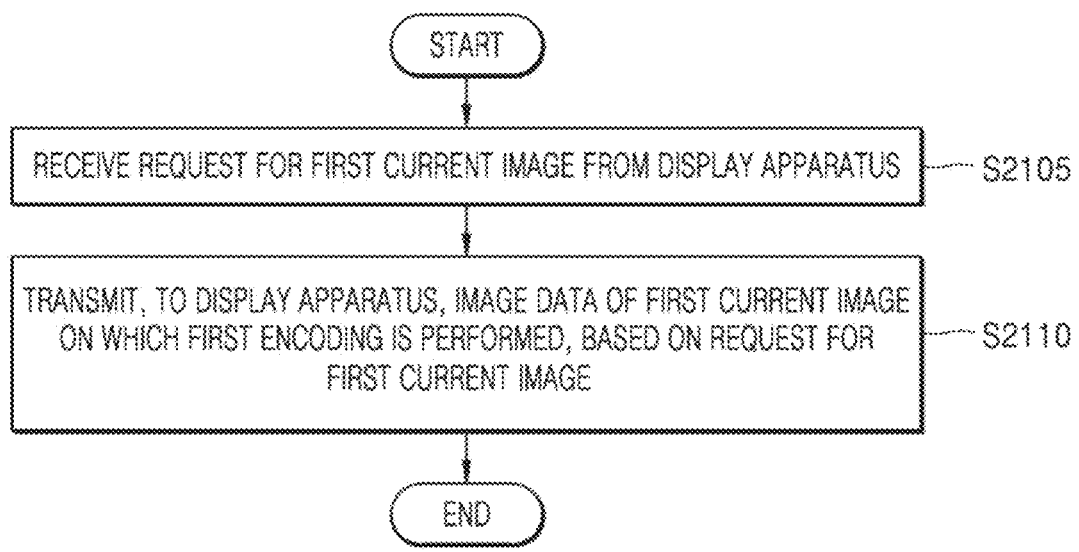
FIG. 21 is a flowchart of a method by which an image providing apparatus streams an image.

FIG. 21 is a flowchart of a method by which the image providing apparatus 1300 streams an image.

In operation S2105, the image providing apparatus 1300 may receive a request for a first current image from the display apparatus 1400.

When a down-scale ratio between a size of an image reconstructed from a previous image and a size of a first window is equal to or less than a limiting down-scale ratio, the display apparatus 1400 may transmit, to the image providing apparatus 1300, the request for the first current image such that a size of an image to be reconstructed from the first current image is equal to or smaller than a target largest image size and equal to or greater than the size of the first window.

When the down-scale ratio between the size of the image reconstructed from the previous image and the size of the first window is greater than the limiting down-scale ratio, the display apparatus 1400 may transmit, to the image providing apparatus 1300, the request for the first current image, based on a request for the previous image. Here, the size of the image reconstructed from the previous image may be equal to or smaller than the size of the image to be reconstructed from the first current image.

In operation S2110, the image providing apparatus 1300 may transmit, to the display apparatus 1400, image data of the first current image on which first encoding is performed, based on the request for the first current image.

Figure 22A:
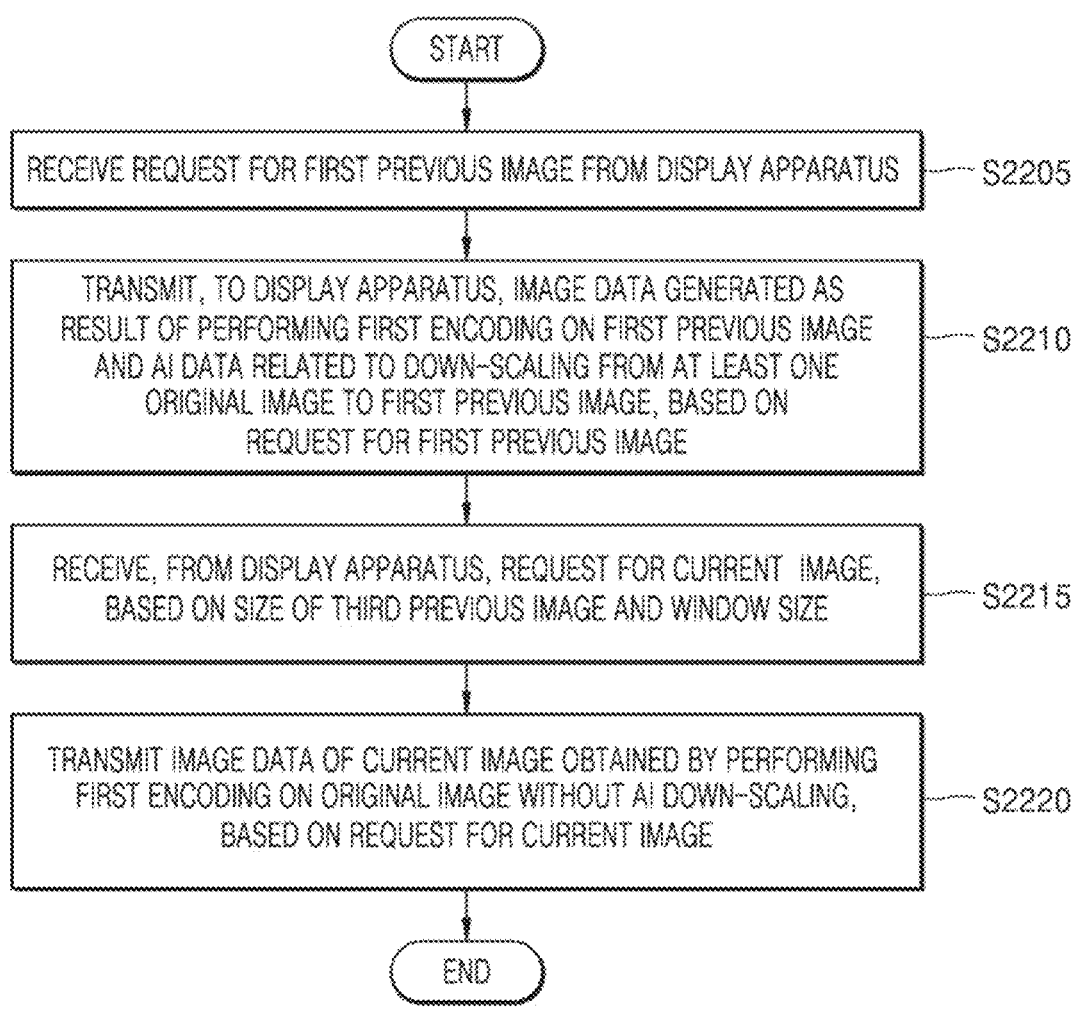
FIG. 22A is a flowchart of a method by which an image providing apparatus streams an image.

FIG. 22A is a flowchart of a method by which the image providing apparatus 1300 streams an image.

In operation S2205, the image providing apparatus 1300 may receive a request for a first previous image from the display apparatus 1400.

In operation S2210, the image providing apparatus 1300 may transmit, to the display apparatus 1400, image data generated as a result of performing first encoding on the first previous image and AI data related to down-scaling from at least one original image to the first previous image, based on the request for the first previous image.

In operation S2215, the image providing apparatus 1300 may receive, from the display apparatus 1400, a request for a current image, based on a size of a third previous image and a window size. The third previous image may be an image obtained by AI up-scaling a second previous image. The second previous image may be an image obtained by performing first decoding on image data of the first previous image.

In operation S2220, the image providing apparatus 1300 may transmit image data of the current image obtained by performing first encoding on the original image without AI down-scaling, based on the request for the current image.

Figure 22B:
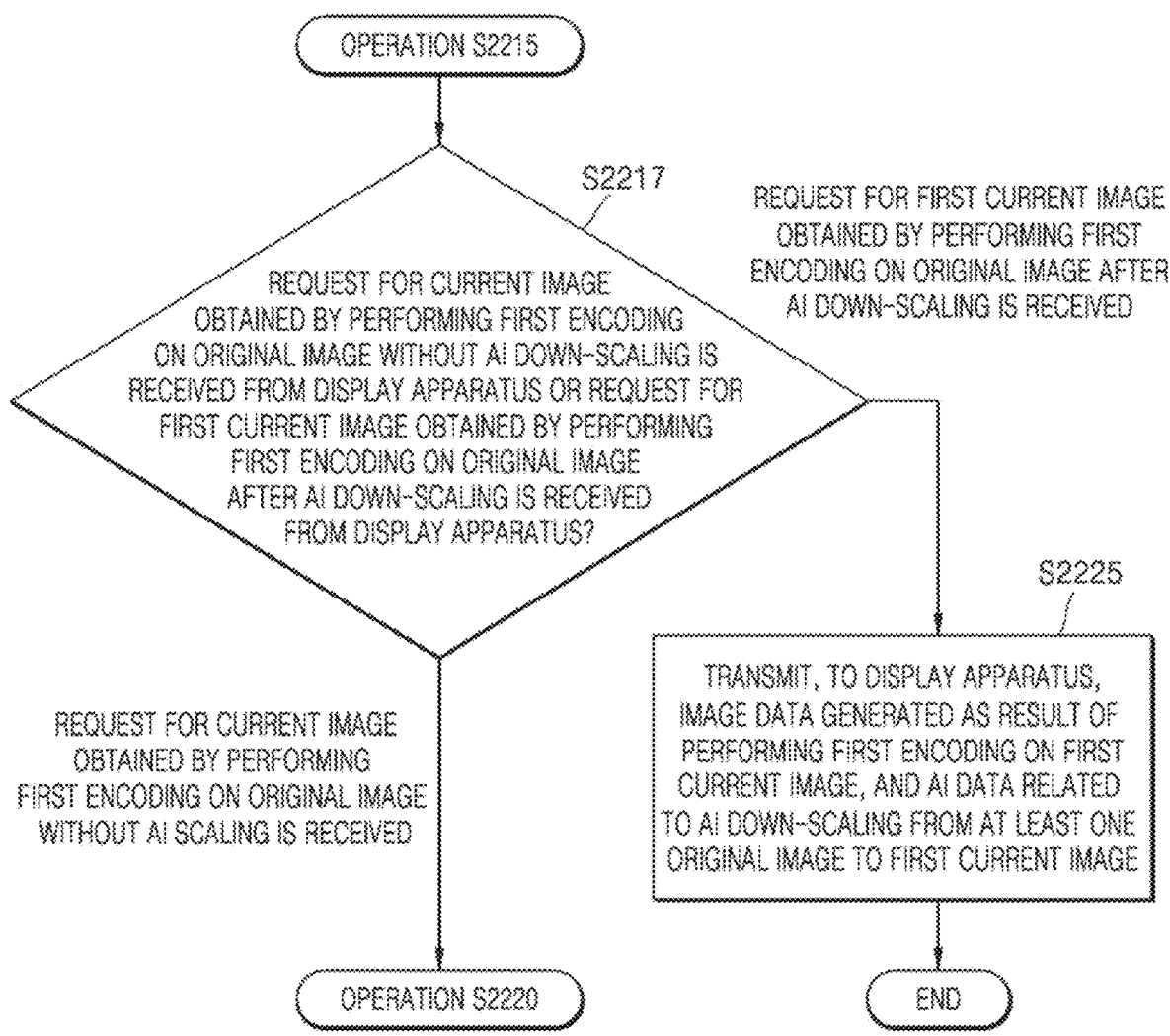
FIG. 22B is a flowchart of a method by which an image providing apparatus streams a current image obtained by performing first encoding on an original image without AI scaling, or a first current image obtained by performing the first encoding on the original image after AI down-scaling, according to a request of a display apparatus.

FIG. 22B is a flowchart of a method by which the image providing apparatus 1300 streams a current image obtained by performing first encoding on an original image without AI scaling, or a first current image obtained by performing the first encoding on the original image after AI down-scaling, based on a request of the display apparatus 1400.

In operation S2217, the image providing apparatus 1300 may identify whether a request for the current image obtained by performing first encoding on the original image without AI down-scaling is received from the display apparatus 1400 or whether a request for the first current image obtained by performing first encoding on the original image after AI down-scaling is received from the display apparatus 1400.

When it is identified that the request for the current image obtained by performing first encoding on the original image without AI scaling is received, the image providing apparatus 1300 may perform operation S2220.

In operation S2225, the image providing apparatus 1300 may transmit, to the display apparatus 1400, image data generated as a result of performing first encoding on the first current image, and AI data related to AI down-scaling from at least one original image to the first current image.

Figure 23A:
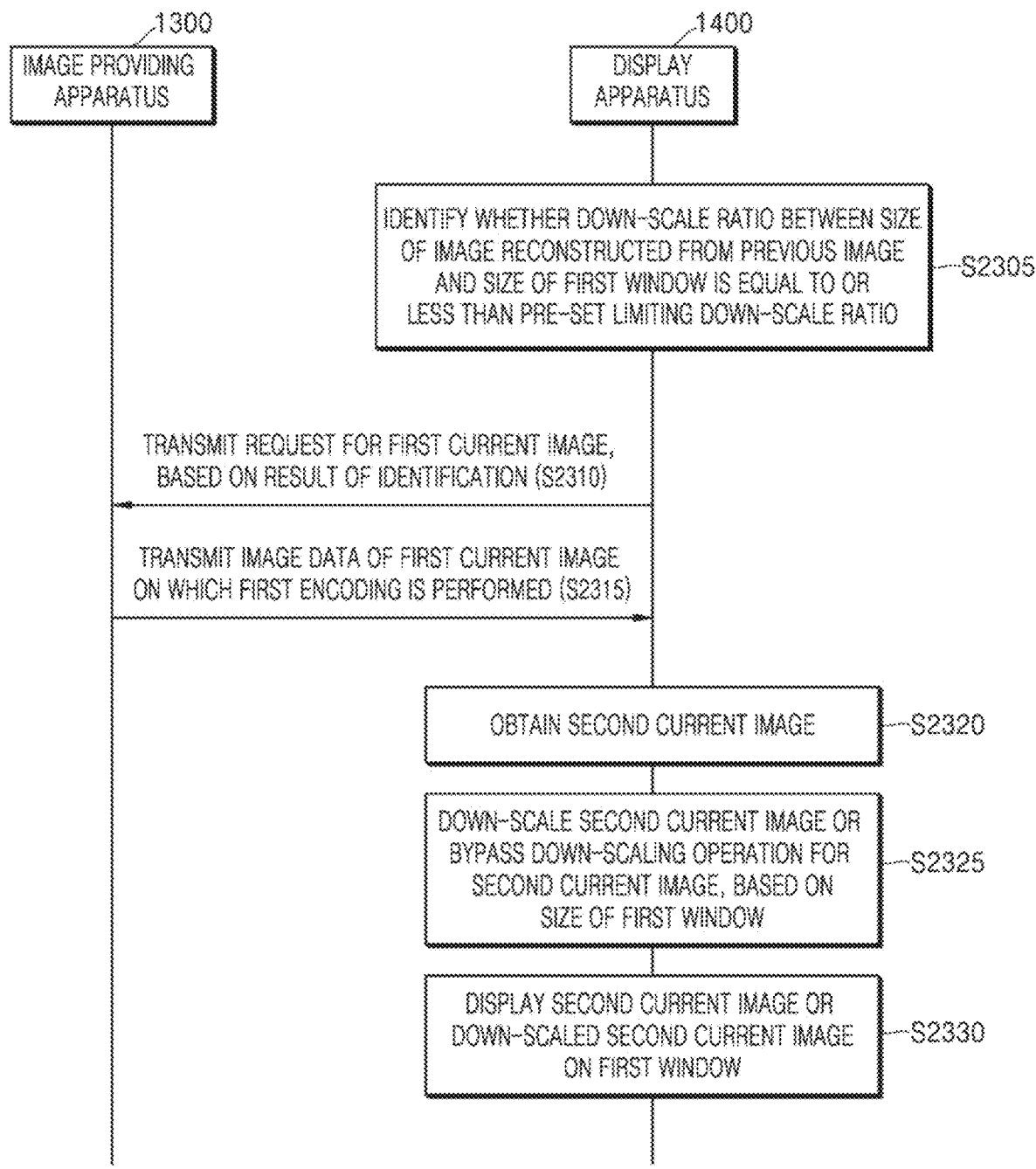
FIG. 23A is a flowchart of processes of streaming an image between an image providing apparatus and a display apparatus, according to an embodiment of the disclosure.

FIG. 23A is a flowchart of processes of streaming an image between the image providing apparatus 1300 and the display apparatus 1400, based on an embodiment of the disclosure.

In operation S2305, the display apparatus 1400 may identify whether a down-scale ratio between a size of an image reconstructed from a previous image and a size of a first window is equal to or less than a pre-set down-scale ratio.

In operation S2310, the display apparatus 1400 may transmit, to the image providing apparatus 1300, a request for a first current image on which first encoding is performed, based on a result of the identifying. The image providing apparatus 1300 may receive the request for the first current image from the display apparatus 1400.

In operation S2315, the image providing apparatus 1300 may transmit, to the display apparatus 1400, image data of the first current image on which first encoding is performed, based on the request for the first current image.

In operation S2320, the display apparatus 1400 may obtain a second current image by performing first decoding on the image data of the first current image.

In operation S2325, the display apparatus 1400 may down-scale the second current image or bypass a down-scaling operation for the second current image, based on the size of the first window. When the size of the first window and a size of the second current image are the same, the display apparatus 1400 may bypass the down-scaling operation. When the size of the first window is smaller than the size of the second current image, the display apparatus 1400 may down-scale the second current image. Here, a down-scale ratio between the size of the second current image and the size of the first window may be greater than a limiting down-scale ratio.

In operation S2330, the display apparatus 1400 may display the second current image or the down-scaled second current image on the first window.

Figure 23B:
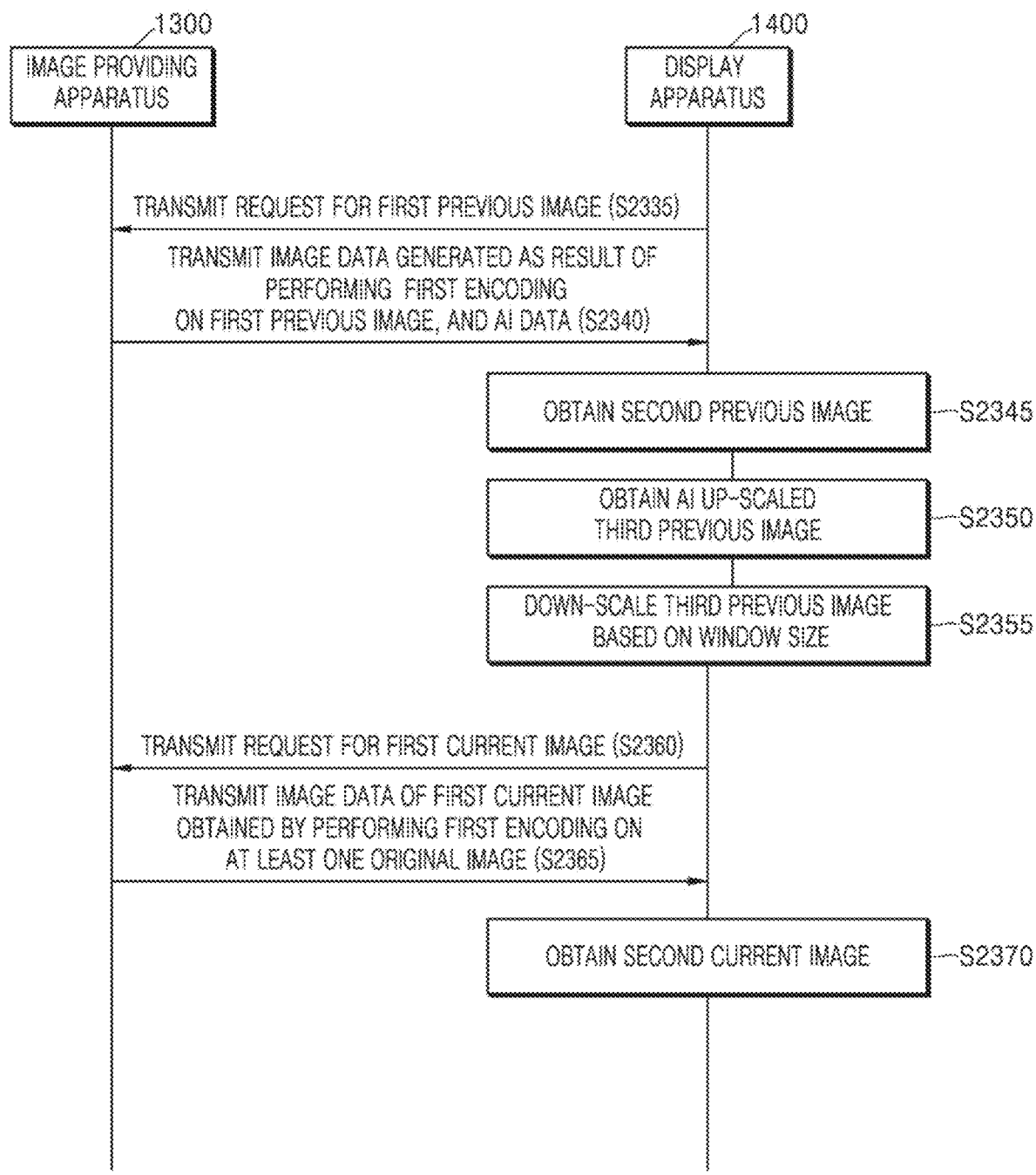
FIG. 23B is a flowchart of processes of streaming an image between an image providing apparatus and a display apparatus, according to an embodiment of the disclosure.

FIG. 23B is a flowchart of processes of streaming an image between the image providing apparatus 1300 and the display apparatus 1400, according to an embodiment of the disclosure.

In operation S2335, the display apparatus 1400 may transmit a request for a first previous image to the image providing apparatus 1300. The image providing apparatus 1300 may receive the request for the first previous image from the display apparatus 1400. The first previous image may be an image obtained by AI up-scaling an original image.

In operation S2340, the image providing apparatus 1300 may transmit, to the display apparatus 1400, image data generated as a result of performing first encoding on the first previous image, and AI data, based on the request for the first previous image. The display apparatus 1400 may receive the image data and the AI data from the image providing apparatus 1300.

In operation S2345, the display apparatus 1400 may obtain a second previous image by performing first decoding on the image data.

In operation S2350, the display apparatus 1400 may obtain an AI up-scaled third previous image by performing AI up-scaling on the second previous image.

In operation S2355, the display apparatus 1400 may down-scale the third previous image based on a size of the third previous image and a window size. The down-scaled third previous image may be displayed through a display.

In operation S2360, the display apparatus 1400 may transmit a request for a first current image to the image providing apparatus 1300. The image providing apparatus 1300 may receive the request for the first current image from the display apparatus 1400.

The display apparatus 1400 may identify, based on the size of the third previous image and the window size, whether to transmit the request for the first current image obtained by performing first encoding on the original image after AI down-scaling or transmit the request for the first current image obtained by performing first encoding on the original image without AI down-scaling. In detail, when a down-scale ratio between the size of the third previous image and the window size is equal to or less than a certain threshold value, it may be identified that the request for the first current image obtained by performing first encoding on the original image without AI down-scaling is transmitted. When it is identified that the request for the first current image is transmitted, the display apparatus 1400 may transmit the request for the first current image to the image providing apparatus 1300.

In operation S2365, the image providing apparatus 1300 may transmit, to the display apparatus 1400, image data of the first current image obtained by performing first encoding on at least one original image without AI down-scaling. The display apparatus 1400 may receive the image data of the first current image from the image providing apparatus 1300.

In operation S2370, the display apparatus 1400 may obtain a second current image by performing first decoding on the image data of the first current image. A down-scaling operation for the second current image may be bypassed based on a size of the second current image and the window size. Then, the second current image may be displayed on a display.

Figure 24:
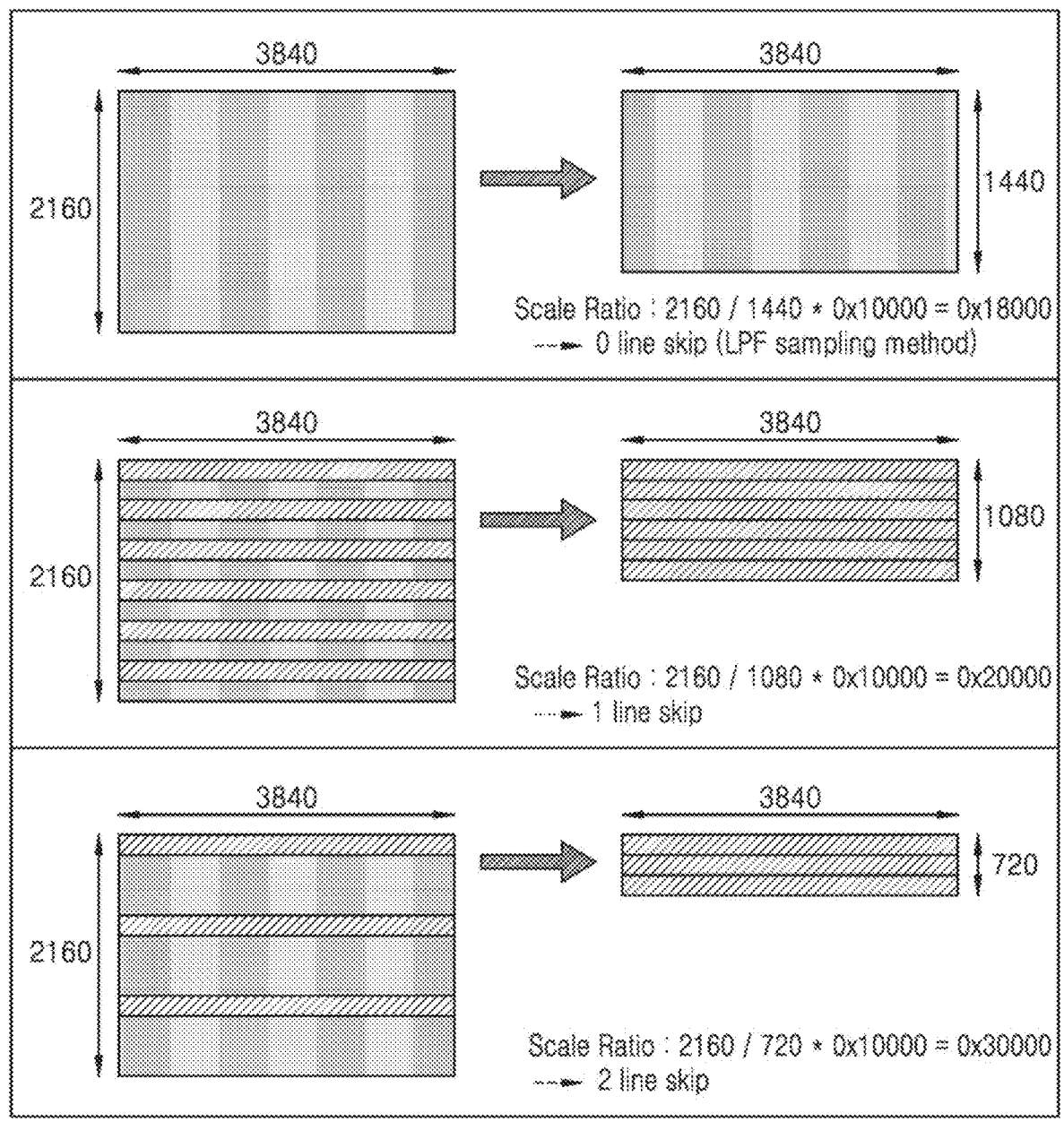
FIG. 24 is a diagram for describing a vertical down-scaling operation according to an embodiment of the disclosure.

FIG. 24 is a diagram for describing a vertical down-scaling operation according to an embodiment of the disclosure.

Referring to FIG. 24, the scaler 1440 may perform vertical down-scaling based on a sampling method using a low pass filter (LPF sampling method).

For example, the scaler 1440 may obtain an image of 3840 px×1440 px by performing down-scaling on an image of 3840×2160 px. Here, a scale ratio may be 2160/1440=1.5. In the vertical down-scaling, sampling may be performed for each scale ratio in a vertical direction. Here, a current sample may have a value obtained by using a sample value at a current sampling location, sample values of adjacent samples, and a coefficient of a low pass filter mask. In other words, a sample having a value obtained by performing interpolation with reference to an adjacent sample may be obtained at scale ratio intervals.

A degree of down-scaling based on the LPF sampling method may be limited based on a performance of hardware implementing the scaler 1440 of the display apparatus 1400. Thus, a highest down-scalable scale ratio may be determined based on the performance of the hardware.

When the scale ratio is greater than the highest down-scalable scale ratio (highest scale ratio), an image breaking phenomenon may occur due to deficiency in the performance of the hardware.

Accordingly, when the scale ratio is greater than the highest scale ratio, down-scaling may be performed by using a simple method considering the performance of the hardware. Here, the down-scaling may be performed by using a line skip method.

Here, the line skip method denotes a sampling method while skipping a specific line.

Referring to FIG. 24, the scaler 1440 may obtain an image of 3840 px×1080 px by performing down-scaling on an image of 3840×2160 px. Here, a scale ratio may be 2160/1080=2. When it is assumed that the highest scale ratio is less than 2, the down-scaling may be performed by using the line skip method.

In detail, in the vertical direction, when a first line (row) is sampled, sampling on a following second line (row) may be skipped. A third line (row) may be sampled again. Sampling is performed in such a manner and finally, an image half a height of an input image may be output.

The scaler 1440 may obtain an image of 3840 px×720 px by performing down-scaling on an image of 3840×2160 px. Here, a scale ratio may be 2160/720=3. When it is assumed that the highest scale ratio is less than 2, the down-scaling may be performed by using the line skip method.

In detail, in the vertical direction, when a first line (row) is sampled, sampling on a following second and third lines (rows) may be skipped. A fourth line (row) may be sampled again. Sampling is performed in such a manner and finally, an image 1/3 the height of the input image may be output.

The highest scale ratio that is a criterion for performing down-scaling based on the line skip method may be a criterion for the display apparatus 1400 requesting the image providing apparatus 1300 for an image obtained by performing first decoding on an original image without AI down-scaling, according to an embodiment of the disclosure.

In other words, when down-scaling is performed based on the LPF sampling method, the highest scale ratio that is a criterion for occurrence of image quality deterioration due to deficiency of the performance of the hardware may be a threshold value for the display apparatus 1400 requesting the image providing apparatus 1300 for the image obtained by performing first decoding on the original image without AI down-scaling, according to an embodiment of the disclosure.

Consequently, the threshold value may be pre-set based on the performance of hardware implementing the scaler 1440 and an image encoded without AI scaling (or image data having a small size) may be requested based on a result of comparing the threshold value with the scale ratio.

Alternatively, when down-scaling is performed based on the line skip method, the threshold value for the display apparatus 1400 requesting the image providing apparatus 1300 for the image obtained by performing first decoding on the original image without AI down-scaling, according to an embodiment of the disclosure, may be determined based on the number of skip lines, which is a criterion for occurrence of image quality deterioration due to deficiency of the performance of hardware.

For example, the scaler 1440 may identify the number of lines to be skipped, based on the scale ratio, as shown in Table 2. Here, a degree of image quality deterioration increases from when the number of lines to be skipped is 2, and thus when the scale ratio is greater than 0x3000, an image encoded from an original image without AI down-scaling (or image data having a small size) may be requested. Here, the scale ratio may be input size/output size×0x10000.

TABLE 2

| Vertical Scale Ratio | Line Skip Number |
| --- | --- |
| 0x20000 | 1 |
| 0x30000 | 2 |
| 0x40000 | 3 |
| 0x60000 | 5 |
| 0x80000 | 7 |
| 0xC0000 | 11 |

Referring back to FIG. 24, when a height of an input image is 2160 px and a height of an output image is 1440 px, a scale ratio is 0x18000 that is less than 0x20000, and thus the number of skip lines may be 0. In this case, vertical down-sampling may be performed based on the LPF sampling method.

When the height of the input image is 2160 px and the height of the output image is 1080 px, the scale ratio is 0x20000, and the number of skip lines may be 1. In this case, the vertical down-sampling may be performed based on the line skip method.

When the height of the input image is 2160 px and the height of the output image is 720 px, the scale ratio is 0x30000, and the number of skip lines may be 2. In this case, the vertical down-sampling may be performed based on the line skip method, and it is determined that a criterion for occurrence of image quality deterioration of the scaler 1440 is satisfied when the number of skip lines is 2, and thus an image encoded from an original image without AI down-scaling may be requested.

It is determined that a case where the number of skip lines is 2 is the criterion for occurrence of the image quality deterioration of the scaler 1440, but the number of skip lines being the criterion is not limited thereto, and may variously set.

Accordingly, the display apparatus 1400 may request the image providing apparatus 1300 for a subsequent image, based on the number of skip lines corresponding to the criterion for occurrence of the image quality deterioration in the scaler 1440. In other words, the threshold value may be pre-set based on the number of skip lines, and the image providing apparatus 1300 may request the subsequent image based on a result of comparing a down-scale ratio with the threshold value.

Hereinabove, details about the display apparatus 1400 according to an embodiment of the disclosure requesting the image providing apparatus 1300 for an image obtained by performing first encoding on an original image having a same size as a window size without AI up-scaling have been described. However, an embodiment of the disclosure is not limited thereto, and when the encoded image having the same size as the window size without AI up-scaling is not present in the image providing apparatus 1300, the display apparatus 1400 may request an image closest to the window size from among images larger than the window size.

In this case, a size of the image received from the display apparatus 1400 based on the request is larger than the window size, and thus the display apparatus 1400 may down-scale a decoded image. However, in this case, because an image having a smaller size than before is decoded and a down-scale ratio is greater than a prior down-scale ratio, image quality deterioration caused by the down-scaling may not occur.

Also, details about the display apparatus 1400 requesting an image encoded without AI down-scaling based on a window size have been described above, but when a network state is relatively bad (when network throughput is relatively low), the display apparatus 1400 may request an image encoded after AI down-scaling. A size of an AI down-scaled image may be smaller than the window size.

For example, when a window size is 4 K, a 4 K image encoded without AI down-scaling is not requested, but a 2 K image encoded after AI down-scaling from a 4 K original image may be requested. In this case, image data and AI data of the 2 K image may be transmitted to the display apparatus 1400. Also, the image data of the 2 K image may be decoded and then AI up-scaled by the display apparatus 1400, and thus an image of 4 K resolution may be reconstructed. When a size of the image reconstructed by being AI up-scaled is greater than the window size, the image may be down-scaled based on the window size, and a down-scale ratio thereof becomes greater than a prior down-scale ratio, and thus image quality deterioration caused by the down-scaling may not occur.

Hereinabove, details about the display apparatus 1400 transmitting a request for a current image to the image providing apparatus 1300 based on a window size have been described, based on the premise that image data of a previous image is image data of an image encoded after AI down-scaling and the display apparatus 1400 performs AI up-scaling after decoding the image data of the previous image. However, an embodiment of the disclosure is not limited thereto, and it should be noted that the display apparatus 1400 may request the image providing apparatus 1300 for a current image having a smaller size than a previous image when a ratio of the reconstructed previous image down-scaled by the scaler 1440 is equal to or less than a certain threshold value, regardless of whether the previous image is AI down-scaled/up-scaled.

As described above, a window size may change while streaming an image in a multi-view environment, and image quality deterioration due to down-scaling may occur based on deficiency in a performance of hardware implementing the scaler 1440, based on the change in the window size.

According to the embodiments of the disclosure described above, an image quality loss caused by excessive down-scaling over a hardware performance may be prevented and a network usage may be reduced as the display apparatus 1400 requests an image having a smaller size or an image that is not AI down-scaled from an original image, based on final output resolution (i.e., a window size).

Also, the display apparatus 1400 may reduce a memory and power usage. This is because unnecessary AI up-scaling operation and a down-scaling operation of the scaler 1440 may be omitted.

Meanwhile, the embodiments of the disclosure described above may be written as computer-executed programs or instructions, and the written programs or instructions may be stored in a medium.

A machine-readable storage medium may be provided in the form of a non-transitory storage medium. Here, the "non-transitory storage medium" only denotes a tangible device and does not contain a signal (for example, electro-magnetic waves). This term does not distinguish a case where data is stored in the storage medium semi-permanently and a case where the data is stored in the storage medium temporarily. For example, the "non-transitory storage medium" may include a buffer where data is temporarily stored.

According to an embodiment of the disclosure, a method according to various embodiments of the disclosure in the present specification may be provided by being included in a computer program product. The computer program products are products that can be traded between sellers and buyers. The computer program product may be distributed in the form of machine-readable storage medium (for example, a compact disc read-only memory (CD-ROM)), or distributed (for example, downloaded or uploaded) through an application store (for example, Play Store™) or directly or online between two user devices (for example, smart phones). In the case of online distribution, at least a part of the computer program product (for example, a downloadable application) may be at least temporarily generated or temporarily stored in a machine-readable storage medium, such as a server of a manufacturer, a server of an application store, or a memory of a relay server.

Meanwhile, a model related to the neural network described above may be implemented through a software module. When the neural network model is implemented through the software module (for example, a program module including instructions), the neural network model may be stored in a computer-readable recording medium.

The neural network model may be integrated in the form of a hardware chip and included as a part of the AI decoding apparatus 200, an AI encoding apparatus 700, the image providing apparatus 1300, or the display apparatus 1400. For example, the neural network model may be manufactured in the form of an exclusive hardware chip for AI, or may be manufactured as a part of an existing general-purpose processor (for example, CPU or application processor) or a graphic-exclusive processor (for example GPU).

Also, the neural network model may be provided in the form of downloadable software. A computer program product may include a product (for example, a downloadable application) in the form of a software program electronically distributed through a manufacturer or an electronic market.

For electronic distribution, at least a part of the software program may be stored in a storage medium or may be temporarily generated. In this case, the storage medium may be a server of the manufacturer or electronic market, or a storage medium of a relay server.

While one or more embodiments of the disclosure have been described with reference to the figures, it will be understood by one of ordinary skill in the art that various changes in form and details may be made therein without departing from the scope as defined by the following claims.

What is claimed is:

1. A display apparatus comprising:
at least one processor configured to execute one or more instructions; and
a display,
wherein the at least one processor is configured to execute the one or more instructions to:
identify whether a first down-scale ratio between a first size of a previous image reconstructed from first image data of the previous image and a size of a first window of the display is equal to or less than a pre-set down-scale ratio;
when the first down-scale ratio is equal to or less than the pre-set down-scale ratio, transmit a request for a current image of a second size to an image providing apparatus, wherein a second down-scale ratio between the second size and the size of the first window is greater than the pre-set down-scale ratio;
obtain the current image by performing first decoding second image data of the current image received from the image providing apparatus;
down-scale the current image based on the second down-scale ratio; and
display, on the first window, the down-scaled current image.

2. The display apparatus of claim 1, wherein the size of the first window is set by a user input.

3. The display apparatus of claim 1, wherein the second size of the current image is equal to or less than a target largest image size and greater than the size of the first window,
wherein the target largest image size is determined based on the size of the first window and the pre-set down-scale ratio.

4. The display apparatus of claim 1, wherein the at least one processor is further configured to execute the one or more instructions to:
transmit a request for the previous image to the image providing apparatus;
receive, from the image providing apparatus, the first image data generated as a result of encoding the previous image, and artificial intelligence (AI) data related to AI down-scaling from at least one previous original image to the first previous image, based on the request for the previous image;
obtain the previous image by decoding the first image data;
generate AI up-scaled previous image by AI up-scaling the previous image through an up-scaling neural network operating based on neural network setting information obtained based on the AI data; and
down-scale the AI up-scaled previous image based on the size of the first window,
wherein, when a third down-scale ratio between a third size of the AI up-scaled-previous image and the size of the first window is equal to or less than the pre-set down-scale ratio, the second image data is obtained by encoding the current image without AI down-scaling, and wherein the second size of the current image is equal to or greater than the size of the first window and smaller than the third size of the AI up-scaled previous image, and
wherein an image different from the down-scaled current image is displayed on a second window of the display.

5. The display apparatus of claim 4, wherein the at least one processor is further configured to execute the one or more instructions to:
when the third down-scale ratio between the third size of the AI up-scaled previous image and the size of the first window is greater than the pre-set down-scale ratio, transmit the request for the current image obtained through AI down-scaling on a current original image;
receive, from the image providing apparatus, the second image data and AI data related to the AI down-scaling from the current original image to the current image;
obtain the current image by decoding the second image data;
generate an AI up-scaled current image by AI up-scaling the current image, through the up-scaling neural network operating based on the neural network setting information obtained based on the AI data;
down-scale the AI up-scaled current image based on the size of the first window; and
display the down-scaled AI up-scaled current image on the first window.

6. The display apparatus of claim 4, wherein the down-scaling of the AI up-scaled previous image comprises at least one of an operation of obtaining an interpolation sample by using values of adjacent samples included in the AI up-scaled previous image and a coefficient of a low pass filter (LPF) based on the first down-scale ratio, or an operation of obtaining a sample through a line skip, without using an AI down-scaling neural network.

7. The display apparatus of claim 1, wherein the pre-set down-scale ratio is pre-set based on performance information of hardware implementing a down-scaling operation.

8. The display apparatus of claim 1, wherein the pre-set down-scale ratio is a value related to down-scaling through a line skip.

9. The display apparatus of claim 1, wherein the at least one processor is further configured to execute the one or more instructions to receive information indicating image data of a plurality of qualities,
wherein the information indicating the image data of the plurality of qualities indicates image data of at least one image to which AI down-scaling is applied, and image data of at least one image to which AI down-scaling is not applied, and
the at least one processor is further configured to execute the one or more instructions to transmit the request for the current image to the image providing apparatus, based on the information indicating the image data of the plurality of qualities.

10. A method, performed by a display apparatus, of displaying an image, the method comprising:
identifying whether a first down-scale ratio between a first size of a previous image reconstructed from first image data of the previous image and a size of a first window is equal to or less than a pre-set down-scale ratio;
when the first down-scale ratio is equal to or less than the pre-set down-scale ratio, transmitting a request for a current image of a second size to an image providing apparatus, wherein a second down-scale ratio between the second size and the size of the first window is greater than the pre-set down-scale ratio;

obtaining the current image by decoding second image data of the current image received from the image providing apparatus;

down-scaling the current image based on the second down-scale ratio; and displaying, on the first window, the down-scaled second current image.

11. The method of claim 10, further comprising:

transmitting a request for the previous image to the image providing apparatus;

receiving, from the image providing apparatus, the first image data generated as a result of encoding the previous image, and artificial intelligence (AI) data related to AI down-scaling from at least one previous original image to the previous image, based on the request for the previous image;

obtaining the previous image by decoding the first image data;

generating an AI up-scaled previous image by AI up-scaling the previous image, through an up-scaling neural network operating based on neural network setting information obtained based on the AI data; and down-scaling the AI up-scaled previous image based on the size of the first window, wherein, when a third down-scale ratio between a third size of the AI up-scaled previous image and the size of the first window is equal to or less than the pre-set down-scale ratio, the second image data is obtained by encoding the current image without AI down-scaling, and wherein the second size of the current image is equal to or greater than the size of the first window and smaller than the size of the AI up-scaled previous image, wherein an image different from the down-scaled current image is displayed on a second window of a display.

12. The method of claim 10, wherein the second size of the current image is equal to or less than a target largest image size and greater than the size of the first window, wherein the target largest image size is determined based on the size of the first window and the pre-set down-scale ratio.

13. A non-transitory computer-readable recording medium having recorded thereon a program that, when executed by at least one processor, cause the at least one processor to perform the method of claim 10.

14. An image providing apparatus comprising:

a processor configured to execute one or more instructions to:

receive a request for a current image from a display apparatus; and transmit, to the display apparatus, image data of the current image on which encoding is performed, based on the request for the current image, wherein, when a first down-scale ratio between a first size of a previous image reconstructed from image data of the previous image and a size of a first window of a display of the display apparatus is equal to or less than a pre-set down-scale ratio, the request for the current image of a second size is received from the display apparatus, wherein a second down-scale ratio between the second size and the size of the first window is greater than the pre-set down-scale ratio, and wherein the current image obtained by decoding the image data of the current image is down-scaled and displayed on the first window.

15. The image providing apparatus of claim 14, wherein the processor is further configured to execute the one or more instructions to:

transmit, to the display apparatus, information indicating image data of a plurality of qualities; and receive, from the display apparatus, the request for the current image based on the information indicating the image data of the plurality of qualities, wherein the information indicating the image data of the plurality of qualities indicates image data generated through AI down-scaling and encoding, and image data generated through encoding without AI down-scaling.

* * * * *